(12) United States Patent
Morooka et al.

(10) Patent No.: US 8,564,711 B2
(45) Date of Patent: Oct. 22, 2013

(54) ZOOM LENS AND IMAGE PICKUP APPARATUS HAVING THE SAME

(75) Inventors: Masaru Morooka, Akishima (JP); Kazuteru Kawamura, Hachioji (JP); Koki Hozumi, Hachioji (JP); Hideyuki Nagaoka, Hino (JP); Koji Nakagawa, Yokohama (JP)

(73) Assignee: Olympus Imaging Corp., Tokyo (JP)

( * ) Notice: Subject to any disclaimer, the term of this patent is extended or adjusted under 35 U.S.C. 154(b) by 59 days.

(21) Appl. No.: 13/357,468

(22) Filed: Jan. 24, 2012

(65) Prior Publication Data
US 2012/0194730 A1    Aug. 2, 2012

(30) Foreign Application Priority Data

Jan. 31, 2011 (JP) ................................. 2011-017762
Jan. 31, 2011 (JP) ................................. 2011-017763
Jan. 31, 2011 (JP) ................................. 2011-017764

(51) Int. Cl.
| | |
|---|---|
| H04N 5/232 | (2006.01) |
| H04N 5/335 | (2011.01) |
| H04N 5/225 | (2006.01) |
| G03B 13/00 | (2006.01) |
| G02B 13/16 | (2006.01) |

(52) U.S. Cl.
USPC ...... 348/345; 348/294; 348/333.08; 348/335; 348/340

(58) Field of Classification Search
USPC .................... 348/294, 333.08, 335, 340, 345; 359/683
See application file for complete search history.

(56) References Cited

U.S. PATENT DOCUMENTS

| | | |
|---|---|---|
| 6,449,433 B2 | 9/2002 | Hagimori et al. |
| 7,593,164 B2 | 9/2009 | Souma |
| 7,593,165 B2 | 9/2009 | Souma |
| 7,630,141 B2 | 12/2009 | Saruwatari |
| 7,830,612 B2 | 11/2010 | Hagiwara |

FOREIGN PATENT DOCUMENTS

| | | |
|---|---|---|
| JP | 3598971 | 9/2004 |
| JP | 2008-304706 | 12/2008 |
| JP | 2008-304708 | 12/2008 |
| JP | 2009-115958 | 5/2009 |
| JP | 2009-282398 | 12/2009 |

*Primary Examiner* — Roberto Velez
*Assistant Examiner* — Stephen Coleman
(74) *Attorney, Agent, or Firm* — Kenyon & Kenyon LLP

(57) ABSTRACT

A zoom lens includes a first lens group of positive refractive power; a second lens group of negative power; a third lens group of positive power; a fourth lens group of negative power, and a fifth lens group of positive power arranged from the object side to the image side. At activation of variable power from the wide angle end to the telescopic end, the first, third, fourth and fifth lens groups moves so as to get closer to the object side or the image side at the telescopic end than at the wide angle end; and a gap between the first lens group and the second lens group increases; a gap between the second lens group and the third lens group decreases; a gap between the third lens group and the forth lens group increases; and a gap between the forth lens group and the fifth lens group increases.

52 Claims, 25 Drawing Sheets

Example 1

Example 1

Example 2

Example 3

Example 4

Example 5

Example 6

Example 7

Example 1

Spherical Aberration
FNO 3.050

Astigmatism
IH 3.86

Distortion
IH 3.86

Magnification Chromatic Aberration
IH 3.86

Spherical Aberration
FNO 5.228

Astigmatism
IH 3.86

Distortion
IH 3.86

Magnification Chromatic Aberration
IH 3.86

Spherical Aberration
FNO 7.001

Astigmatism
IH 3.86

Distortion
IH 3.86

Magnification Chromatic Aberration
IH 3.86

Example 2

Spherical Aberration
FNO 3.028

Astigmatism
IH 3.86

Distortion
IH 3.86

Magnification Chromatic Aberration
IH 3.86

Spherical Aberration
FNO 5.021

Astigmatism
IH 3.86

Distortion
IH 3.86

Magnification Chromatic Aberration
IH 3.86

Spherical Aberration
FNO 7.119

Astigmatism
IH 3.86

Distortion
IH 3.86

Magnification Chromatic Aberration
IH 3.86

Example 3
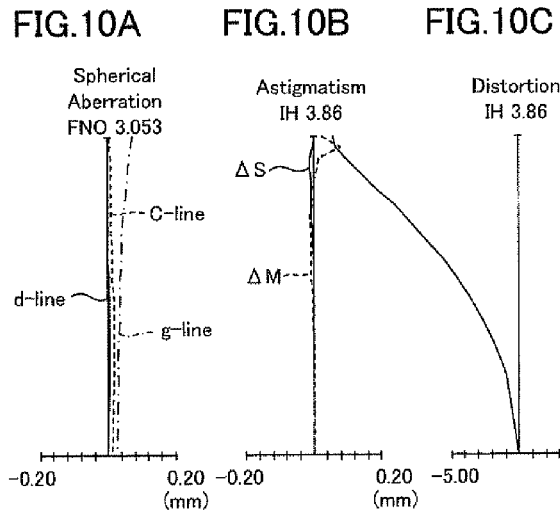
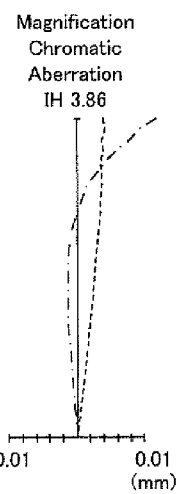
FIG.10A Spherical Aberration FNO 3.053
FIG.10B Astigmatism IH 3.86
FIG.10C Distortion IH 3.86
FIG.10D Magnification Chromatic Aberration IH 3.86
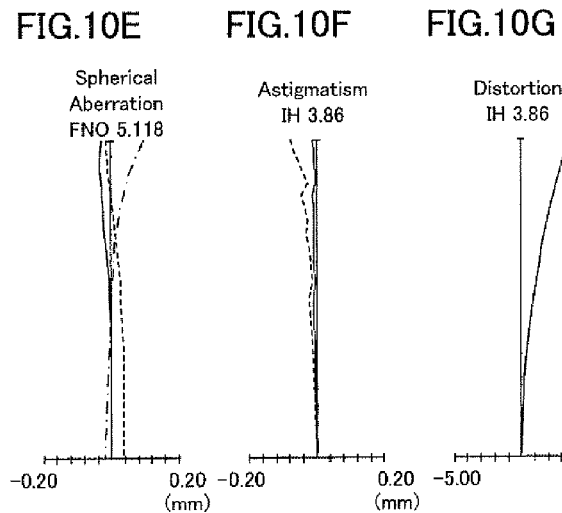
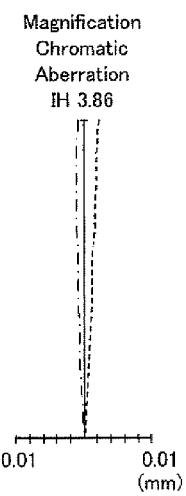
FIG.10E Spherical Aberration FNO 5.118
FIG.10F Astigmatism IH 3.86
FIG.10G Distortion IH 3.86
FIG.10H Magnification Chromatic Aberration IH 3.86
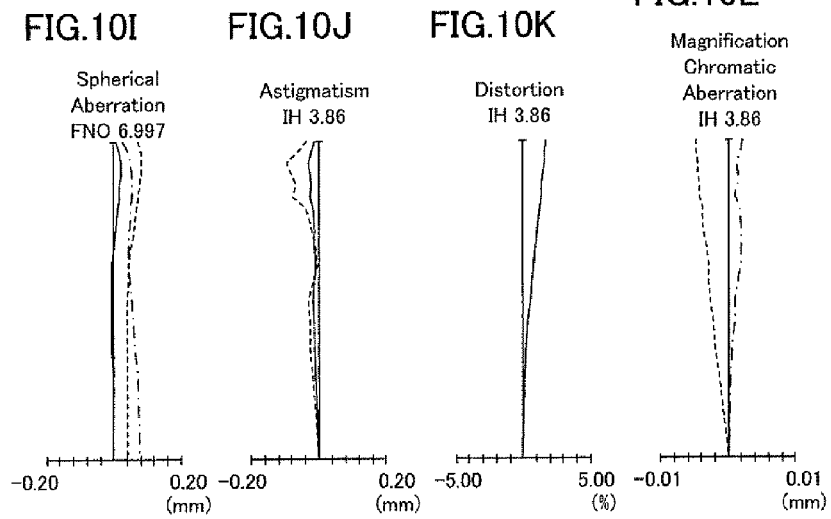
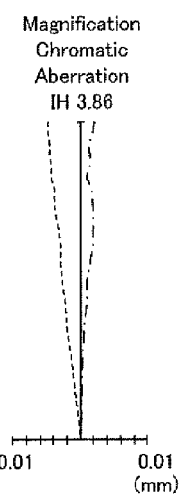
FIG.10I Spherical Aberration FNO 6.997
FIG.10J Astigmatism IH 3.86
FIG.10K Distortion IH 3.86
FIG.10L Magnification Chromatic Aberration IH 3.86

Example 4
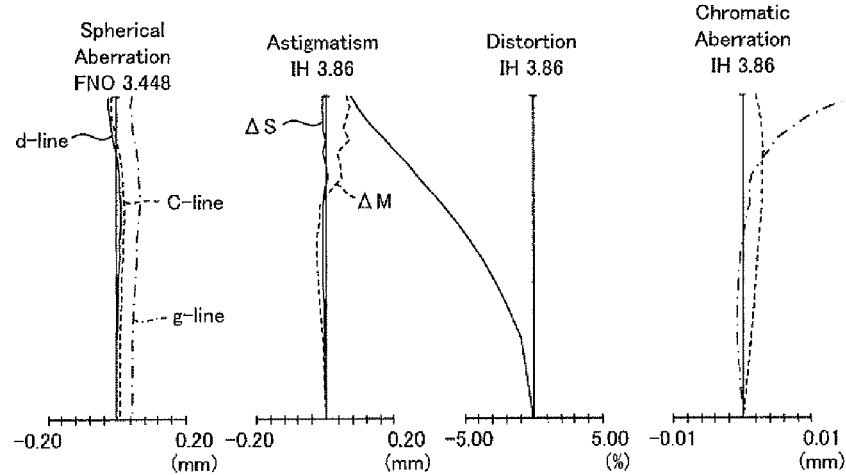
FIG.11A Spherical Aberration FNO 3.448
FIG.11B Astigmatism IH 3.86
FIG.11C Distortion IH 3.86
FIG.11D Magnification Chromatic Aberration IH 3.86
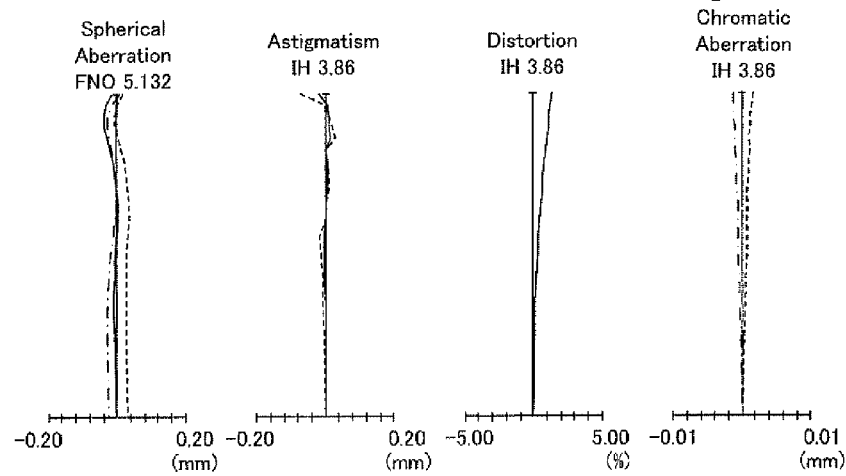
FIG.11E Spherical Aberration FNO 5.132
FIG.11F Astigmatism IH 3.86
FIG.11G Distortion IH 3.86
FIG.11H Magnification Chromatic Aberration IH 3.86
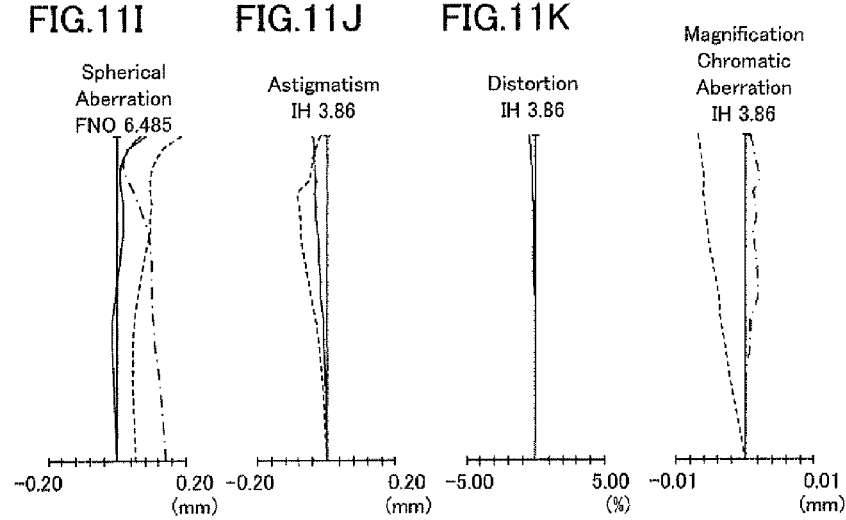
FIG.11I Spherical Aberration FNO 6.485
FIG.11J Astigmatism IH 3.86
FIG.11K Distortion IH 3.86
FIG.11L Magnification Chromatic Aberration IH 3.86

Example 5

FIG.12A Spherical Aberration FNO 2.671
(d-line, g-line, C-line)
−0.20 to 0.20 (mm)

FIG.12B Astigmatism IH 3.86
(ΔM, ΔS)
−0.20 to 0.20 (mm)

FIG.12C Distortion IH 3.86
−5.00 to 5.00 (%)

FIG.12D Magnification Chromatic Aberration IH 3.86
−0.01 to 0.01 (mm)

FIG.12E Spherical Aberration FNO 4.055
−0.20 to 0.20 (mm)

FIG.12F Astigmatism IH 3.86
−0.20 to 0.20 (mm)

FIG.12G Distortion IH 3.86
−5.00 to 5.00 (%)

FIG.12H Magnification Chromatic Aberration IH 3.86
−0.01 to 0.01 (mm)

FIG.12I Spherical Aberration FNO 7.029
−0.20 to 0.20 (mm)

FIG.12J Astigmatism IH 3.86
−0.20 to 0.20 (mm)

FIG.12K Distortion IH 3.86
−5.00 to 5.00 (%)

FIG.12L Magnification Chromatic Aberration IH 3.86
−0.01 to 0.01 (mm)

Example 6
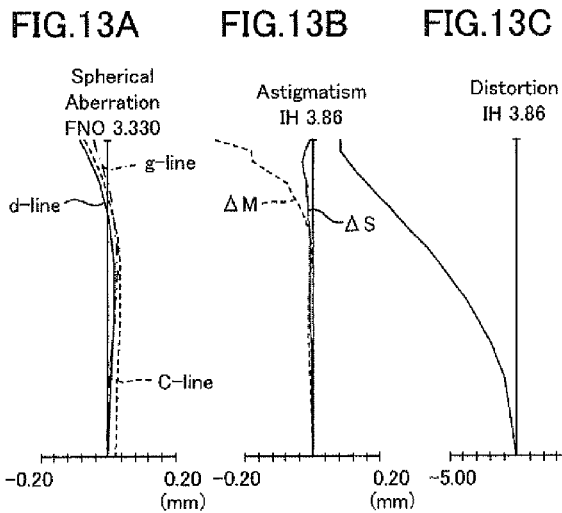
FIG.13A Spherical Aberration FNO 3.330
FIG.13B Astigmatism IH 3.86
FIG.13C Distortion IH 3.86
FIG.13D Magnification Chromatic Aberration IH 3.86
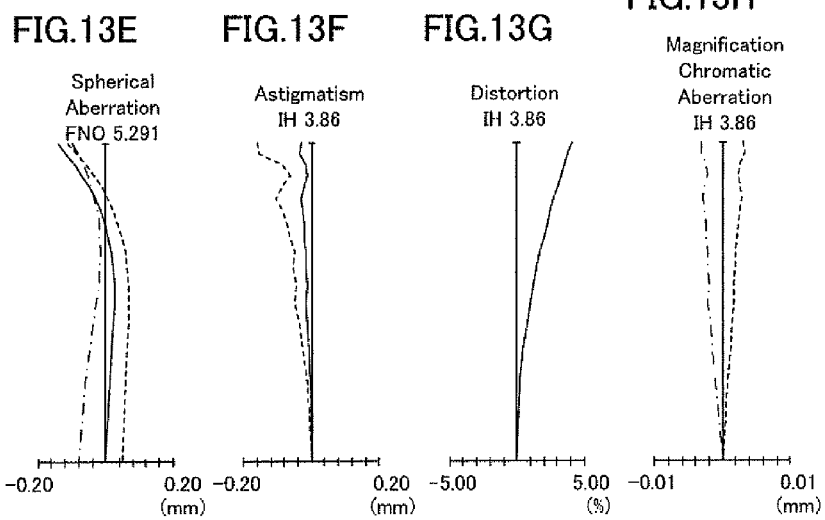
FIG.13E Spherical Aberration FNO 5.291
FIG.13F Astigmatism IH 3.86
FIG.13G Distortion IH 3.86
FIG.13H Magnification Chromatic Aberration IH 3.86
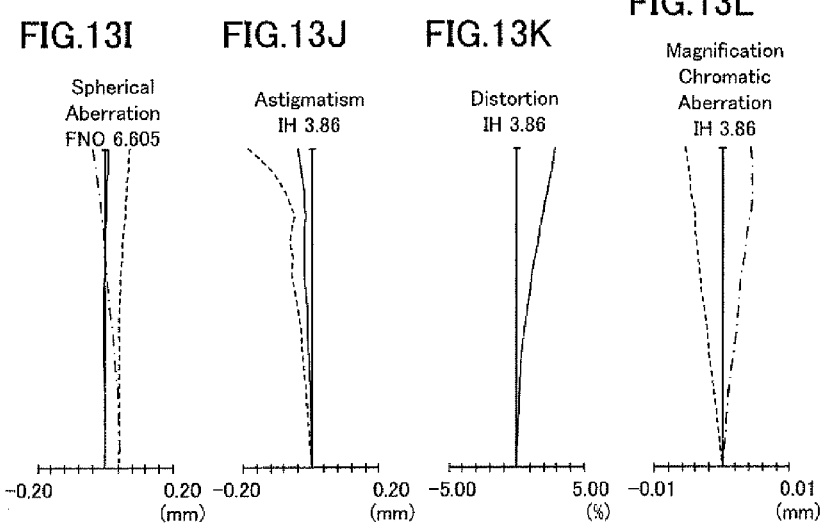
FIG.13I Spherical Aberration FNO 6.605
FIG.13J Astigmatism IH 3.86
FIG.13K Distortion IH 3.86
FIG.13L Magnification Chromatic Aberration IH 3.86

Example 7
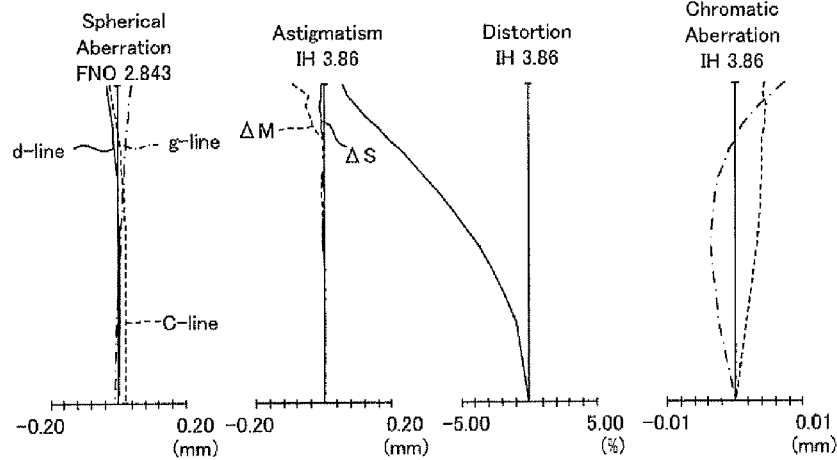
FIG.14A Spherical Aberration FNO 2.843
FIG.14B Astigmatism IH 3.86
FIG.14C Distortion IH 3.86
FIG.14D Magnification Chromatic Aberration IH 3.86
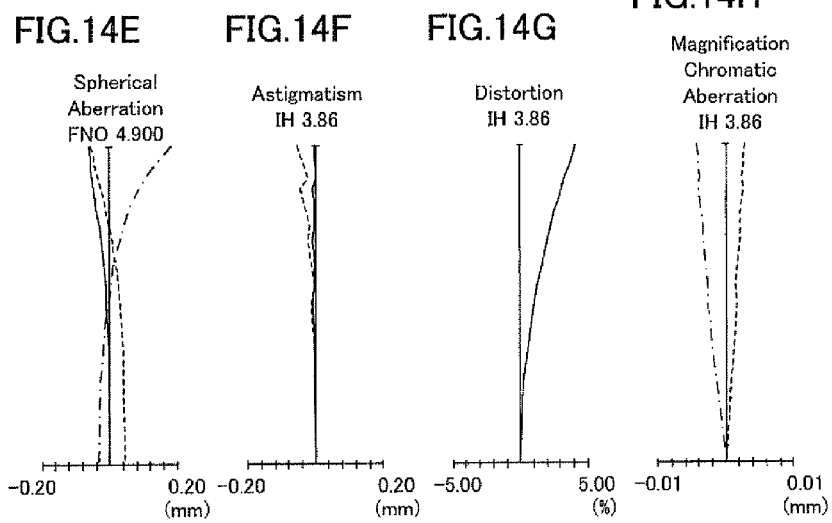
FIG.14E Spherical Aberration FNO 4.900
FIG.14F Astigmatism IH 3.86
FIG.14G Distortion IH 3.86
FIG.14H Magnification Chromatic Aberration IH 3.86
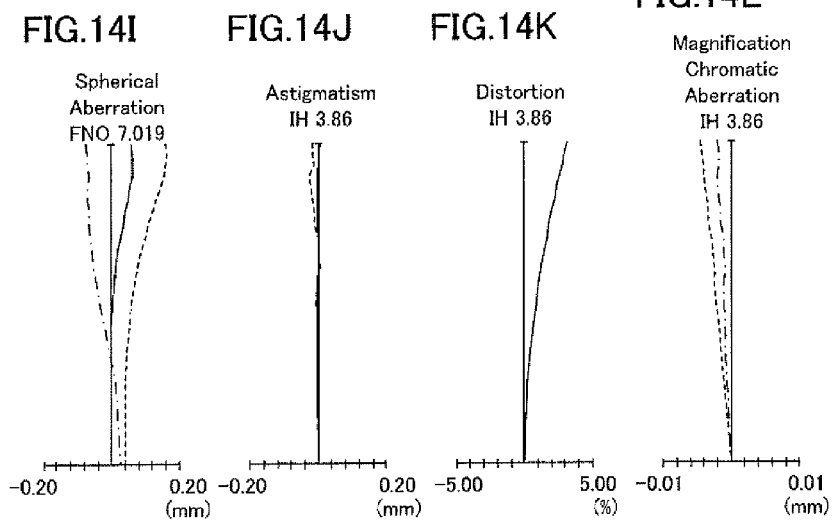
FIG.14I Spherical Aberration FNO 7.019
FIG.14J Astigmatism IH 3.86
FIG.14K Distortion IH 3.86
FIG.14L Magnification Chromatic Aberration IH 3.86

ZOOM LENS AND IMAGE PICKUP APPARATUS HAVING THE SAME

CROSS-REFERENCE TO RELATED APPLICATIONS

This application claims benefit of Japanese Application No. 2011-017762 filed in Japan on Jan. 31, 2011 and No. 2011-017763 filed in Japan on Jan. 31, 2011, No. 2011-017764 filed in Japan on Jan. 31, 2011, the contents of which are incorporated by this reference.

BACKGROUND OF THE INVENTION

The present invention relates to a zoom lens. Specifically, the present invention relates to the same suitable for being applied to video cameras, digital cameras or the like. Further, the present invention also relates to an image pickup apparatus having a zoom lens the full length of which is kept constant during activation of variable power and focusing.

In recent years, miniaturing and thickness reduction of zoom lenses employed in digital cameras and video cameras have been developed.

On the other hand, zoom lenses have been required to have widened angles of view and increased variable power ratios with needs of miniaturing and thickness reduction being satisfied.

Five group type zoom lenses employing lens arrangement in which refractive power is positive, negative, positive, negative, positive, in order from the object side toward the image side have been known conventionally as zoom lenses which keep up with needs of widening angle of view and increasing variable power ratio, as disclosed in Patent Document 1 (JP-B-3598971)-Document 5 (JP-A-2009-282398).

Focal length at the wide angle end and variable power ratio are scored as follows, being expressed in converted values which would be marked under a condition of 35 mm film size at an image plane.

JP-B-3598971 (Patent Document 1) discloses a zoom lens which gives 35 mm-film-size-converted focal length of 29.6 mm at the wide angle end and variable power ratio of 11.4 times.

JP-A-2008-304706 (Patent Document 2) discloses a zoom lens which gives 35 mm-film-size-converted focal length of 28.4 mm at the wide angle end and variable power ratio of 12 times.

JP-A-2008-304708 (Patent Document 3) discloses a zoom lens which gives 35 mm-film-size-converted focal length of 28.4 mm at the wide angle end and variable power ratio of 12 times.

JP-A-2009-115958 (Patent Document 4) discloses a zoom lens which gives 35 mm-film-size-converted focal length of 31 mm at the wide angle end and variable power ratio of 17.5 times.

JP-A-2009-282398 (Patent Document 5) discloses a zoom lens which gives 35 mm-film-size-converted focal length of 27 mm at the wide angle end and variable power ratio of 19.4 times.

SUMMARY OF THE INVENTION

A zoom lens in accordance with a first aspect comprises a first lens group of positive refractive power, a second lens group of negative refractive power, a third lens group of positive refractive power, a forth lens group of negative refractive power and a fifth lens group of positive refractive power arranged sequentially from an object side toward an image side in the above mentioned order, and at least the first lens group, the third lens group, the forth lens group and the fifth lens group move respectively to perform activation of variable power from the wide angle end to the telescopic end, wherein the first lens group, the third lens group and the forth lens group move so as to get closer to the object side at the telescopic end than at the wide angle end, and the fifth lens group moves so as to get closer to the image side at the telescopic end than at the wide angle end, and a gap between the first lens group and the second lens group, a gap between the third lens group and the forth lens group and a gap between the forth lens group and the fifth lens group get larger respectively at the telescopic end than at the wide angle end, a gap between the second lens group and the third lens group gets smaller at the telescopic end than at the wide angle end, and conditional formulas (1B), (2B) and (3B) given below are preferably satisfied:

$$10 < ft/fw \qquad (1B)$$

$$0.1 < \Delta 4Gd/\Delta 3Gd < 0.72 \qquad (2B)$$

$$-3.0 < \Delta 5Gd/fw < -0.16 \qquad (3B):$$

where
ft is focal length at the telescopic end:
fw is focal length at the wide angle end:
$\Delta 3Gd$, $\Delta 4Gd$ and $\Delta 5Gd$ are the quantities of displacement of positions of the third lens group, the forth lens group and the fifth lens group at the telescopic end, respectively, with respect to the positions of the third lens group, the forth lens group and the fifth lens group at the wide angle end, respectively, wherein sign of displacement is defined as being positive when movement occurs toward the object side.

Below described is the reason why the above construction is employed and on effects thereof.

A zoom lens in accordance with the first aspect employs a positive-forward-type zoom lens in which a lens group of positive refractive power is arranged at the closest side with respect to the object side, thereby being rendered advantageous for securing variable power ratio and providing a lens group arrangement desirable as a zoom lens of wide angle of view and high variable power ratio. Activation of variable power is mainly can be performed by changing gaps between the first lens group and the second lens, between the second lens group and the third lens group and between the third lens group and the forth lens group. In addition, disposing of the fifth lens group of positive power enables the position of exit pupil to be set properly and the size across the first lens group through the forth lens group to be reduced in corporation with negative power of the forth lens group. Thus advantage for constituting small-sized zoom lenses is obtained.

Further, with a zoom lens of the first aspect, when activation of variable power from the wide angle end toward telescopic end is performed, the gap between the first lens group and the second lens group is increased at the telescopic end than at the wide angle end, but the third lens group moves toward the object side so that the gap between the second lens group and the third lens group decreased at the telescopic end than at the wide angle end, with the result that it is possible to avoid an entrance pupil from being too deep and to obtain advantage for reducing the diameter of the zoom lens.

Furthermore, with a zoom lens of the first aspect, the first lens group and the third lens group move so as to get closer to the object side at the telescopic end than at the wide angle end, thereby enabling not only function of activating variable power by movement of the second lens group and the third lens group to be secured and advantage for increasing variable power ratio to be obtained but advantage for decreasing the full length of lens at the wide angle end and the telescopic end to be obtained.

Still further, with a zoom lens of the first aspect, the gaps between the third lens group and the forth lens group and between the forth lens group and the fifth lens group are increased respectively when activation of variable power from the wide angle end toward telescopic end is performed, thereby enabling also a lens system which is located closer to the image side than the third lens group to have function of activating variable power, with the result that further advantage for increasing variable power ratio to be obtained.

In this situation, further advantage for securing variable power ratio is obtained by having the third lens group and the forth lens group move toward the object side and having the fifth lens group move toward the image side.

Still more further, a zoom lens of the first aspect is constituted so as to satisfy conditional formulas (1B), (2B) and (3B).

By satisfying conditional formula (2B), the quantities of movement of the third lens group and the forth lens group during zooming from the wide angle end toward the telescopic end are rendered proper, with the result that further advantage for both increasing magnification ratio and size reduction.

To secure the diverging effect of the forth lens group is rendered easy by securing displacement of the forth lens group with respect to displacement of the third lens group during movement from wide angle end to telescopic end properly so that the lower limit in conditional formula (2B) is not exceeded, with the result that advantage for securing back focus at the telescopic end and variable power ratio.

Further, to suppress the diverging effect of the forth lens group is rendered easy by securing displacement of the forth lens group with respect to displacement of the third lens group during movement from wide angle end to telescopic end properly so that the upper limit in conditional formula (2B) is not exceeded, with the result that advantage for restraining back focus at the telescopic end from being excessive and for size reduction.

In addition, further advantage for both increasing magnification ratio and size reduction is obtained by satisfying conditional formula (3B).

To restrain curvature of field on the wide angle end side is rendered easy by avoiding the lower limit in conditional formula (3B) from being exceeded, leading to maintaining optical performance.

On the other hand, to restrain curvature of field on the telescopic end side is rendered easy by avoiding the upper limit in conditional formula (3B) from being exceeded, leading to maintaining optical performance over the entire variable power range. In addition, the quantity of movement of the forth lens group during activation of variable power can be also made small by securing the quantity of movement of the fifth lens group toward the image side during zooming, leading to size reduction.

Conditional formula (1B) is a conditional formula for establishing a premise such that the subject is directed to a zoom lens of high variable power ratio.

To secure variable power ratio so that the lower limit in conditional formula (1B) is not exceeded renders it possible to keep up with variation of scenes to be photographed, pictured or image-picked-up, which is desirable.

In addition, a zoom lens of the first aspect satisfies preferably conditional formula (4B) given below.

$$1.5 < \Delta\beta 3G < 4.0 \tag{4B}$$

where $\Delta\beta 3G$ is defined as $\Delta\beta 3G = \beta 3t/\beta 3w$, wherein $\beta 3t$ is lateral magnification of the third lens group at the wide angle end and $\beta 3w$ is lateral magnification of the third lens group at the telescopic end.

Still more advantage for both increasing variable power ratio and size reduction is obtained by satisfying conditional formula (4B).

Conditional formula (4B) regulates properly the share of variable power to be assigned to the third lens group in activation of variable power from the wide angle end to the telescopic end.

To secure the share of variable power assigned to the third lens group by avoiding the lower limit in conditional formula (4B) enables the share of variable power assigned to the second lens group to be suppressed and can avoids the second lens group from having an excessive quantity of movement, with the result that advantage for reducing the total length and for decreasing the lens diameter of the first lens group.

To suppress the share of variable power assigned to the third lens group by avoiding the upper limit in conditional formula (4B) enables the quantity of movement of the third lens group to be suppressed easily, leading to thickness reduction of the zoom lens at collapse of the zoom lens. In addition to this, securing of brightness at the telescopic end is rendered easy and restraining of position changes of exit pupil at activation of variable power is rendered easy. Otherwise, restraining of the refractive power of the third lens group is rendered easy, with the result that reduction of aberration caused by the third lens group is rendered easy and advantage for securing image-formation performance.

Next, a zoom lens of the first aspect satisfies preferably conditional formula (5B) given below.

$$-1.5 < f4/fs < -0.2 \tag{5B}$$

where f4 is the focal length of the forth lens group;
fs is defined as is=$\sqrt{(fw \times ft)}$:
fw is the focal length of the zoom lens at the wide angle end.

More advantage for realizing increase in magnification and decrease in size is obtained by satisfying conditional formula (5B).

To restrain curvature of field on the wide angle end side is rendered easy by avoiding the lower limit in conditional formula (5B) from being exceeded, leading to maintaining optical performance. In addition to this, Still more advantage for size reduction is obtained because the quantity of movement of the forth lens group can be made small.

To restrain curvature of field on the telescopic end angle end side is rendered easy by avoiding the upper limit in conditional formula (5B) from being exceeded, leading to being easy to maintain optical performance over the full range of zooming.

The second lens group of a zoom lens of the first aspect is preferably located so as to get closer to the image side at the telescopic end than at the wide angle end.

It is rendered to be easy to secure the share of variable power assigned to the second lens group with the quantity of sending-out of the first lens group being kept suppressed, with the result that advantage for both increasing variable power ratio and size reduction at the telescopic end.

Next, a zoom lens of the first aspect satisfies preferably conditional formula (3A) given below.

$$-0.30 < f4/ft < -0.10 \quad (3A):$$

where f4 is the forementioned focal length of the forth lens group.

With a zoom lens of the first aspect, at least the forth lens group or both the forth lens group and the fifth lens group are moved so that the gaps between the third lens group and the forth lens group and between the forth lens group and the fifth lens group increase at activation of variable power from wide angle end to telescopic end in order to realize a high variable power ratio.

It is preferable for assuring size reduction and optical performance still firmly to set the refractive power of the forth lens group properly so as to satisfy the above conditional formula (3A).

To reduce curvature of field on the wide angle end side is rendered easy by avoiding the lower limit in conditional formula (3A) from being exceeded, leading to advantage for maintaining high optical performance. In addition to this, more advantage for size reduction is obtained because the quantity of movement of the forth lens group at zooming can be made small.

To reduce curvature of field on the telescopic end is rendered easy by avoiding the upper limit in conditional formula (3A) from being exceeded, enabling optical performance to be assured over the full range of zooming.

In addition, the forth lens group of a zoom lens of the first aspect preferably consists of one negative lens.

As for the forth lens group, it can mainly take charge of sharing of the function of variable power at zooming and also correcting curvature of field over the full range of zooming. Regarding chromatic aberration, it can be cancelled by combination of the forth lens group of negative refractive power and the fifth lens group of positive refractive power. Therefore, even if the forth lens group is composed of one negative lens, correction of chromatic aberration is achievable over the full range of zooming. Such construction of the forth lens group consisting of one negative lens leads to size reduction of the zoom lens at collapse for being put away.

Next, a zoom lens of the first aspect satisfies preferably conditional formula (4A) given below.

$$0.5 < Dt/ft < 0.95 \quad (4A):$$

where Dt is the distance from the surface top of the lens surface which is the closest to the object side to the image-formation plane at the telescopic end.

To restrain the refractive power of each lens group from being excessive is rendered easy and advantage for correcting the aberration in each lens group is obtained by avoiding the lower limit in conditional formula (4A) from being exceeded. As a result, advantage for reducing the number of lens items and aspheric surfaces included in a lens group is obtained, leading to advantage for cost reduction. In addition, effecting of decentering aberration at each lens group is rendered weak, which is desirable.

Further, the quantity of movement of each lens group at activation of variable power from the wide angle end to the telescopic end can be made small by avoiding the upper limit in conditional formula (4A) from being exceeded.

In addition, it is preferable that the fifth lens group of a zoom lens of the first aspect includes at least one aspheric surface.

The fifth lens group is arranged desirably at a location close to the forth lens group and at the wide angle end at the wide angle end in order to secure back focus with the exit pupil being set properly, and is moved desirably to the image side at the telescopic end for activation of variable power. Thus off-axis light fluxes change so that they pass through or by the lens center at the wide angle end while passing off and around the lens center at the telescopic end. Therefore, at least one surface of the fifth lens group is preferably an aspheric surface in order to make changes in aberration small, specifically, in order to make changes in curvature of field small, from the wide angle end to the telescopic end.

In addition, the third lens group of a zoom lens of the first aspect preferably consists of three lenses which are a positive lens, a negative lens and a positive lens in order from the object side toward the image side.

The third lens group preferably consists of positive, negative and positive lenses in order from the object side can have advantage for performing aberration correction through arranging the signs of refractive power symmetrically within the third lens group. In addition to this, advantage for size reduction is obtained because the principal point gap between a principal point of the third lens group having positive refractive power and a principal point of the forth lens group having negative refractive power can be made small.

It is also noted that either the above-mentioned forth lens group or the above-mentioned fifth lens group of a zoom lens of the first aspect moves preferably in an optical axis when focusing from a distant object toward a near object is done.

Such construction is advantageous for realizing magnification increase and size reduction. Lens groups used in focusing action can have a small weight and changes in various aberrations involved by focusing can be made comparatively small.

Further, with a zoom lens of the first aspect, all or a part of the lenses included in the foresaid third lens group preferably move in a decentering way with respect to the optical axis.

In view of prevention vibration, all of a part of the third lens group is preferably moved so as to have a motion component vertical to the optical axis to change the position of image-formation, thereby enabling the decentering aberration to have a small changing.

In addition, a zoom lens of the first aspect is preferably provided with an aperture stop which is disposed immediately in front of the object side and moves together with the third lens group as one body.

It is possible to provide good balance among zoom lens diameter size reduction, optimization of exit pupil position, securing of optical performance and simplification of driving mechanism.

Preferably, in addition, the foresaid first lens group includes a plurality of positive lens and at least one negative lens, and consists of at most three lens elements, while the foresaid second lens group includes a plurality of negative lens and at least one positive lens, and consists of at most three lens elements, and, the foresaid third lens group includes a plurality of positive lens and at least one negative lens, and consists of at most three lens elements, and, the foresaid forth lens group consists of one lens element, and, the foresaid fifth lens group consists of one lens element.

It is noted here that the term "lens element" means a lens body such that only two of the effective surfaces, which are located at the entrance side and the exit side respectively, are in contact with the air.

Such construction is advantageous for securing optical performance while size reduction at collapse of the zoom lens and refractive power suitable for each lens group are secured.

Next, a zoom lens of the first aspect satisfies preferably conditional formulas (1A) and (2A) given below.

$$0.05 < f1/ft < 0.54 \quad (1A):$$

$$-0.12 < f2/ft < -0.01 \quad (2A):$$

where f1 is the forementioned focal length of the first lens group: f2 is the forementioned focal length of the second lens group:
p: ft is the forementioned focal length of the zoom lens at the telescopic end.

More advantage for realizing size reduction and performance increase is obtained by deterring the values of focal length of the first lens group and the second lens group properly so as to satisfy the above conditional formulas (1A) and (2A).

Advantage for correction of spherical aberration at the telescopic end is obtained by suppressing the refractive power of the first lens group so as to avoid the lower limit in conditional formula (1A) from being exceeded.

The full length of the entire system at the telescopic end can be made small by securing the refractive power of the first lens group so as to avoid the upper limit in conditional formula (1A) from being exceeded, leading to advantage for size reduction.

Further, the quantity of movement of the second lens group is suppressed at zooming by securing the refractive power of the second lens group so as to avoid the lower limit in conditional formula (2A) from being exceeded, leading to advantage for reducing the full length and the diameter of the zoom lens.

To reduce curvature of field and astigmatism generated in the second lens group is realized by suppressing the refractive power of the second lens group so as to avoid the upper limit in conditional formula (2A) from being exceeded. Therefore, the numbers of lens items and aspheric surfaces necessary for correcting this aberration properly can be saved, with the result that the sensitivity of decrease in optical performance to manufacturing errors of the second lens group is reduced easily.

Furthermore, the zoom lens described above is preferably applied to an image pickup apparatus provided with an image pickup device having an image pickup plane which converts an optical image into electrical signals.

It is noted that constructions are described, if the zoom lens has a focusing function, under the state where focusing on the farthest object is realized, unless specifically commented otherwise.

A plurality of constructions picked up from the constructions described above may be employed at the same time with the required conditions satisfied, which is preferable because their functions are realized still firmly.

A zoom lens in accordance with a second aspect comprises a first lens group of positive refractive power, a second lens group of negative refractive power, a third lens group of positive refractive power, a forth lens group of negative refractive power wherein a fifth lens group of positive refractive power arranged sequentially from an object side toward an image side in the above mentioned order, and at least the first lens group, the second lens group, the third lens group and the forth lens group move respectively at activation of variable power from the wide angle end to the telescopic end, wherein a gap between the first lens group and the second lens group, a gap between the third lens group and the forth lens group and a gap between the forth lens group and the fifth lens group get larger respectively at the telescopic end than at the wide angle end, a gap between the second lens group and the third lens group gets smaller at the telescopic end than at the wide angle end, and conditional formulas (1A) and (2A) given below are satisfied:

$$0.05 < f1/ft < 0.54 \quad (1A)$$

$$-0.12 < f2/ft < -0.01 \quad (2A):$$

where f1 is the forementioned focal length of the first lens group: f2 is the forementioned focal length of the second lens group: ft is the forementioned focal length at the telescopic end.

Below described is the reason why the above construction is employed and on effects thereof.

Employed is a positive-forward-type zoom lens in which a lens group of positive refractive power is arranged at the closest side with respect to the object side, thereby resulting in being advantageous for securing variable power ratio and providing a lens group arrangement desirable as a zoom lens of wide angle of view and high variable power ratio. Activation of variable power is mainly can be performed by changing gaps between the first lens group and the second lens, between the second lens group and the third lens group and between the third lens group and the forth lens group. In addition, disposing of the fifth lens group of positive power enables the position of exit pupil to be set properly and the size across the first lens group through the forth lens group to be reduced in corporation with dispersion effect of the forth lens group of negative power. Thus advantage for constituting small-sized zoom lenses is obtained.

Further, when activation of variable power from the wide angle end toward telescopic end is performed, the gap between the first lens group and the second lens group is increased at the telescopic end than at the wide angle end, but movement is performed so that the gap between the second lens group and the third lens group decreased at the telescopic end than at the wide angle end, with the result that it is possible to avoid an entrance pupil from being too deep and to obtain advantage for reducing the diameter of the zoom lens.

Furthermore, a function of activating variable power by the third lens group can be secured by moving of the third lens group, which enables the second lens group to bear eased burden of activation of variable power. Thus it is possible to make the quantity of movement of the first lens group and the second lens group at zooming small, leading to advantage for decreasing the full lens length at the telescopic end.

In addition, the gaps between the third lens group and the forth lens group and between the forth lens group and the fifth lens group are increased respectively when activation of variable power from the wide angle end toward telescopic end is performed, thereby enabling also a lens system which is located closer to the image side than the third lens group to have function of activating variable power, with the result that further advantage for increasing variable power ratio to be obtained.

Furthermore, the construction is such that conditional formulas (1A) and (2A) are satisfied.

Still more advantage for reducing size and heightening optical performance is obtained by regulating the values of focal length of the first lens group and the second lens group properly so as to satisfy the above conditional formulas (1A) and (2A).

Advantage for correction of spherical aberration at the telescopic end is obtained by suppressing the refractive power of the first lens group so as to avoid the lower limit in conditional formula (1A) from being exceeded.

The full length of the entire system at the telescopic end can be made small by securing the refractive power of the first lens group so as to avoid the upper limit in conditional formula (1A) from being exceeded, leading to advantage for size reduction.

Further, the quantity of movement of the second lens group is suppressed at zooming by securing the refractive power of the second lens group so as to avoid the lower limit in conditional formula (2A) from being exceeded, leading to advantage for reducing the full length and the diameter of the zoom lens.

To reduce curvature of field and astigmatism generated in the second lens group is realized by suppressing the refractive power of the second lens group so as to avoid the upper limit in conditional formula (2A) from being exceeded. Therefore, the numbers of lens items and aspheric surfaces necessary for correcting this aberration properly can be saved, with the result that the sensitivity of decrease in optical performance to manufacturing errors of the second lens group is reduced easily.

Furthermore, it is more preferable that one or a plurality of constructions picked up from the constructions described below is employed at the same time with the required conditions satisfied.

Next, a zoom lens of the second aspect satisfies preferably conditional formula (3A) given below.

$$-0.30 < f4/ft < -0.10 \tag{3A}$$

where f4 is the forementioned focal length of the forth lens group.

With a zoom lens of the second aspect, at least the forth lens group or both the forth lens group and the fifth lens group are moved so that the gaps between the third lens group and the forth lens group and between the forth lens group and the fifth lens group increase at activation of variable power from wide angle end to telescopic end in order to realize a high variable power ratio.

It is preferable for assuring size reduction and optical performance still firmly to set the refractive power of the forth lens group properly so as to satisfy the above conditional formula (3A).

To reduce curvature of field on the wide angle end side is rendered easy by avoiding the lower limit in conditional formula (3A) from being exceeded, leading to advantage for maintaining high optical performance. In addition to this, more advantage for size reduction is obtained because the quantity of movement of the forth lens group at zooming can be made small.

To reduce curvature of field on the telescopic end is rendered easy by avoiding the upper limit in conditional formula (3A) from being exceeded, enabling optical performance to be assured over the full range of zooming.

In addition, the forth lens group of a zoom lens of the second aspect preferably consists of one negative lens.

As for the forth lens group, it can mainly take charge of sharing of the function of variable power at zooming and also correcting curvature of field over the full range of zooming. Regarding chromatic aberration, it can be cancelled by combination of the forth lens group of negative refractive power and the fifth lens group of positive refractive power. Therefore, even if the forth lens group is composed of one negative lens, correction of chromatic aberration is achievable over the full range of zooming. Such construction of the forth lens group consisting of one negative lens leads to size reduction of the zoom lens at collapse for being put away.

Next, a zoom lens of the second aspect satisfies preferably conditional formula (4A) given below.

$$0.5 < Dt/ft < 0.95 \tag{4A}:$$

where Dt is the distance from the surface top of the lens surface which is the closest to the object side to the image-formation plane at the telescopic end.

To restrain the refractive power of each lens group from being excessive is rendered easy and advantage for correcting the aberration in each lens group is obtained by avoiding the lower limit in conditional formula (4A) from being exceeded. As a result, advantage for reducing the number of lens items and aspheric surfaces included in a lens group is obtained, leading to advantage for cost reduction. In addition, effecting of decentering aberration at each lens group is rendered weak, which is desirable.

Further, the quantity of movement of each lens group at activation of variable power from the wide angle end to the telescopic end can be made small by avoiding the upper limit in conditional formula (4A) from being exceeded.

The fifth lens group of a zoom lens of the second aspect is preferably located so as to get closer to the image side at the telescopic end than at the wide angle end.

Preferably, with a zoom lens of the second aspect, at least the forth lens group or both the forth lens group and the fifth lens group are moved so that the gaps between the third lens group and the forth lens group and between the forth lens group and the fifth lens group increase, and thus the gap between the forth lens group and the fifth lens group is get large, at activation of variable power from wide angle end to telescopic end in order to realize a high variable power ratio. In this case, it is comparatively advantageous for size reduction to move the fifth lens group so as to get closer to the image side at the telescopic end than at the wide angle end because the quantity of movement of the forth lens group can be made small.

In addition, it is preferable that the fifth lens group of a zoom lens of the second aspect includes at least one aspheric surface.

The fifth lens group is arranged desirably at a location close to the forth lens group and at the wide angle end at the wide angle end in order to secure back focus with the exit pupil being set properly, and is moved desirably to the image side at the telescopic end for activation of variable power. Thus off-axis light fluxes change so that they pass through or by the lens center at the wide angle end while passing off and around the lens center at the telescopic end. Therefore, at least one surface of the fifth lens group is preferably an aspheric surface in order to make changes in aberration small, specifically, in order to make changes in curvature of field small, from the wide angle end to the telescopic end.

In addition, the third lens group of a zoom lens of the second aspect preferably consists of three lenses which are a positive lens, a negative lens and a positive lens in order from the object side toward the image side.

The third lens group preferably composed of positive, negative and positive lenses in order from the object side can have advantage for performing aberration correction through arranging the signs of refractive power symmetrically within the third lens group. In addition to this, advantage for size reduction is obtained because the principal point gap between a principal point of the third lens group having positive refractive power and a principal point of the forth lens group having negative refractive power can be made small.

Next, a zoom lens of the second aspect satisfies preferably conditional formula (1B) given below.

$$10 < ft/fw \quad (1B)$$

where fw is focal length at the wide angle end.

To secure variable power ratio so that the lower limit in conditional formula (1B) is not exceeded renders it possible to keep up with variation of scenes to be photographed, pictured or image-picked-up, which is desirable.

In addition, the third lens group and the forth lens group of a zoom lens of the second aspect move so as to get closer to the object side at the telescopic end than at the wide angle end the fifth lens group moves so as to get closer to the image side at the telescopic end than at the wide angle end, and conditional formulas (2B) and (3B) given below are preferably satisfied.

$$0.1 \leq \Delta 4Gd < \Delta 3Gd < 0.72 \quad (2B)$$

$$-3.0 < \Delta 5Gd/fw < -0.16 \quad (3B)$$

where $\Delta 3Gd$, $\Delta 4Gd$ and $\Delta 5Gd$ are the quantities of displacement of positions of the third lens group, the forth lens group and the fifth lens group at the telescopic end, respectively, with respect to the positions of the third lens group, the forth lens group and the fifth lens group at the wide angle end, respectively, wherein sign of displacement is defined as being positive when movement occurs toward the object side:

fw is focal length at the wide angle end.

With a zoom lens of the second aspect, the gaps between the third lens group and the forth lens group and between the forth lens group and the fifth lens group are increased at zooming from the wide angle end to the telescopic end. Here, more advantage for securing variable power ratio is obtained by moving the third lens group and the forth lens group toward the object side and moving the fifth lens group toward the image side.

Here, in addition, it is preferable that the above conditional formulas (2B) and (3B) are satisfied.

By satisfying conditional formula (2B), the quantities of movement of the third lens group and the forth lens group during zooming from the wide angle end toward the telescopic end are rendered proper, with the result that further advantage for both increasing magnification ratio and size reduction.

To secure the diverging effect of the forth lens group is rendered easy by securing displacement of the forth lens group with respect to displacement of the third lens group during movement from wide angle end to telescopic end properly so that the lower limit in conditional formula (2B) is not exceeded, with the result that advantage for securing back focus at the telescopic end and variable power ratio.

Further, to suppress the diverging effect of the forth lens group is rendered easy by securing displacement of the forth lens group with respect to displacement of the third lens group during movement from wide angle end to telescopic end properly so that the upper limit in conditional formula (2B) is not exceeded, with the result that advantage for restraining back focus at the telescopic end from being excessive and for size reduction.

In addition, further advantage for both increasing magnification ratio and size reduction is obtained by satisfying conditional formula (3B).

To restrain curvature of field on the wide angle end side is rendered easy by avoiding the lower limit in conditional formula (3B) from being exceeded, leading to maintaining optical performance.

On the other hand, to restrain curvature of field on the telescopic end side is rendered easy by avoiding the upper limit in conditional formula (3B) from being exceeded, leading to maintaining optical performance over the entire variable power range. In addition, the quantity of movement of the forth lens group during activation of variable power can be also made small by securing the quantity of movement of the fifth lens group toward the image side during zooming, leading to size reduction.

In addition, a zoom lens of the second aspect satisfies preferably conditional formula (4B) given below.

$$1.5 < \Delta \beta 3G < 4.0 \quad (4B)$$

where $\Delta \beta 3G$ is defined as $\Delta \beta 3G = \beta 3t/\beta 3w$, wherein $\beta 3t$ is lateral magnification of the third lens group at the wide angle end and $\beta 3w$ is lateral magnification of the third lens group at the telescopic end.

Still more advantage for both increasing variable power ratio and size reduction is obtained by satisfying conditional formula (4B).

Conditional formula (4B) regulates properly the share of variable power to be assigned to the third lens group inactivation of variable power from the wide angle end to the telescopic end.

To secure the share of variable power assigned to the third lens group by avoiding the lower limit in conditional formula (4B) enables the share of variable power assigned to the second lens group to be suppressed and can avoids the second lens group from having an excessive quantity of movement, with the result that advantage for reducing the total length and for decreasing the lens diameter of the first lens group.

To suppress the share of variable power assigned to the third lens group by avoiding the upper limit in conditional formula (4B) enables the quantity of movement of the third lens group to be suppressed easily, leading to thickness reduction of the zoom lens at collapse of the zoom lens. In addition to this, securing of brightness at the telescopic end is rendered easy and restraining of position changes of exit pupil at activation of variable power is rendered easy. Otherwise, restraining of the refractive power of the third lens group is rendered easy, with the result that reduction of aberration caused by the third lens group is rendered easy and advantage for securing image-formation performance.

Next, a zoom lens of the second aspect satisfies preferably conditional formula (5B) given below.

$$-1.5 < f4/fs < -0.2 \quad (5B)$$

where f4 is the focal length of the forth lens group;
fs is defined as is $=\Delta\sqrt{(fw \times ft)}$:
fw is the focal length of the zoom lens at the wide angle end.

More advantage for realizing increase in magnification and decrease in size is obtained by satisfying conditional formula (5B).

To restrain curvature of field on the wide angle end side is rendered easy by avoiding the lower limit in conditional formula (5B) from being exceeded, leading to maintaining optical performance. In addition to this, Still more advantage for size reduction is obtained because the quantity of movement of the forth lens group can be made small.

To restrain curvature of field on the telescopic end angle end side is rendered easy by avoiding the upper limit in conditional formula (5B) from being exceeded, leading to being difficult to maintaining optical performance over the full range of zooming.

It is also noted that either the above-mentioned forth lens group or the above-mentioned fifth lens group of a zoom lens of the second aspect moves preferably in an optical axis when focusing from a distant object toward a near object is done.

Such construction is advantageous for realizing magnification increase and size reduction. Lens groups used in focusing action can have a small weight and changes in various aberrations involved by focusing can be made comparatively small.

Further, with a zoom lens of the second aspect, all or a part of the lenses included in the foresaid third lens group preferably move in a decentering way with respect to the optical axis.

In view of prevention of vibration, all of a part of the third lens group is preferably moved so as to have a motion component vertical to the optical axis to change the position of image-formation, thereby enabling the decentering aberration to have a small changing.

In addition, a zoom lens of the second aspect is preferably provided with an aperture stop which is disposed immediately in front of the object side and moves together with the third lens group as one body.

It is possible to provide good balance among zoom lens diameter size reduction, optimization of exit pupil position, securing of optical performance and simplification of driving mechanism.

It is preferable that the foresaid first lens group, the foresaid third lens group and the foresaid forth lens group move so as to get closer to the object side at the telescopic end than at the wide angle end while the foresaid fifth lens group moves so as to get closer to the image side at the telescopic end than at the wide angle end.

Such construction is advantageous for both reducing the full length and securing variable power ratio.

Preferably, in addition, the foresaid first lens group includes a plurality of positive lens and at least one negative lens, and consists of at most three lens elements, while the foresaid second lens group includes a plurality of negative lens and at least one positive lens, and consists of at most three lens elements, and, the foresaid third lens group includes a plurality of positive lens and at least one negative lens, and consists of at most three lens elements, and, the foresaid forth lens group consists of one lens element, and, the foresaid fifth lens group consists of one lens element.

It is noted here that the term "lens element" means a lens body such that only two of the effective surfaces, which are located at the entrance side and the exit side respectively, are in contact with the air.

Such construction is advantageous for securing optical performance while size reduction at collapse of the zoom lens and refractive power suitable for each lens group are secured.

Furthermore, the zoom lens described above is preferably applied to an image pickup apparatus provided with an image pickup device having an image pickup plane which converts an optical image into electrical signals.

It is noted that constructions are described, if the zoom lens has a focusing function, under the state where focusing on the farthest object is realized, unless specifically commented otherwise.

A plurality of constructions picked up from the constructions described above may be combined with the required conditions satisfied, which is preferable because their functions are realized still firmly.

A zoom lens in accordance with a third aspect comprises a first lens group of positive refractive power, a second lens group of negative refractive power, a third lens group of positive refractive power, a forth lens group of negative refractive power and a fifth lens group of positive refractive power arranged sequentially from an object side toward an image side in the above mentioned order, the first lens group including at least one positive lens and at least one negative lens, wherein a gap between the first lens group and the second lens group, a gap between the third lens group and the forth lens group and a gap between the forth lens group and the fifth lens group get larger respectively at the telescopic end than at the wide angle end while a gap between the second lens group and the third lens group gets smaller at the telescopic end than at the wide angle end at activation of variable power from the wide angle end to the telescopic end, and, the zoom lens is characterized by that the conditional formulas (1C), (2C) and (3C) given below are satisfied:

$$Vd1n < 40 \quad (1C)$$

$$80 < Vd1p \quad (2C)$$

$$\theta gF1n + 0.00162 Vd1n - 0.6415 < 0 \quad (3C):$$

where $Vd1n$ is Abbe number at d line of the above-mentioned at least one negative lens in the foresaid first lens group:

$Vd1p$ is Abbe number at d line of the above-mentioned at least one positive lens in the foresaid first lens group:

$\theta gF1n$ is partial dispersion ratio between g line and F line:

$\theta gF1n$ is expressed by $\theta gF1n = (ng1n - nF1n)/(nF1n - nC1n)$, wherein $Ng1n$, $nF1n$, $nC1n$ are refractive indexes at g line, F line and C line of the above-mentioned at least one negative lens, respectively.

Below described is the reason why the above construction is employed and on effects thereof.

A zoom lens of the third aspect employs a positive-forward-type zoom lens in which a lens group of positive refractive power is arranged at the closest side with respect to the object side, thereby being advantageous for securing variable power ratio and providing a lens group arrangement desirable as a zoom lens of wide angle of view and high variable power ratio. Activation of variable power is mainly can be performed by changing gaps between the first lens group and the second lens, between the second lens group and the third lens group and between the third lens group and the forth lens group. In addition, disposing of the fifth lens group of positive power enables the position of exit pupil to be set properly and the size across the first lens group through the forth lens group to be reduced in corporation with diverging effect of the forth lens group negative power of. Thus advantage for constituting small-sized zoom lenses is obtained.

Further, with a zoom lens of the third aspect, when activation of variable power from the wide angle end toward telescopic end is performed, the gap between the first lens group and the second lens group is increased at the telescopic end than at the wide angle end, but movement is performed so that the gap between the second lens group and the third lens group decreased at the telescopic end than at the wide angle end, with the result that it is possible to avoid an entrance pupil from being too deep and to obtain advantage for reducing the diameter of the zoom lens. In addition to this, a function of activating variable power by the third lens group can be secured by changing the gap between the second lens group and the third lens group, Furthermore, with a zoom lens of the third aspect, the gaps between the third lens group and the forth lens group and between the forth lens group and the fifth lens group are increased respectively when activation of variable power from the wide angle end toward telescopic end is performed, thereby enabling also a lens system which is located closer to the image side than the third lens group to have function of activating variable power, with the result that further advantage for increasing variable power ratio to be obtained.

Furthermore, according to a feature of a zoom lens of the third aspect, at least one negative lens and at least one positive lens of the first lens group satisfy conditional formulas (1C), (2C) and (3C). Such construction provides advantage for correction of chromatic aberration under situation such that magnification heightening and size reduction actualized.

Heightening of variable power ratio, namely, elongating of focal length at the telescopic end tends to cause the first lens group to generate increased chromatic aberration of 1st order (on-axis chromatic aberration, magnification chromatic aberration), and further, also increased chromatic spectrum of 2nd order (residual chromatic aberration). It is preferable to employ such a material of high dispersion that conditional formula (1C) is satisfied as a material of which at least one negative lens included in the first lens group is made in order to correct chromatic aberration of 1st order. And such a material of low dispersion that conditional formula (2C) is satisfied is preferably employed as a material of which at least one positive lens included in the first lens group is made. Here, it is noted that the material satisfying conditional formula (2C) is of high anomalous dispersion.

On the other hand, if a first lens group of high refractive power of is employed for size reduction, generation of chromatic spectrum of 2nd is resultantly promoted because each lens has resultantly an increased refractive power. Therefore, it is advantageous for correcting chromatic spectrum of 2nd to employ a material of partial dispersion ratio satisfying conditional formula (3C) as a material of which a negative lens included in the first lens group is made.

Dispersion of a negative lens in the first lens group is secured and chromatic aberration of 1st order generated at a positive lens in the first lens group can be cancelled effectively by avoiding the upper limit in conditional formula (1C) from being exceeded.

Dispersion of a positive lens in the first lens group can be made small and chromatic aberration generated of 1st order generated at the positive lens in the first lens group made small effectively by avoiding the lower limit in conditional formula (2C) from being exceeded.

Obtained are advantage for correction of chromatic spectrum of 2nd order and advantage for heightening optical performance at the telescopic end in high magnification zooming by avoiding the upper limit in conditional formula (3C) from being exceeded.

Satisfaction of conditional formula (3C) means that the material has a small partial dispersion ratio to a standard line that is defined by using vd (Abbe number at d line) and $\theta gF$ (partial dispersion ratio between g line and F line) of NSL7 ($vd=60.49$, $\theta gF=0.5436$) and PBM2 ($vd=36.26$, $\theta gF=0.5828$) provided by OHARA INC. Increased effect of correction of chromatic aberration is obtained by employing a material of a small partial dispersion ratio satisfying conditional formula (3C) in a range of Abbe number meeting conditional formula (1C) as a material of which the negative lens is made, which is preferable.

In addition to the above description, it is preferable that one of the contractions described below is employed or a plurality of them is employed at the same time with the required conditions satisfied.

With a zoom lens of the third aspect, the foresaid at least one negative lens in the first lens group satisfies preferably conditional formula (4C).

$$1.80 < Nd1n \quad (4C)$$

where Nd1n is refractive index of the foresaid at least one negative lens in the first lens group at d line.

Conditional formula (4C) is a conditional formula which specifies the material of which a negative lens in the first lens group made. By avoiding the lower limit in conditional formula (4C) from being exceed, the curvature of the negative lens can be rendered small and, in particular, advantage for reducing aberration which would cause curvature of field at the telescopic end is obtained.

Next, it is preferable that the fifth lens group of a zoom lens of the third aspect is movable at focusing from a long distance to a short distance and includes at least one positive lens satisfying conditional formula (5C) given below.

$$70 < Vd5p \quad (5C)$$

where Vd5p is Abbe number at d line of the foresaid positive lens in the fifth lens group.

Changes in various aberrations involved by focusing can be made comparatively small by performing focusing through movement of the fifth lens group in an optical axis direction.

Conditional formula (5C) specifies the Abbe number of the positive lens in the fifth lens group which is preferable for suppressing changes in chromatic aberration at focusing. The fifth lens group, is apt to have a small lateral magnification because back focus is secured by keeping the exit pupil apart from the image plane, As a result, the quantity of lens movement on the optical axis brought by focusing tends to be large, and specifically, focusing at the telescopic end tends to cause changes in chromatic aberration to be generated. Thus, therefore, if a material of small dispersion is employed as the material of which the positive lens in the fifth lens group is made, chromatic aberration brought by the fifth lens group individually can be made small, with the result that changes in chromatic aberration brought by focusing can be made small.

Changes in chromatic aberration at focusing at the telescopic end can be made small by avoiding the lower limit in conditional formula (5C) from being exceeded, resulting in being advantageous for both heightening variable power ratio and securing optical performance.

Next, it is preferable that a zoom lens of the third aspect is satisfies conditional formula (1A) given below.

$$0.05 < f1/ft < 0.54 \quad (1A)$$

where f1 is the forementioned focal length of the first lens group.

Advantage for correction of spherical aberration at the telescopic end is obtained by suppressing the refractive power of the first lens group so as to avoid the lower limit in conditional formula (1A) from being exceeded.

The full length of the entire system at the telescopic end can be made small by securing the refractive power of the first lens group so as to avoid the upper limit in conditional formula (1A) from being exceeded, leading to advantage for size reduction.

Next, a zoom lens of the first aspect satisfies preferably conditional formulas (2A) given below.

$$-0.12 < f2/ft < -0.01 \quad (2A)$$

where f2 is the foresaid focal length of the zoom lens at the telescopic end.

Further, the quantity of movement of the second lens group is suppressed at zooming by securing the refractive power of the second lens group so as to avoid the lower limit in conditional formula (2A) from being exceeded, leading to advantage for reducing the full length and the diameter of the zoom lens.

To reduce curvature of field and astigmatism generated in the second lens group is realized by suppressing the refractive power of the second lens group so as to avoid the upper limit in conditional formula (2A) from being exceeded. Therefore, the numbers of lens items and aspheric surfaces necessary for correcting this aberration properly can be saved, with the result that the sensitivity of decrease in optical performance to manufacturing errors of the second lens group is reduced easily.

Next, a zoom lens of the third aspect satisfies preferably conditional formula (3A) given below.

$$-0.30<f4/ft<-0.10 \quad (3A):$$

where f4 is the forementioned focal length of the forth lens group.

At least the forth lens group or both the forth lens group and the fifth lens group are moved so that the gaps between the third lens group and the forth lens group and between the forth lens group and the fifth lens group increase at activation of variable power from wide angle end to telescopic end in order to realize a high variable power ratio.

It is preferable for assuring size reduction and optical performance still firmly to set the refractive power of the forth lens group properly so as to satisfy the above conditional formula (3A).

To reduce curvature of field on the wide angle end side is rendered easy by avoiding the lower limit in conditional formula (3A) from being exceeded, leading to advantage for maintaining high optical performance. In addition to this, more advantage for size reduction is obtained because the quantity of movement of the forth lens group at zooming can be made small.

To reduce curvature of field on the telescopic end is rendered easy by avoiding the upper limit in conditional formula (3A) from being exceeded, enabling optical performance to be assured over the full range of zooming.

In addition, the forth lens group of a zoom lens of the third aspect preferably consists of one negative lens.

As for the forth lens group, it can mainly take charge of sharing of the function of variable power at zooming and also correcting curvature of field over the full range of zooming. Regarding chromatic aberration, it can be cancelled by combination of the forth lens group of negative refractive power and the fifth lens group of positive refractive power. Therefore, even if the forth lens group is composed of one negative lens, correction of chromatic aberration is achievable over the full range of zooming. Such construction of the forth lens group consisting of one negative lens leads to size reduction of the zoom lens at collapse for being put away.

Next, a zoom lens of the third aspect satisfies preferably conditional formula (4A) given below.

$$0.5<Dt/ft<0.95 \quad (4A):$$

where Dt is the distance from the surface top of the lens surface which is the closest to the object side to the image-formation plane at the telescopic end.

To restrain the refractive power of each lens group from being excessive is rendered easy and advantage for correcting the aberration in each lens group is obtained by avoiding the lower limit in conditional formula (4A) from being exceeded. As a result, advantage for reducing the number of lens items and aspheric surfaces included in a lens group is obtained, leading to advantage for cost reduction. In addition, effecting of decentering aberration at each lens group is rendered weak, which is desirable.

Further, the quantity of movement of each lens group at activation of variable power from the wide angle end to the telescopic end can be made small by avoiding the upper limit in conditional formula (4A) from being exceeded.

In addition, it is preferable that the fifth lens group of a zoom lens of the third aspect includes at least one aspheric surface.

Preferably, with a zoom lens of the third aspect, at least the forth lens group or both the forth lens group and the fifth lens group are moved so that the gaps between the third lens group and the forth lens group and between the forth lens group and the fifth lens group increase at activation of variable power from wide angle end to telescopic end in order to realize a high variable power ratio, thereby the gap between the forth lens group and the fifth lens group being increase. In this case, it is better for obtaining advantage for size reduction to move the fifth lens group as to be closer to the image side at the telescopic end than at the wide because the quantity of the forth lens group decrease.

In addition, it is preferable that the fifth lens group of a zoom lens of the third aspect includes at least one aspheric surface.

The fifth lens group is arranged desirably at a location close to the forth lens group and at the wide angle end at the wide angle end in order to secure back focus with the exit pupil being set properly, and is moved desirably to the image side at the telescopic end for activation of variable power. Thus off-axis light fluxes change so that they pass through or by the lens center at the wide angle end while passing off and around the lens center at the telescopic end. Therefore, at least one surface of the fifth lens group is preferably an aspheric surface in order to make changes in aberration small, specifically, in order to make changes in curvature of field small, from the wide angle end to the telescopic end.

The foresaid third lens group of the third aspect preferably composed of three lenses which are positive, negative and positive lenses arranged in order from the object side.

The third lens group preferably consists of positive, negative and positive lenses in order from the object side can have advantage for performing aberration correction through arranging the signs of refractive power symmetrically within the third lens group. In addition to this, advantage for size reduction is obtained because the principal point gap between a principal point of the third lens group having positive refractive power and a principal point of the forth lens group having negative refractive power can be made small.

Next, a zoom lens of the third aspect satisfies preferably conditional formula (1B) given below.

$$10<ft/fw \quad (1B):$$

where fw is focal length at the wide angle end.

To secure variable power ratio so that the lower limit in conditional formula (1B) is not exceeded renders it possible to keep up with variation of scenes to be photographed, pictured or image-picked-up, which is desirable.

In addition, the third lens group and the forth lens group of a zoom lens of the third aspect move so as to get closer to the object side at the telescopic end than at the wide angle end the fifth lens group moves so as to get closer to the image side at the telescopic end than at the wide angle end, and conditional formulas (2B) and (3B) given below are preferably satisfied.

$$0.1<\Delta 4Gd<\Delta 3Gd<0.72 \quad (2B)$$

$$-3.0<\Delta 5Gd/fw<-0.16 \quad (3B):$$

where $\Delta 3Gd$, $\Delta 4Gd$ and $\Delta 5Gd$ are the quantities of displacement of positions of the third lens group, the forth lens group and the fifth lens group at the telescopic end, respectively, with respect to the positions of the third lens group, the forth lens group and the fifth lens group at the wide angle end, respectively, wherein sign of displacement is defined as being positive when movement occurs toward the object side:

fw is focal length at the wide angle end.

With a zoom lens of the third aspect, the gaps between the third lens group and the forth lens group and between the forth lens group and the fifth lens group are increased at zooming from the wide angle end to the telescopic end. Here, more advantage for securing variable power ratio is obtained by moving the third lens group and the forth lens group toward the object side and moving the fifth lens group toward the image side.

Here, in addition, it is preferable that the above conditional formulas (2B) and (3B) are satisfied.

By satisfying conditional formula (2B), the quantities of movement of the third lens group and the forth lens group during zooming from the wide angle end toward the telescopic end are rendered proper, with the result that further advantage for both increasing magnification ratio and size reduction.

To secure the diverging effect of the forth lens group is rendered easy by securing displacement of the forth lens group with respect to displacement of the third lens group during movement from wide angle end to telescopic end properly so that the lower limit in conditional formula (2B) is not exceeded, with the result that advantage for securing back focus at the telescopic end and variable power ratio.

Further, to suppress the diverging effect of the forth lens group is rendered easy by securing displacement of the forth lens group with respect to displacement of the third lens group during movement from wide angle end to telescopic end properly so that the upper limit in conditional formula (2B) is not exceeded, with the result that advantage for restraining back focus at the telescopic end from being excessive and for size reduction.

In addition, further advantage for both increasing magnification ratio and size reduction is obtained by satisfying conditional formula (3B).

To restrain curvature of field on the wide angle end side is rendered easy by avoiding the lower limit in conditional formula (3B) from being exceeded, leading to maintaining optical performance.

On the other hand, to restrain curvature of field on the telescopic end side is rendered easy by avoiding the upper limit in conditional formula (3B) from being exceeded, leading to maintaining optical performance over the entire variable power range. In addition, the quantity of movement of the forth lens group during activation of variable power can be also made small by securing the quantity of movement of the fifth lens group toward the image side during zooming, leading to size reduction.

In addition, a zoom lens of the third aspect satisfies preferably conditional formula (4B) given below.

$$1.5 < \Delta\beta 3G < 4.0 \tag{4B}$$

where $\Delta\beta 3G$ is defined as $\Delta\beta 3G = \beta 3t/\beta 3w$, wherein $\beta 3t$ is lateral magnification of the foresaid third lens group at the wide angle end and $\beta 3w$ is lateral magnification of the foresaid third lens group at the telescopic end.

Still more advantage for both increasing variable power ratio and size reduction is obtained by satisfying conditional formula (4B).

Conditional formula (4B) regulates properly the share of variable power to be assigned to the third lens group in activation of variable power from the wide angle end to the telescopic end.

To secure the share of variable power assigned to the third lens group by avoiding the lower limit in conditional formula (4B) enables the share of variable power assigned to the second lens group to be suppressed and can avoids the second lens group from having an excessive quantity of movement, with the result that advantage for reducing the total length and for decreasing the lens diameter of the first lens group.

To suppress the share of variable power assigned to the third lens group by avoiding the upper limit in conditional formula (4B) enables the quantity of movement of the third lens group to be suppressed easily, leading to thickness reduction of the zoom lens at collapse of the zoom lens. In addition to this, securing of brightness at the telescopic end is rendered easy and restraining of position changes of exit pupil at activation of variable power is rendered easy. Otherwise, restraining of the refractive power of the third lens group is rendered easy, with the result that reduction of aberration caused by the third lens group is rendered easy and advantage for securing image-formation performance.

Next, a zoom lens of the third aspect satisfies preferably conditional formula (5B) given below.

$$-1.5 < f4/fs < -0.2 \tag{5B}$$

where f4 is the focal length of the forth lens group;

fs is defined as is=√(fw×ft):

fw is the focal length of the zoom lens at the wide angle end.

More advantage for realizing increase in magnification and decrease in size is obtained by satisfying conditional formula (5B).

To restrain curvature of field on the wide angle end side is rendered easy by avoiding the lower limit in conditional formula (5B) from being exceeded, leading to maintaining optical performance. In addition to this, Still more advantage for size reduction is obtained because the quantity of movement of the forth lens group can be made small.

To restrain curvature of field on the telescopic end angle end side is rendered easy by avoiding the upper limit in conditional formula (5B) from being exceeded, leading to being difficult to maintaining optical performance over the full range of zooming.

It is also noted that either the above-mentioned forth lens group or the above-mentioned fifth lens group of a zoom lens of the third aspect moves preferably in an optical axis when focusing from a distant object toward a near object is done.

Such construction is advantageous for realizing magnification increase and size reduction. Lens groups used in focusing action can have a small wight and changes in various aberrations involved by focusing can be made comparatively small.

Further, with a zoom lens of the third aspect, all or a part of the lenses included in the foresaid third lens group preferably move in a decentering way with respect to the optical axis.

In view of prevention of vibration is intended, all of a part of the third lens group is preferably moved so as to have a motion component vertical to the optical axis to change the position of image-formation, thereby enabling the decentering aberration to have a small changing.

In addition, a zoom lens of the third aspect is preferably provided with an aperture stop which is disposed immediately in front of the object side and moves together with the third lens group as one body.

It is possible to provide good balance among zoom lens diameter size reduction, optimization of exit pupil position, securing of optical performance and simplification of driving mechanism.

It is preferable that the foresaid first lens group, the foresaid third lens group and the foresaid forth lens group move so as to get closer to the object side at the telescopic end than at the wide angle end while the foresaid fifth lens group moves so as to get closer to the image side at the telescopic end than at the wide angle end.

Such construction is advantageous for both reducing the full length and securing variable power ratio.

Preferably, in addition, the foresaid first lens group includes a plurality of positive lens and at least one negative lens, and consists of at most three lens elements, while the foresaid second lens group includes a plurality of negative lens and at least one positive lens, and consists of at most three lens elements, and, the foresaid third lens group includes a plurality of positive lens and at least one negative lens, and consists of at most three lens elements, and, the foresaid forth lens group consists of one lens element, and, the foresaid fifth lens group consists of one lens element.

It is noted here that the term "lens element" means a lens body such that only two of the effective surfaces, which are located at the entrance side and the exit side respectively, are in contact with the air.

Such construction is advantageous for securing optical performance while size reduction at collapse of the zoom lens and refractive power suitable for each lens group are secured.

Furthermore, the zoom lens de scribed above is preferably applied to an image pickup apparatus provided with an image pickup device having an image pickup plane which converts an optical image into electrical signals.

It is noted that contractions are described, if the zoom lens has a focusing function, under the state where focusing on the farthest object is realized, unless specifically commented otherwise.

A plurality of contractions picked up from the contractions described above may be combined with the required conditions satisfied, which is preferable because their functions are realized still firmly.

In addition, regarding the respective above-mentioned conditional formulas, it is preferable that the functions thereof are assured more firmly by setting lower limit values or upper limit values as given below.

Regarding conditional formula (1A) it is more preferable to employ 0.1, and specifically, 0.3 as the lower limit:

it is more preferable to employ 0.5, or specifically, 0.45 as the upper limit,

Regarding conditional formula (2A), it is more preferable to employ −0.10, and specifically, −0.08 as the lower limit:

it is more preferable to employ −0.03, and specifically, −0.04 as the upper limit.

Regarding conditional formula (3A), it is more preferable to employ −0.25, and specifically, −0.2 is employed as the lower limit.

Regarding conditional formula (4A), it is more preferable to employ 0.6, an specifically, 0.7 as the lower limit:

it is more preferable to employ 0.90, and specifically, 0.80 as the upper limit.

Regarding conditional formula (1B), it is more preferable to employ 15, and specifically, 20 as the lower limit:

it is preferable that 40 is set as the upper limit and brightness at the telescopic end is secured by avoiding this from being exceeded:

it is more preferable to employ 30, and specifically, 25 as the upper limit.

Regarding conditional formula (2B), it is more preferable to employ 0.15, and specifically, 0.18 as the lower limit:

it is more preferable to employ 0.7, and specifically, 0.68 as the upper limit.

Regarding conditional formula (3B), it is more preferable to employ −2.0, and specifically, −1.0 as the lower limit:

it is more preferable to employ −0.3, and specifically, −0.35 as the upper limit.

Regarding conditional formula (4B), it is more preferable to employ 1.8, and specifically, 2.2 as the lower limit:

it is more preferable to employ 3.5, and specifically, 3.2 as the upper limit.

Regarding conditional formula (5B), it is more preferable to employ −1.2, and specifically, −0.9 as the lower limit:

it is more preferable to employ −0.35, and specifically, −0.5 as the upper limit.

Regarding conditional formula (1C), it is preferable that 20 is set as the lower limit and avoid this from being exceeded in view of material cost:

it is more preferable to employ 39, and specifically, 38 as the upper limit.

Regarding conditional formula (2C), it is preferable to employ 81, and specifically, 81.5 as the lower limit:

it is preferable that 100 is set as the upper limit and avoid this from being exceeded in view of material cost.

Regarding conditional formula (3C), it is preferable that −0.007 is set as the lower limit and avoid this from being exceeded in view of material cost:

it is more preferable to employ −0.001, and specifically, −0.002 as the upper limit.

Regarding conditional formula (4C), it is preferable to employ 1.83, and specifically, 1.9 as the lower limit:

it is preferable that 2.5 is set as the upper limit and avoid this from being exceeded in view of material cost.

Regarding conditional formula (5C), it is preferable to employ 75, and specifically, 80 as the lower limit:

it is preferable that 100 is set as the upper limit and avoid this from being exceeded in view of material cost.

Still other objects and advantages of the invention will in part be obvious and will in part be apparent from the specification.

The invention accordingly comprises the features of construction, combinations of elements, and arrangement of parts which will be exemplified in the construction hereafter set forth, and the scope of the invention will be indicated in the claims.

BRIEF DESCRIPTION OF THE DRAWINGS

FIG. 10 is an illustration of aberration of the zoom lens of Example 3;

FIG. 11 is an illustration of aberration of the zoom lens of Example 4;

FIG. 12 is an illustration of aberration of the zoom lens of Example 5;

FIG. 13 is an illustration of aberration of the zoom lens of Example 6;

FIG. 14 is an illustration of aberration of the zoom lens of Example 7;

DESCRIPTION OF EXEMPLARY EMBODIMENTS

Each of the embodiments described below provides a wide angle and high variable power zoom lens which has a 35 mm-film-size-at-image-plane-converted focal length falling roughly in a range from 24 mm to 28 mm at the wide angle end and a variable power ratio of 22 times or more.

In addition, focusing is performed by moving either the forth lens group or the fifth lens group in an optical axis direction, thereby aiming at reducing electric power consumption and increasing operation speed at autofocusing.

Further, the third lens group may be moved in a decentering way together with an aperture stop as one body in order to reduce image blurring caused by hand-moving of the camera operator.

Given are description on the zoom lenses of Examples 1 through 7 with the drawings referred to. FIGS. 1 to 7 are developments giving cross-sectional views of the zoom lenses of Examples 1 to 7 along the optical axes respectively thereof. In each figure, (a) indicates a state at wide angle end (WE), (b) indicating an intermediate state (ST) and (c) indicating a state at the telescopic end (TE).

Two flat plates disposed immediately in front of an image pickup plane are a low-pass filter F to which IR-cut coat is applied and a cover glass of an image pickup C.

Figure 1A:
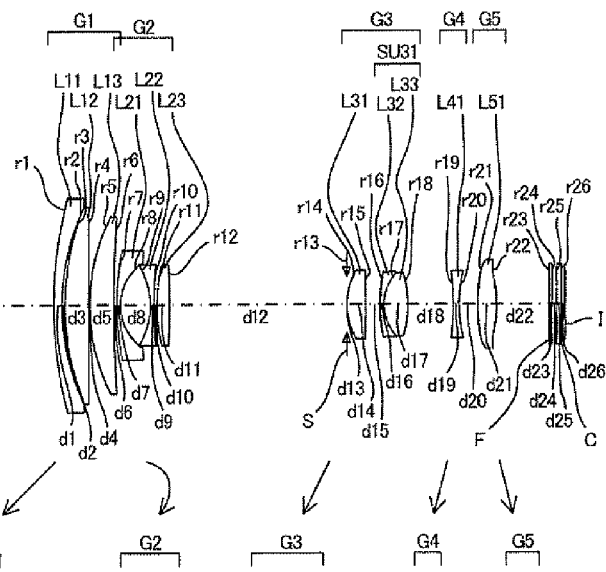
FIG. 1 is a development showing a cross section of Example 1 of a zoom lens according to the present invention along an optical axis.
Figure 1B:
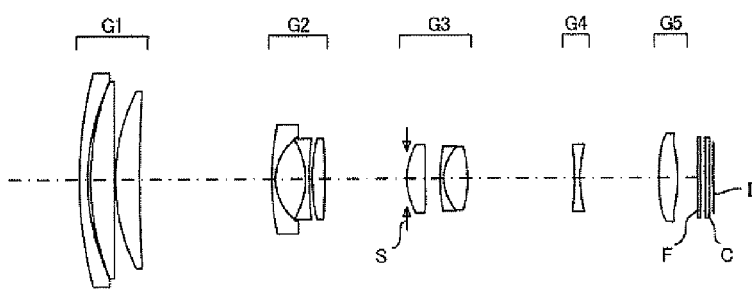
Figure 1C:
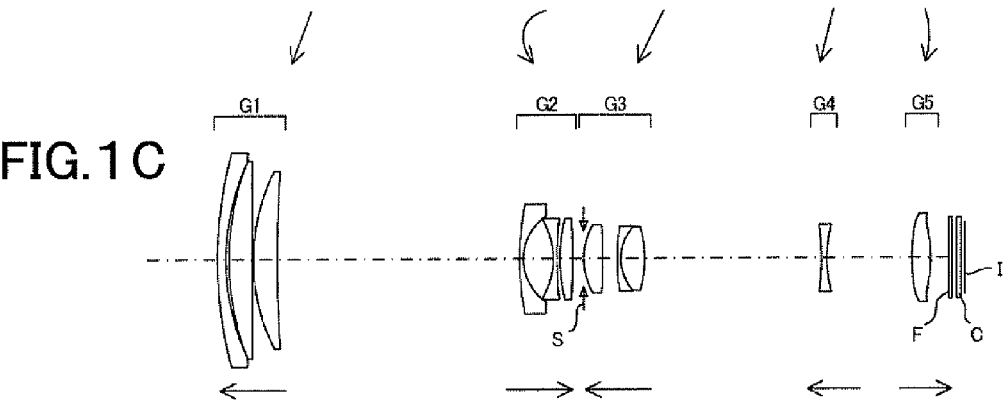

FIG. 1 gives a cross-sectional view of the zoom lens of Example 1.

As shown in FIG. 1, the zoom lens of Example 1 consists of a first lens group G1 of positive refractive power, a second lens group G2 of negative refractive power, a third lens group G3 of positive refractive power, a forth lens group G4 of negative refractive power and a fifth lens group G5 of positive refractive power in order from the object side toward the image side. In the illustration, S is an aperture stop, F being a low-pass filter, C being a cover glass and I being an image plane.

The first lens group G1 consists of a negative meniscus lens L11 with a convex face directed to the object side, a positive plane-convex lens L12 with a convex face directed to the object side and a positive meniscus lens L13 with a convex face directed to the object side, which are arranged in order from the object side toward the image side.

The second lens group G2 consists of a negative meniscus lens L21 with a convex face directed to the object side, a negative biconcave lens L22 and a positive biconvex lens L23, which are arranged in order from the object side toward the image side.

The third lens group G3 consists of a positive biconvex lens L31 and a junction lens SU31 composed of a negative meniscus lens L32 with a convex face directed to the object side and a positive biconvex lens L33, which are arranged in order from the object side toward the image side. In addition, an aperture stop S is arranged at the object side of the third lens group G3.

The forth lens group G4 consists of one negative biconcave lens L41.

The fifth group G5 consists of one positive biconvex lens L51.

Described is on the operation of the zoom lenses of Example 1. In zooming operation, the first lens group G1, the second lens group G2, the third lens group G3, the forth lens group G4 and the fifth lens group G5 move independently, respectively.

Now described is on the movements of the respective lens groups at activation of variable power from wide angle end to the telescopic end.

The first lens group G1 moves only toward the object side from the wide angle end as far as the telescopic end so as to be distant increasingly from the second lens group G2.

The second lens group G2 moves toward the image side from the wide angle end as far as a wide angle end side changing point so as to be distant increasingly from the first lens group G1 and decreasingly from the third lens group G3, and moves toward the object side from the wide angle end side changing point as far as a telescopic end side changing point so as to be distant increasingly from the first lens group G1 and decreasingly from the third lens group G3, and moves toward the image side from the telescopic end side changing point as far as the telescopic end so as to be distant increasingly from the first lens group G1 and decreasingly from the third lens group G3. The position gotten at the telescopic end is closer to the image side at the telescopic end than at the wide angle end.

The third lens group G3 moves together with the aperture stop S toward the object side from the wide angle end as far as the telescopic end side changing point so as to be distant decreasingly from the second lens group G2 and increasingly from the forth lens group G4, and moves toward the object side from the telescopic end side changing point as far as the telescopic end so as to be distant decreasingly from the second lens group G2 and decreasingly from the forth lens group G4.

The forth lens group G4 moves toward the object side from the wide angle end as far as the telescopic end side changing point so as to be distant increasingly from the third lens group G3 and increasingly from the fifth lens group G5, and moves toward the object side from the telescopic end side changing point as far as the telescopic end so as to be distant decreasingly from the third lens group G3 and increasingly from the fifth lens group G5.

The fifth lens group G5 moves toward the image side from the wide angle end as far as the intermediate state so as to be distant increasingly from the forth lens group G4 and decreasingly from the image plane, and moves toward the image side from the intermediate state as far as the telescopic end side changing point so as to be distant increasingly from the forth lens group G4 and increasingly from the image plane, and moves toward the object side from the telescopic end side changing point as far as the telescopic end so as to be distant decreasingly from the forth lens group G4 and decreasingly from the image plane. The position gotten at the telescopic end is closer to the image side at the telescopic end than at the wide angle end.

Aspheric surfaces are provided by seven faces which are both faces r9, r10 of the negative biconcave lens L22 of the second lens group G2, both faces r14, r15 of the positive biconvex lens L31 of the third lens group G3, an object side face r19 of the negative biconcave lens L41 of the forth lens group G4 and both faces r21, r22 of the positive biconvex lens L51 of the fifth lens group G5.

Figure 2A:
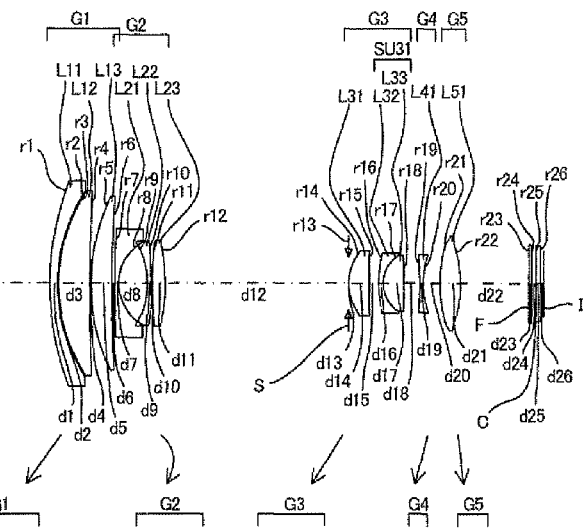
FIG. 2 is a development showing a cross section of Example 2 of a zoom lens according to the present invention along an optical axis.
Figure 2B:
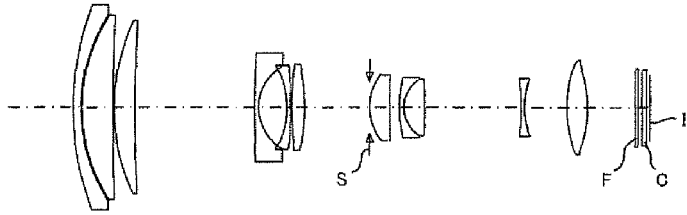
Figure 2C:
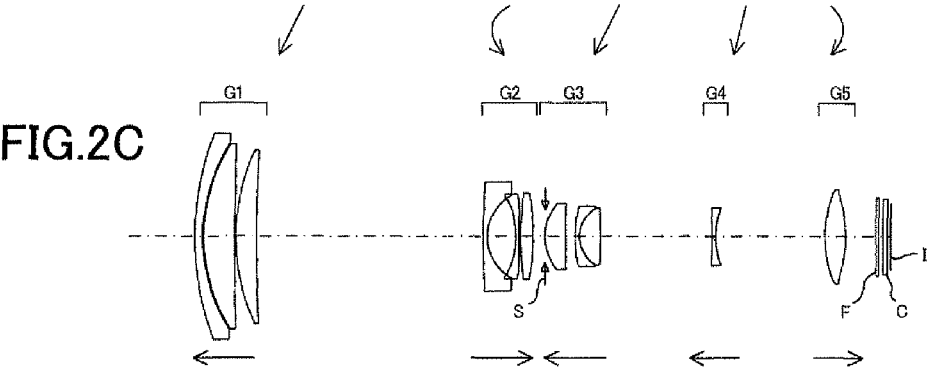

FIG. 2 gives a cross-sectional view of the zoom lens of Example 2.

As shown in FIG. 2, the zoom lens of Example 2 consists of a first lens group G1 of positive refractive power, a second lens group G2 of negative refractive power, a third lens group G3 of positive refractive power, a forth lens group G4 of negative refractive power and a fifth lens group G5 of positive refractive power in order from the object side toward the image side. In the illustration, S is an aperture stop, F being a low-pass filter, C being a cover glass and I being an image plane.

The first lens group G1 consists of a negative meniscus lens L11 with a convex face directed to the object side, a positive meniscus lens L12 with a convex face directed to the object side and a positive meniscus lens L13 with a convex face directed to the object side, which are arranged in order from the object side toward the image side.

The second lens group G2 consists of a negative meniscus lens L21 with a convex face directed to the object side, a negative meniscus lens L22 with a convex face directed to the image side and a positive biconvex lens L23, which are arranged in order from the object side toward the image side.

The third lens group G3 consists of a positive biconvex lens L31 and a junction lens SU31 composed of a negative meniscus lens L32 with a convex face directed to the object side and a positive biconvex lens L33, which are arranged in order from the object side toward the image side. In addition, an aperture stop S is arranged at the object side of the third lens group G3.

The forth lens group G4 consists of one negative biconcave lens L41.

The fifth group G5 consists of one positive biconvex lens L51.

Described is on the operation of the zoom lenses of Example 2. In zooming operation, the first lens group G1, the second lens group G2, the third lens group G3, the forth lens group G4 and the fifth lens group G5 move independently, respectively.

Now described is on the movements of the respective lens groups at activation of variable power from wide angle end to the telescopic end.

The first lens group G1 moves only toward the object side from the wide angle end as far as the telescopic end so as to be distant increasingly from the second lens group G2.

The second lens group G2 moves toward the image side from the wide angle end as far as a wide angle end side changing point so as to be distant increasingly from the first lens group G1 and decreasingly from the third lens group G3, and moves toward the object side from the wide angle end side changing point as far as a telescopic end side changing point so as to be distant increasingly from the first lens group G1 and decreasingly from the third lens group G3, and moves toward the image side from the telescopic end side changing point as far as the telescopic end so as to be distant increasingly from the first lens group G1 and decreasingly from the third lens group G3. The position gotten at the telescopic end is closer to the image side at the telescopic end than at the wide angle end.

The third lens group G3 moves together with the aperture stop S toward the object side from the wide angle end as far as the telescopic end side changing point so as to be distant decreasingly from the second lens group G2 and increasingly from the forth lens group G4, and moves toward the object side from the telescopic end side changing point as far as the telescopic end so as to be distant decreasingly from the second lens group G2 and decreasingly from the forth lens group G4.

The forth lens group G4 moves toward the object side from the wide angle end as far as the telescopic end side changing point so as to be distant increasingly from the third lens group G3 and increasingly from the fifth lens group G5, and moves toward the object side from the telescopic end side changing point as far as the telescopic end so as to be distant decreasingly from the third lens group G3 and increasingly from the fifth lens group G5.

The fifth lens group G5 moves toward the image side from the wide angle end as far as the telescopic end side changing point so as to be distant increasingly from the forth lens group G4 and decreasingly from the image plane, and moves toward the object side from the telescopic end side changing point as far as the telescopic end so as to be distant increasingly from the forth lens group G4 and increasingly from the image plane. The position gotten at the telescopic end is closer to the image side at the telescopic end than at the wide angle end.

Aspheric surfaces are provided by eight faces which are both faces r9, r10 of the negative biconcave lens L22 of the second lens group G2, both faces r14, r15 of the positive biconvex lens L31 of the third lens group G3, object side both faces r19, r20 of the negative biconcave lens L41 of the forth lens group G4 and both faces r21, r22 of the positive biconvex lens L51 of the fifth lens group G5.

Figure 3A:
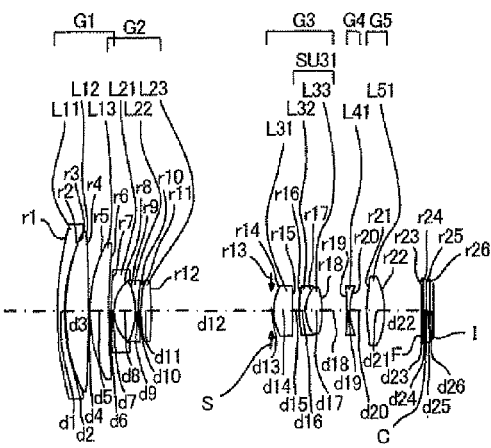
FIG. 3 is a development showing a cross section of Example 3 of a zoom lens according to the present invention along an optical axis.
Figure 3B:
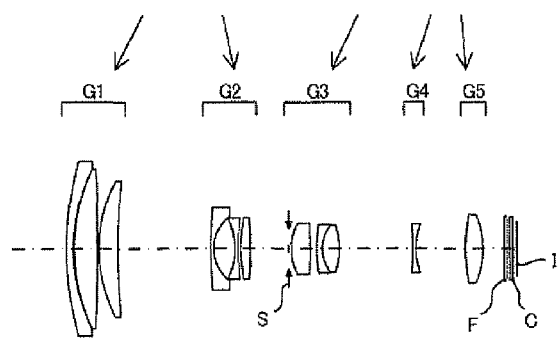
Figure 3C:
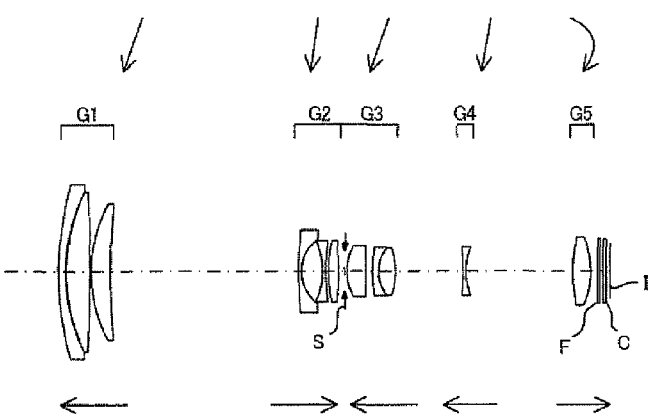

FIG. 3 gives a cross-sectional view of the zoom lens of Example 3.

As shown in FIG. 3, the zoom lens of Example 3 consists of a first lens group G1 of positive refractive power, a second lens group G2 of negative refractive power, a third lens group G3 of positive refractive power, a forth lens group G4 of negative refractive power and a fifth lens group G5 of positive refractive power in order from the object side toward the image side. In the illustration, S is an aperture stop, F being a low-pass filter, C being a cover glass and I being an image plane.

The first lens group G1 consists of a negative meniscus lens L11 with a convex face directed to the object side, a positive biconvex lens L12 and a positive meniscus lens L13 with a convex face directed to the object side, which are arranged in order from the object side toward the image side.

The second lens group G2 consists of a negative meniscus lens L21 with a convex face directed to the object side, a negative biconcave lens L22 and a positive biconvex lens L23, which are arranged in order from the object side toward the image side.

The third lens group G3 consists of a positive biconvex lens L31 and a cemented lens SU31 composed of a negative meniscus lens L32 with a convex face directed to the object side and a positive biconvex lens L33, which are arranged in order from the object side toward the image side. In addition, an aperture stop S is arranged at the object side of the third lens group G3.

The forth lens group G4 consists of one negative biconcave lens L41.

The fifth group G5 consists of one positive biconvex lens L51.

Described is on the operation of the zoom lenses of Example 3. In zooming operation, the first lens group G1, the second lens group G2, the third lens group G3, the forth lens group G4 and the fifth lens group G5 move independently, respectively.

Now described is on the movements of the respective lens groups at activation of variable power from wide angle end to the telescopic end.

The first lens group G1 moves only toward the object side from the wide angle end as far as the telescopic end so as to be distant increasingly from the second lens group G2.

The second lens group G2 moves toward the image side from the wide angle end as far as an intermediate state so as to be distant increasingly from the first lens group G1 and decreasingly from the third lens group G3, and moves toward the object side from the intermediate state as far as a telescopic end so as to be distant increasingly from the first lens group G1 and decreasingly from the third lens group G3. The position gotten at the telescopic end is closer to the image side at the telescopic end than at the wide angle end.

The third lens group G3 moves together with the aperture stop S toward the object side from the wide angle end as far as the telescopic end side changing point so as to be distant decreasingly from the second lens group G2 and increasingly from the forth lens group G4, and moves toward the object side from the telescopic end side changing point as far as the telescopic end so as to be distant decreasingly from the second lens group G2 and decreasingly from the forth lens group G4.

The forth lens group G4 moves toward the object side from the wide angle end as far as the telescopic end side changing point so as to be distant increasingly from the third lens group G3 and increasingly from the fifth lens group G5, and moves toward the object side from the telescopic end side changing point as far as the telescopic end so as to be distant decreasingly from the third lens group G3 and increasingly from the fifth lens group G5.

The fifth lens group G5 moves toward the image side from the wide angle end as far as the telescopic end side changing point so as to be distant increasingly from the forth lens group G4 and decreasingly from the image plane, and moves toward the object side from the telescopic end side changing point as far as the telescopic end so as to be distant increasingly from the forth lens group G4 and increasingly from the image plane. The position gotten at the telescopic end is closer to the image side at the telescopic end than at the wide angle end.

Aspheric surfaces are provided by seven faces which are both faces r9, r10 of the negative biconcave lens L22 of the second lens group G2, both faces r14, r15 of the positive biconvex lens L31 of the third lens group G3, and both faces r21, r22 of the positive biconvex lens L51 of the fifth lens group G5.

Figure 4A:
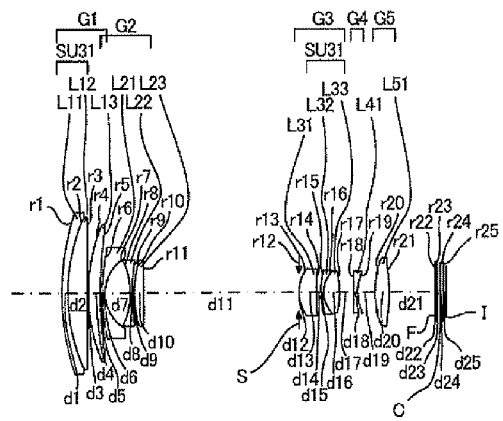
FIG. 4 is a development showing a cross section of Example 4 of a zoom lens according to the present invention along an optical axis.
Figure 4B:
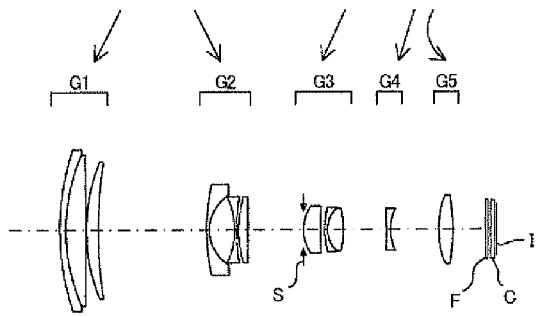
Figure 4C:
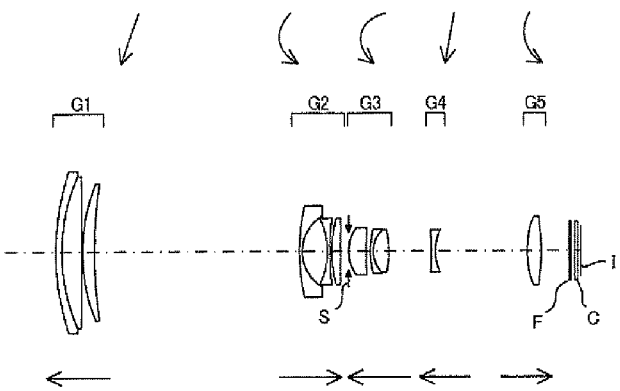

FIG. 4 gives a cross-sectional view of the zoom lens of Example 4.

As shown in FIG. 4, the zoom lens of Example 4 consists of a first lens group G1 of positive refractive power, a second lens group G2 of negative refractive power, a third lens group G3 of positive refractive power, a forth lens group G4 of negative refractive power and a fifth lens group G5 of positive refractive power in order from the object side toward the image side. In the illustration, S is an aperture stop, F being a low-pass filter, C being a cover glass and I being an image plane.

The first lens group G1 consists of a cemented lens SU11 composed of a negative meniscus lens L11 with a convex face directed to the object side and a positive biconvex lens L12, and a positive meniscus lens L13 with a convex face directed to the object side, which are arranged in order from the object side toward the image side.

The second lens group G2 consists of a negative meniscus lens L21 with a convex face directed to the object side, a negative biconcave lens L22 and a positive plane-convex lens L23 with a convex face directed to the object side, which are arranged in order from the object side toward the image side.

The third lens group G3 consists of a positive meniscus lens L31 with a convex face directed to the object side and a cemented lens SU 31 composed of a negative meniscus lens L32 with a convex face directed to the object side and a positive biconvex lens L33, which are arranged in order from the object side toward the image side. In addition, an aperture stop S is arranged at the object side of the third lens group G3.

The forth lens group G4 consists of one negative biconcave lens L41.

The fifth group G5 consists of one positive biconvex lens L51.

Described is on the operation of the zoom lenses of Example 4. In zooming operation, the first lens group G1, the second lens group G2, the third lens group G3, the forth lens group G4 and the fifth lens group G5 move independently, respectively.

Now described is on the movements of the respective lens groups at activation of variable power from wide angle end to the telescopic end.

The first lens group G1 moves only toward the object side from the wide angle end as far as the telescopic end so as to be distant increasingly from the second lens group G2.

The second lens group G2 moves toward the image side from the wide angle end as far as an intermediate state so as to be distant increasingly from the first lens group G1 and decreasingly from the third lens group G3, and moves toward the object side from the intermediate state as far as a telescopic end side changing point so as to be distant increasingly from the first lens group G1 and decreasingly from the third lens group G3, The position gotten at the telescopic end is closer to the image side at the telescopic end than at the wide angle end.

The third lens group G3 moves together with the aperture stop S toward the object side from the wide angle end as far as the telescopic end side changing point so as to be distant decreasingly from the second lens group G2 and increasingly from the forth lens group G4, and moves toward the image side from the telescopic end side changing point as far as the telescopic end so as to be distant decreasingly from the second lens group G2 and decreasingly from the forth lens group G4. The position gotten at the telescopic end is closer to the object side at the telescopic end than at the wide angle end.

The forth lens group G4 moves toward the object side from the wide angle end as far as the telescopic end side changing point so as to be distant increasingly from the third lens group G3 and increasingly from the fifth lens group G5, and moves toward the object side from the telescopic end side changing point as far as the telescopic end so as to be distant decreasingly from the third lens group G3 and increasingly from the fifth lens group G5.

The fifth lens group G5 moves toward the image side from the wide angle end as far as the wide end side changing point so as to be distant increasingly from the forth lens group G4 and decreasingly from the image plane, and moves toward the image side from the intermediate state as far as the telescopic end side changing point so as to be distant increasingly from the forth lens group G4 and increasingly from the image plane, and moves toward the image side from the telescopic end side changing point as far as the telescopic end so as to be distant increasingly from the forth lens group G4 and decreasingly from the image plane, The position gotten at the telescopic end is closer to the image side at the telescopic end than at the wide angle end.

Aspheric surfaces are provided by nine faces which are both faces r8, r9 of the negative biconcave lens L22 of the second lens group G2, both faces r13, r14 of the positive meniscus lens L31 of the third lens group G3, a face r17 which is the closest face to the image side in the faces of the biconvex lens 33 of the cemented lens SU 31, both faces r18, r19 of the negative biconcave lens 41 of the forth lens group G4 and both faces r20, r21 of the positive biconvex lens L51 of the fifth lens group G5.

Figure 5A:
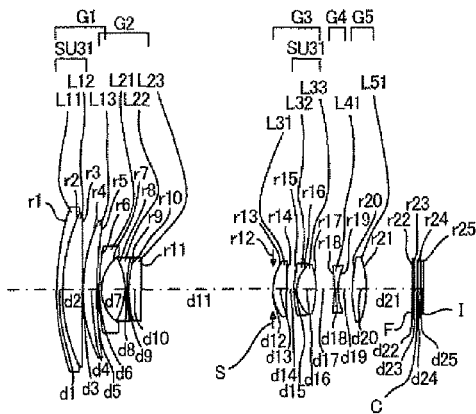
FIG. 5 is a development showing a cross section of Example 5 of a zoom lens according to the present invention along an optical axis.
Figure 5B:
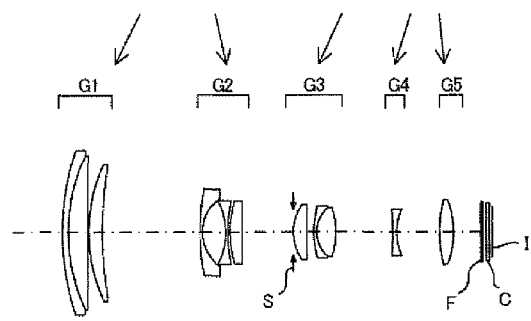
Figure 5C:
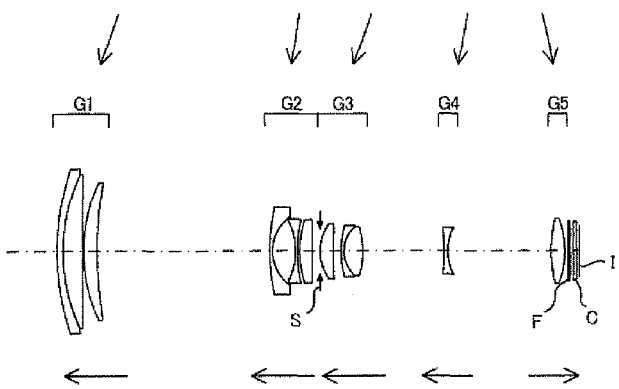

FIG. 5 gives a cross-sectional view of the zoom lens of Example 5.

As shown in FIG. 5, the zoom lens of Example 5 consists of a first lens group G1 of positive refractive power, a second lens group G2 of negative refractive power, a third lens group G3 of positive refractive power, a forth lens group G4 of negative refractive power and a fifth lens group G5 of positive refractive power in order from the object side toward the image side. In the illustration, S is an aperture stop, F being a low-pass filter, C being a cover glass and I being an image plane.

The first lens group G1 consists of a cemented lens SU11 composed of a negative meniscus lens L11 with a convex face directed to the object side and a positive plane-convex lens L12 with a convex face directed to the object side, and a positive meniscus lens L13 with a convex face directed to the object side, which are arranged in order from the wide angle end to the telescopic end.

The second lens group G2 consists of a negative meniscus lens L21 with a convex face directed to the object side, a negative biconcave lens L22 and a positive plane-convex lens L23 with a convex face directed to the object side, which are arranged in order from the object side toward the image side.

The third lens group G3 consists of a positive meniscus lens L31 with a convex face directed to the object side and a cemented lens SU 31 composed of a negative meniscus lens L32 with a convex face directed to the object side and a positive biconvex lens L33, which are arranged in order from the object side toward the image side. In addition, an aperture stop S is arranged at the object side of the third lens group G3.

The forth lens group G4 consists of one negative biconcave lens L41.

The fifth group G5 consists of one positive biconvex lens L51.

Described is on the operation of the zoom lenses of Example 5. In zooming operation, the first lens group G1, the second lens group G2, the third lens group G3, the forth lens group G4 and the fifth lens group G5 move independently, respectively.

Now described is on the movements of the respective lens groups at activation of variable power from wide angle end to the telescopic end.

The first lens group G1 moves only toward the object side from the wide angle end as far as the telescopic end so as to be distant increasingly from the second lens group G2.

The second lens group G2 moves toward the image side from the wide angle end as far as an intermediate state so as to be distant increasingly from the first lens group G1 and decreasingly from the third lens group G3, and moves toward the object side from the intermediate state as far as a telescopic end so as to be distant increasingly from the first lens group G1 and decreasingly from the third lens group G3. The position gotten at the telescopic end is closer to the image side at the telescopic end than at the wide angle end.

The third lens group G3 moves together with the aperture stop S toward the object side from the wide angle end as far as the telescopic end side changing point so as to be distant decreasingly from the second lens group G2 and increasingly from the forth lens group G4, and moves toward the object side from the telescopic end side changing point as far as the telescopic end so as to be distant decreasingly from the second lens group G2 and decreasingly from the forth lens group G4.

The forth lens group G4 moves toward the object side from the wide angle end as far as the telescopic end side changing point so as to be distant increasingly from the third lens group G3 and increasingly from the fifth lens group G5, and moves toward the object side from the telescopic end side changing point as far as the telescopic end so as to be distant decreasingly from the third lens group G3 and increasingly from the fifth lens group G5.

The fifth lens group G5 moves toward the image side from the wide angle end as far as the telescopic end side so as to be distant increasingly from the forth lens group G4 and decreasingly from the image plane.

Aspheric surfaces are provided by six faces which are both faces r8, r9 of the negative biconcave lens L22 of the second lens group G2, both faces r13, r14 of the positive meniscus lens L31 with a convex directed to the object side of the third lens group G3 and both faces r20, r21 of the positive biconvex lens L51 of the fifth lens group G5.

Figure 6A:
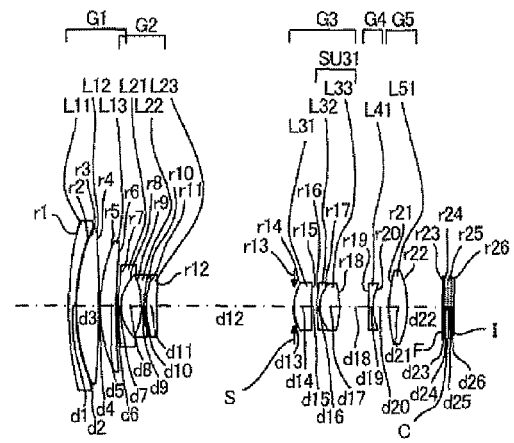
FIG. 6 is a development showing a cross section of Example 6 of a zoom lens according to the present invention along an optical axis.
Figure 6B:
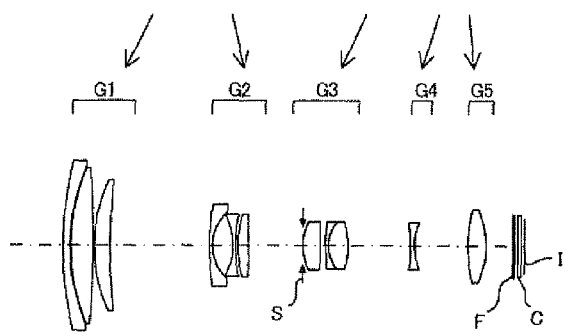
Figure 6C:
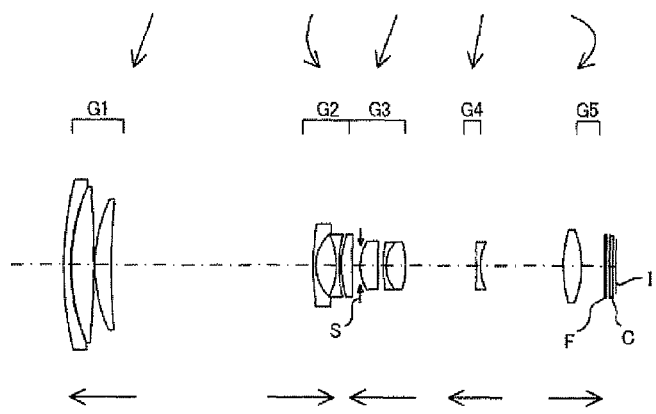

FIG. 6 gives a cross-sectional view of the zoom lens of Example 6.

As shown in FIG. 6, the zoom lens of Example 6 consists of a first lens group G1 of positive refractive power, a second lens group G2 of negative refractive power, a third lens group G3 of positive refractive power, a forth lens group G4 of negative refractive power and a fifth lens group G5 of positive refractive power in order from the object side toward the image side. In the illustration, S is an aperture stop, F being a low-pass filter, C being a cover glass and I being an image plane.

The first lens group G1 consists of a negative meniscus lens L11 with a convex face directed to the object side. a positive biconvex lens L12 and a positive meniscus lens L13 with a convex face directed to the object side, which is arranged in order from the object side toward the image side.

The second lens group G2 consists of a negative meniscus lens L21 with a convex face directed to the object side, a negative biconcave lens L22 and a positive plane-convex lens L23 with a convex face directed to the object side, which are arranged in order from the object side toward the image side.

The third lens group G3 consists of a positive biconvex lens L31, a cemented lens SU31 composed of a negative meniscus lens L32 with a convex face directed to the object side and a positive biconvex lens L33, which are arranged in order from the object side toward the image side. In addition, an aperture stop S is arranged at the object side of the third lens group G3.

The forth lens group G4 consists of one negative biconcave lens L41.

The fifth group G5 consists of one positive biconvex lens L51.

Described is on the operation of the zoom lenses of Example 6. In zooming operation, the first lens group G1, the second lens group G2, the third lens group G3, the forth lens group G4 and the fifth lens group G5 move independently, respectively.

Now described is on the movements of the respective lens groups at activation of variable power from wide angle end to the telescopic end.

The first lens group G1 moves only toward the object side from the wide angle end as far as the telescopic end so as to be distant increasingly from the second lens group G2.

The second lens group G2 moves toward the image side from the wide angle end as far as an intermediate state so as to be distant increasingly from the first lens group G1 and decreasingly from the third lens group G3, and moves toward the object side from the intermediate state as far as a telescopic end side changing point so as to be distant increasingly from the first lens group G1 and decreasingly from the third lens group G3, and moves toward the image side from the telescopic end side changing point as far as the telescopic end so as to be distant increasingly from the first lens group G1 and decreasingly from the third lens group G3.

The third lens group G3 moves together with the aperture stop S toward the object side from the wide angle end as far as the telescopic end side changing point so as to be distant decreasingly from the second lens group G2 and increasingly from the forth lens group G4, and moves toward the object side from the telescopic end side changing point as far as the telescopic end so as to be distant decreasingly from the second lens group G2 and decreasingly from the forth lens group G4.

The forth lens group G4 moves toward the object side from the wide angle end as far as the telescopic end side changing point so as to be distant increasingly from the third lens group G3 and increasingly from the fifth lens group G5, and moves toward the object side from the telescopic end side changing point as far as the telescopic end so as to be distant decreasingly from the third lens group G3 and increasingly from the fifth lens group G5.

The fifth lens group G5 moves toward the image side from the wide angle end as far as the telescopic end side changing point so as to be distant increasingly from the forth lens group G4 and decreasingly from the image plane, and moves toward the object from the telescopic end side changing point as far as the telescopic end so as to be distant increasingly from the forth lens group G4 and decreasingly from the image plane, The position gotten at the telescopic end is closer to the image side at the telescopic end than at the wide angle end.

Aspheric surfaces are provided by six faces which are both faces r9, r10 of the negative biconcave lens L22 of the second lens group G2, both faces r14, r15 of the positive biconvex lens L31 of the third lens group G3 and both faces r21, r22 of the positive biconvex lens L51 of the fifth lens group G5.

Figure 7A:
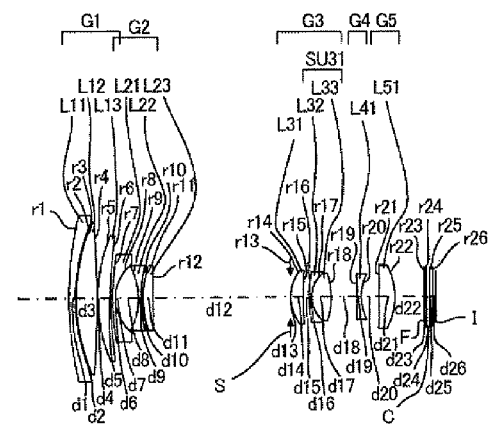
FIG. 7 is a development showing a cross section of Example 7 of a zoom lens according to the present invention along an optical axis.
Figure 7B:
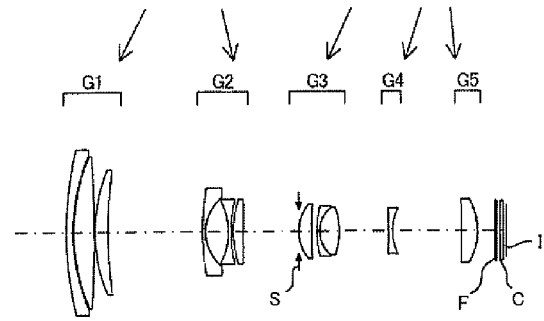
Figure 7C:
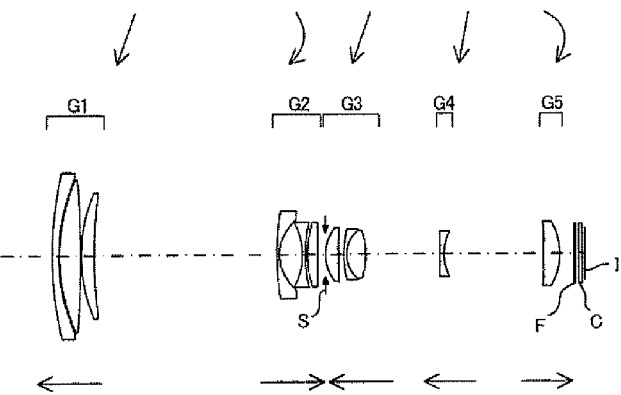
Figure 8A:
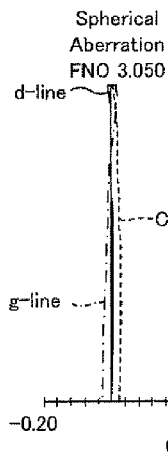
FIG. 8 is an illustration of aberration of the zoom lens of Example 1.
Figure 8B:
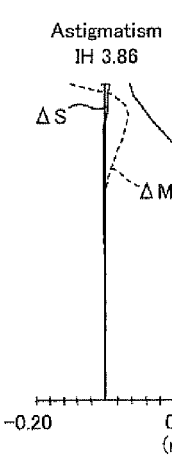
Figure 8C:
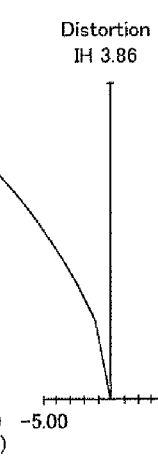
Figure 8D:
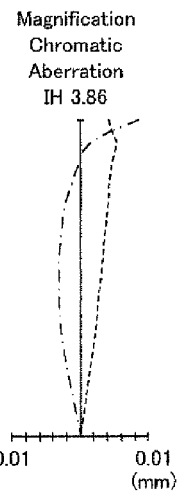
Figure 8E:
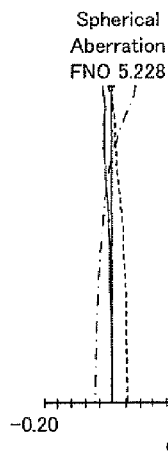
Figure 8F:
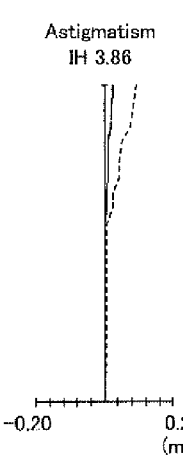
Figure 8G:
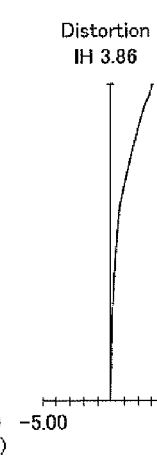
Figure 8H:
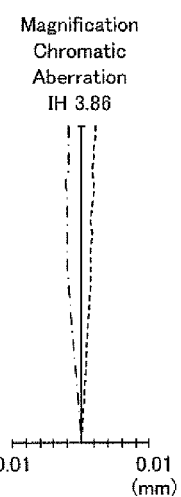
Figure 8I:
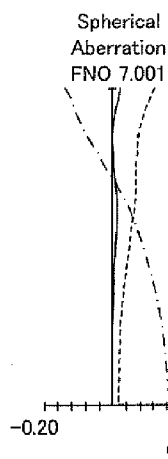
Figure 8J:
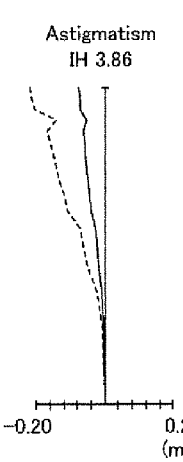
Figure 8K:
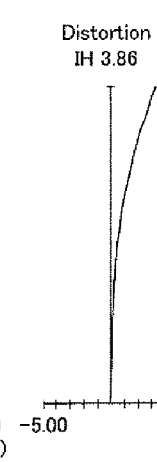
Figure 8L:
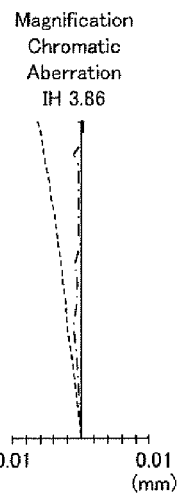
Figure 9A:
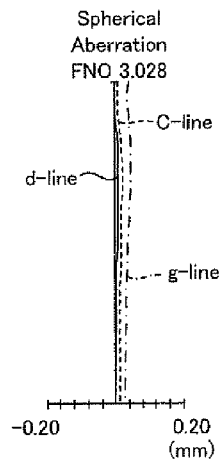
FIG. 9 is an illustration of aberration of the zoom lens of Example 2.
Figure 9B:
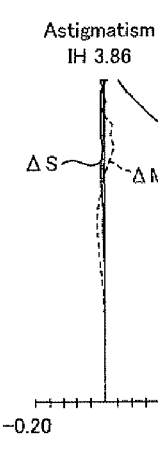
Figure 9C:
Figure 9D:
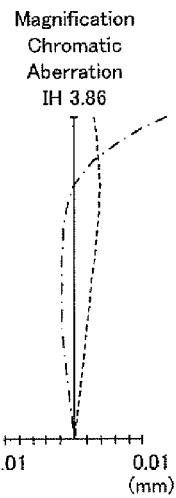
Figure 9E:
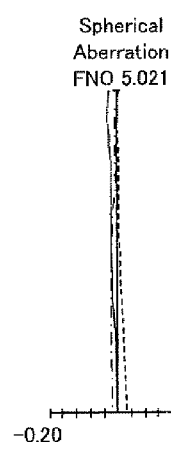
Figure 9F:
Figure 9G:
Figure 9H:
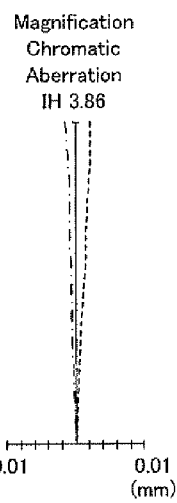
Figure 9I:
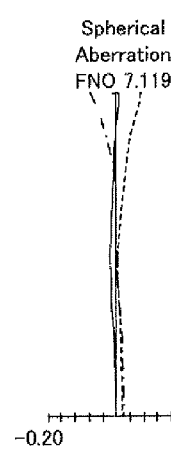
Figure 9J:
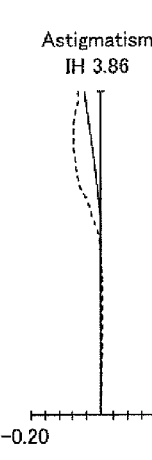
Figure 9K:
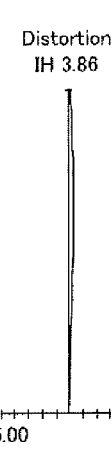
Figure 9L:
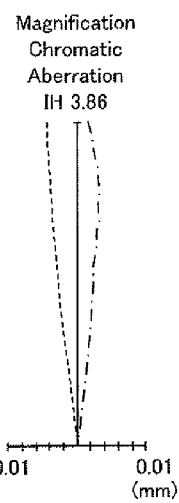

FIG. 7 gives a cross-sectional view of the zoom lens of Example 7.

As shown in FIG. 7, the zoom lens of Example 7 consists of a first lens group G1 of positive refractive power, a second lens group G2 of negative refractive power, a third lens group G3 of positive refractive power, a forth lens group G4 of negative refractive power and a fifth lens group G5 of positive refractive power in order from the object side toward the image side. In the illustration, S is an aperture stop, F being a low-pass filter, C being a cover glass and I being an image plane.

The first lens group G1 consists of a negative meniscus lens L11 with a convex face directed to the object side, a positive biconvex lens L12 and a positive meniscus lens L13 with a convex face directed to the object side, which are arranged in order from the object side toward the image side.

The second lens group G2 consists of a negative meniscus lens L21 with a convex face directed to the object side, a negative biconcave lens L22 and a positive plane-convex lens L23 with a convex face directed to the object side, which are arranged in order from the object side toward the image side.

The third lens group G3 consists of a positive biconvex lens L31, a cemented lens SU31 composed of a negative meniscus lens L32 with a convex face directed to the object side and a positive biconvex lens L33, which are arranged in order from the object side toward the image side. In addition, an aperture stop S is arranged at the object side of the third lens group G3.

The forth lens group G4 consists of one negative biconcave lens L41.

The fifth group G5 consists of one positive biconvex lens L51.

Described is on the operation of the zoom lenses of Example 7. In zooming operation, the first lens group G1, the second lens group G2, the third lens group G3, the forth lens group G4 and the fifth lens group G5 move independently, respectively.

Now described is on the movements of the respective lens groups at activation of variable power from wide angle end to the telescopic end.

The first lens group G1 moves only toward the object side from the wide angle end as far as the telescopic end so as to be distant increasingly from the second lens group G2.

The second lens group G2 moves toward the image side from the wide angle end as far as a telescopic end side changing point so as to be distant increasingly from the first lens group G1 and decreasingly from the third lens group G3, and moves toward the object side from the telescopic end side changing point as far as the telescopic end so as to be distant increasingly from the first lens group G1 and decreasingly from the third lens group G3. The position gotten at the telescopic end is closer to the image side at the telescopic end than at the wide angle end.

The third lens group G3 moves together with the aperture stop S toward the object side from the wide angle end as far as the telescopic end so as to be distant decreasingly from the second lens group G2 and increasingly from the forth lens group G4.

The forth lens group G4 moves toward the object side from the wide angle end as far as the telescopic end so as to be distant increasingly from the third lens group G3 and increasingly from the fifth lens group G5.

The fifth lens group G5 moves toward the image side from the wide angle end as far as the telescopic end side changing point so as to be distant increasingly from the forth lens group G4 and decreasingly from the image plane, and moves toward the object from the telescopic end side changing point as far as the telescopic end so as to be distant increasingly from the forth lens group G4 and increasingly from the image plane, The position gotten at the telescopic end is closer to the image side at the telescopic end than at the wide angle end.

Aspheric surfaces are provided by six faces which are both faces r9, r10 of the negative biconcave lens L22 of the second lens group G2, both faces r14, r15 of the positive biconvex lens L31 of the third lens group G3 and both faces r21, r22 of the positive biconvex lens L51 of the fifth lens group G5.

Below shown are various numerical value data (surface data, aspheric surface data, variable gap data, various data 1, various data 2) of the a-described Example 1 through Example 7.

Shown surface data, are the radius of curvature r of each lens surface (optical surface) for every surface number, the gap d between surfaces, refractive index nd of each lens (optical medium) at d line (587.6 nm), Abbe number vd of each lens (optical medium) at d line. Both the radius of curvature r and the gap d between surfaces are expressed in millimeter (mm). In surface data, "∞" shown in the radius of curvature indicates infinity (plane surface).

Shown aspheric data are such data in the surface data as to regard lens surfaces configured aspheric. Aspheric surface configuration is expressed by the following formula using x representing an optical axis and y representing a direction with respect to the optical axis, wherein the travelling direction of light corresponds to the positive sign.

$$x=(y^2/r)/[1+\{1-(1+K)\cdot(y/r)^2\}^{1/2}]+A4y^4+A6y^6+A8y^8+A10y^{10}$$

It is noted that r is the paraxial radius of curvature, K is conical coefficient and A4, A6, A8, A10 are aspheric coefficients of 4th-order, 6th-order, 8th-order and 10th-order, respectively. In addition, "E" is a symbol meaning that the numerical value that follows the symbol indicates the exponent to the base 10. For instance, "1.0E-5" means "$1.0\times10^{-5}$".

Shown various data 1 are various zoom data at the wide angle end (WE), at a wide angle end side changing point (CW), at an intermediate state (ST), at a telescopic end side changing point (CT) and at the telescopic end (TE). Shown zoom data are focal length, F-number (Fno), angle of view (2ω), image height, back focus (BF) and variable surface gap d. Shown various data are the respective data of focal length f1 to f51 of the first to the fifth lens groups.

NUMERICAL VALUES OF EXAMPLE 1

| surface No. | r | d | nd | vd |
|---|---|---|---|---|
| 1 | 46.119 | 0.9 | 1.90366 | 31.32 |
| 2 | 25.36 | 0.3 | | |
| 3 | 29.319 | 2.55 | 1.497 | 81.54 |
| 4 | ∞ | 0.1 | | |
| 5 | 21.488 | 2.6 | 1.59282 | 68.63 |
| 6 | 154.577 | D6 (variable) | | |
| 7 | 31.089 | 0.4 | 1.883 | 40.8 |
| 8 | 5.671 | 3.2 | | |
| 9 (aspheric) | −7.867 | 0.4 | 1.76802 | 49.24 |
| 10 (aspheric) | 79.913 | 0.3 | | |
| 11 | 18.811 | 1.35 | 1.94595 | 17.98 |
| 12 | −71.988 | D12 (variable) | | |
| 13 (stop) | ∞ | 0 | | |
| 14 (aspheric) | 7.104 | 2.01 | 1.58313 | 59.38 |
| 15 (aspheric) | −146.825 | 1.56 | | |
| 16 | 20.368 | 0.4 | 1.91082 | 35.25 |
| 17 | 5.13 | 2.55 | 1.51633 | 64.14 |
| 18 | −12.636 | D18 (variable) | | |
| 19 (aspheric) | −30.222 | 0.6 | 1.5254 | 56.25 |
| 20 | 14.203 | D20 (variable) | | |
| 21 (aspheric) | 25.573 | 2 | 1.497 | 81.54 |
| 22 (aspheric) | −13.12 | D22 (variable) | | |
| 23 | ∞ | 0.3 | 1.51633 | 64.14 |
| 24 | ∞ | 0.5 | | |
| 25 | ∞ | 0.5 | 1.51633 | 64.14 |
| 26 | ∞ | 0.37 | | |
| Image plane | ∞ | | | |

| Aspheric coefficients |
|---|
| the 9th surface |
| K = 0.000
A4 = 6.06E−04
A6 = −2.51E−05
A8 = 5.71E−07 |
| the 10th surface |
| K = 0.000
A4 = 6.33E−04
A6 = −3.60E−05
A8 = 1.39E−06
A10 = −1.91E−08 |
| the 14th surface |
| K = 0.000
A4 = −2.69E−04
A6 = 4.44E−06
A8 = −9.03E−07
A10 = −1.64E−08 |
| the 15th surface |
| K = 0.000
A4 = 1.18E−04
A6 = 6.27E−06
A8 = −1.41E−06 |
| the 19th surface |
| K = 0.000
A4 = −7.75E−05
A6 = 1.52E−08
A8 = 7.45E−07 |
| the 21st surface |
| K = 0.000
A4 = −9.48E−05
A6 = 3.26E−05
A8 = 5.71E−11 |
| the 22nd surface |
| K = 0.000
A4 = 1.03E−06
A6 = 4.46E−05
A8 = −1.72E−10 |

Various data 1
zoom data
zoom magnification 22.96

| | WE | CW | ST | CT | TE |
|---|---|---|---|---|---|
| focal length | 4.56 | 10.55 | 20.53 | 50.01 | 104.69 |
| FNO. | 3.05 | 4.36 | 5.23 | 6.88 | 7 |
| angle of view 2ω (°) | 88.07 | 39.05 | 20.52 | 8.59 | 4.06 |
| image height | 3.86 | 3.86 | 3.86 | 3.86 | 3.86 |
| D6 | 0.3 | 6.2 | 14.2 | 20.2 | 26 |
| D12 | 19 | 11.68 | 8.8 | 4.21 | 1.2 |
| D18 | 4.85 | 8.79 | 11.46 | 19.7 | 18.95 |
| D20 | 2.03 | 6.78 | 8.43 | 7.87 | 9.09 |
| D22 | 5.63 | 3.5 | 2.11 | 0.6 | 1.95 |
| fb (in air) | | | | | |
| full length (in air) | | | | | |

Various data 2
focal length of each lens group

| f1 | 40.1 |
|---|---|
| f2 | −5.64 |
| f3 | 11.26 |
| f4 | −18.31 |
| f5 | 17.75 |

NUMERICAL VALUES OF EXAMPLE 2

| surface No. | r | d | nd | vd |
|---|---|---|---|---|
| 1 | 33.931 | 0.9 | 1.834 | 37.16 |
| 2 | 20.223 | 0.1 | | |
| 3 | 20.002 | 3.65 | 1.497 | 81.54 |
| 4 | 332.406 | 0.1 | | |
| 5 | 24.19 | 2.41 | 1.497 | 81.54 |
| 6 | 180.53 | D6 (variable) | | |
| 7 | 142.18 | 0.45 | 1.883 | 40.76 |
| 8 | 5.638 | 3.27 | | |
| 9 (aspheric) | −10.443 | 0.4 | 1.77377 | 47.17 |
| 10 (aspheric) | −1896.873 | 0.17 | | |
| 11 | 40.83 | 1.47 | 1.94595 | 17.98 |
| 12 | −26.621 | D12 (variable) | | |
| 13 (stop) | ∞ | 0 | | |
| 14 (aspheric) | 6.051 | 2.36 | 1.58313 | 59.38 |
| 15 (aspheric) | −260.21 | 1.09 | | |
| 16 | 15.169 | 0.53 | 1.91082 | 35.25 |
| 17 | 3.916 | 2.41 | 1.58313 | 59.38 |
| 18 | −57.176 | D18 (variable) | | |
| 19 (aspheric) | −32.754 | 0.4 | 1.5311 | 55.91 |
| 20 (aspheric) | 10.593 | D20 (variable) | | |
| 21 (aspheric) | 16.011 | 2.37 | 1.497 | 81.54 |
| 22 (aspheric) | −14.463 | D22 (variable) | | |
| 23 | ∞ | 0.3 | 1.51633 | 64.14 |
| 24 | ∞ | 0.5 | | |
| 25 | ∞ | 0.5 | 1.51633 | 64.14 |
| 26 | ∞ | 0.37 | | |
| Image plane | ∞ | | | |

Aspheric coefficients the 9th surface $K = 0.000$
$A4 = 1.34E-04$
$A6 = -2.22E-06$
$A8 = -8.39E-07$
$A10 = -9.98E-09$
$A12 = 8.07E-10$
the 10th surface $K = 0.000$
$A4 = -7.32E-05$
$A6 = -8.60E-06$
$A8 = -2.88E-07$
$A10 = -8.78E-09$
$A12 = 5.81E-10$
the 14th surface $K = 0.000$
$A4 = -2.03E-04$
$A6 = 5.17E-06$
$A8 = -1.61E-06$
$A10 = 1.70E-07$
$A12 = -3.90E-09$
the 15th surface $K = 0.000$
$A4 = 2.30E-04$
$A6 = 1.22E-05$
$A8 = -2.57E-06$
$A10 = 3.54E-07$
$A12 = -1.08E-08$
the 18th surface $K = 0.000$
$A4 = 8.88E-05$
$A6 = 5.46E-06$
$A8 = -7.67E-07$
$A10 = -1.14E-07$
$A12 = 7.11E-09$
the 19th surface $K = 0.000$
$A4 = 4.87E-05$
$A6 = 2.87E-05$
$A8 = -5.35E-07$
$A10 = -2.15E-07$
$A12 = 1.77E-08$
the 20th surface $K = 0.000$
$A4 = 1.67E-04$
$A6 = 8.83E-06$
$A8 = 1.85E-06$
$A10 = -1.45E-07$
$A12 = -1.78E-09$
the 21st surface $K = 0.000$
$A4 = 1.19E-04$
$A6 = -1.42E-05$
$A8 = 1.50E-06$
$A10 = -7.71E-08$
$A12 = 1.54E-09$
the 22nd surface $K = 0.000$
$A4 = 2.34E-04$
$A6 = -2.00E-05$
$A8 = 1.71E-06$
$A10 = -8.32E-08$
$A12 = 1.65E-09$ Various data 1
zoom data
zoom magnification 23.01

| | WE | CW | ST | CT | TE |
|---|---|---|---|---|---|
| focal length | 4.55 | 9.56 | 21.3 | 49.9 | 104.69 |
| FNO. | 3.03 | 3.8 | 5.02 | 6.99 | 7.12 |
| angle of view 2ω (°) | 88.75 | 43.11 | 19.93 | 8.68 | 4.18 |
| image height | 3.86 | 3.86 | 3.86 | 3.86 | 3.86 |
| D6 | 0.31 | 6.27 | 13.74 | 20 | 26.15 |
| D12 | 21.21 | 12.12 | 7.48 | 4.5 | 1.35 |
| D18 | 1.8 | 5.93 | 11.13 | 14.91 | 12.93 |
| D20 | 1.9 | 2.49 | 4.87 | 9.75 | 12.61 |
| D22 | 7.92 | 7.42 | 5.51 | 3.1 | 3.5 |

Various data 2
focal length of each lens group

| | |
|---|---|
| f1 | 41.11 |
| f2 | −6.23 |
| f3 | 11.13 |
| f4 | −15.02 |
| f5 | 15.69 |

NUMERICAL VALUES OF EXAMPLE 3

| surface No. | r | d | nd | vd |
|---|---|---|---|---|
| 1 | 45.622 | 1 | 1.91082 | 35.25 |
| 2 | 25.376 | 0.1 | | |
| 3 | 26.504 | 3.35 | 1.497 | 81.54 |
| 4 | −202.144 | 0.15 | | |
| 5 | 20.762 | 2.72 | 1.497 | 81.54 |
| 6 | 103.805 | D6 (variable) | | |
| 7 | 67.214 | 0.4 | 1.883 | 40.76 |
| 8 | 5.625 | 3.05 | | |
| 9 (aspheric) | −9.891 | 0.45 | 1.7425 | 49.27 |
| 10 (aspheric) | 31.018 | 0.36 | | |
| 11 | 20.003 | 1.45 | 1.94595 | 17.98 |
| 12 | −48.069 | D12 (variable) | | |
| 13 (stop) | ∞ | 0.3 | | |
| 14 (aspheric) | 7.119 | 2.7 | 1.58313 | 59.46 |
| 15 (aspheric) | −57.504 | 0.94 | | |
| 16 | 22.237 | 0.84 | 1.90366 | 31.32 |
| 17 | 5.353 | 2.4 | 1.51633 | 64.14 |
| 18 | −10.877 | D18 (variable) | | |

-continued

| | | | | |
|---|---|---|---|---|
| 19 | −31.402 | 0.4 | 1.51633 | 64.14 |
| 20 | 9.037 | D20 (variable) | | |
| 21 (aspheric) | 19.309 | 2.5 | 1.4971 | 81.56 |
| 22 (aspheric) | −12.531 | D22 (variable) | | |
| 23 | ∞ | 0.3 | 1.51633 | 64.14 |
| 24 | ∞ | 0.5 | | |
| 25 | ∞ | 0.5 | 1.51633 | 64.14 |
| 26 | ∞ | 0.53 | | |
| Image plane | ∞ | | | |

Aspheric coefficients the 9th surface $K = 0.000$
$A4 = 1.29E-05$
$A6 = 1.45E-05$
$A8 = -2.67E-06$
$A10 = 7.32E-08$ the 10th surface $K = 0.000$
$A4 = -7.60E-05$
$A6 = 1.28E-05$
$A8 = -2.05E-06$
$A10 = 6.34E-08$ the 14th surface $K = 0.000$
$A4 = -2.65E-04$
$A6 = 1.33E-05$
$A8 = -1.55E-06$
$A10 = 4.80E-08$ the 15th surface $K = 0.000$
$A4 = 3.01E-04$
$A6 = 1.59E-05$
$A8 = -2.08E-06$
$A10 = 7.30E-08$ the 21st surface $K = 0.000$
$A4 = 3.59E-05$
$A6 = -3.30E-05$
$A8 = 1.47E-06$
$A10 = -2.92E-08$ the 22nd surface $K = 0.000$
$A4 = 2.99E-04$
$A6 = -4.04E-05$
$A8 = 1.63E-06$
$A10 = -2.87E-08$ Various data 1
zoom data
zoom magnification 23.00

| | WE | CW | ST | CT | TE |
|---|---|---|---|---|---|
| focal length | 4.55 | 9.26 | 21.1 | 50.06 | 104.67 |
| FNO. | 3.05 | 3.99 | 5.12 | 6.36 | 7 |
| angle of view 2ω (°) | 89.03 | 44.73 | 20.05 | 8.62 | 4.15 |
| image height | 3.86 | 3.86 | 3.86 | 3.86 | 3.86 |
| D6 | 0.31 | 5.05 | 13.23 | 21.73 | 26.7 |
| D12 | 17.18 | 10.03 | 5.43 | 3.32 | 0.9 |
| D18 | 3.54 | 6.34 | 10.48 | 11.61 | 9.68 |
| D20 | 2.37 | 5.51 | 7.02 | 10.55 | 15.16 |
| D22 | 5.25 | 4.36 | 3.06 | 0.74 | 1.04 |

Various data 2
focal length of each lens group

| | |
|---|---|
| f1 | 40.75 |
| f2 | −5.66 |
| f3 | 10.11 |
| f4 | −13.55 |
| f5 | 15.7 |

NUMERICAL VALUES OF EXAMPLE 4

| surface No. | r | d | nd | vd |
|---|---|---|---|---|
| 1 | 38.71 | 0.9 | 2.00069 | 25.46 |
| 2 | 28.412 | 3 | 1.497 | 81.54 |
| 3 | −1812.198 | 0.1 | | |
| 4 | 27.281 | 1.8 | 1.59282 | 68.63 |
| 5 | 68.974 | D5 (variable) | | |
| 6 | 31.9 | 0.4 | 1.883 | 40.8 |
| 7 | 6.138 | 3.83 | | |
| 8 (aspheric) | −11.729 | 0.3 | 1.7432 | 49.34 |
| 9 (aspheric) | 31.039 | 0.3 | | |
| 10 | 16.533 | 1.43 | 1.94595 | 17.98 |
| 11 | ∞ | D11 (variable) | | |
| 12 (stop) | ∞ | 0 | | |
| 13 (aspheric) | 6.078 | 2.62 | 1.58913 | 61.14 |
| 14 (aspheric) | 277.137 | 0.64 | | |
| 15 | 14.569 | 0.4 | 1.91082 | 35.25 |
| 16 | 4.451 | 2.4 | 1.51633 | 64.14 |
| 17 (aspheric) | −13.486 | D17 (variable) | | |
| 18 (aspheric) | −50.602 | 0.6 | 1.5254 | 56.25 |
| 19 (aspheric) | 7.176 | D19 (variable) | | |
| 20 (aspheric) | 18.439 | 2.1 | 1.497 | 81.54 |
| 21 (aspheric) | −22.666 | D21 (variable) | | |
| 22 | ∞ | 0.3 | 1.51633 | 64.14 |
| 23 | ∞ | 0.5 | | |
| 24 | ∞ | 0.5 | 1.51633 | 64.14 |
| 25 | ∞ | 0.37 | | |
| Image plane | ∞ | | | |

Aspheric coefficients the 8th surface $K = 0.000$
$A4 = 5.29E-06$
$A6 = -1.03E-07$
$A8 = -1.45E-07$ the 9th surface $K = 0.000$
$A4 = 1.47E-05$
$A6 = 1.08E-06$
$A8 = -5.23E-08$ the 13th surface $K = 0.000$
$A4 = -1.92E-04$
$A6 = 5.35E-07$
$A8 = 7.65E-07$ the 14th surface $K = 0.000$
$A4 = 4.66E-04$
$A6 = 1.11E-05$
$A8 = 4.23E-07$
$A10 = 6.66E-08$ the 17th surface $K = 0.000$
$A4 = -1.64E-05$
$A6 = -1.51E-07$
$A8 = -6.78E-07$ the 18th surface $K = 0.000$
$A4 = 4.57E-06$
$A6 = -1.54E-05$
$A8 = 1.19E-06$ the 19th surface $K = 0.000$
$A4 = -2.52E-05$
$A6 = -7.30E-06$
$A8 = -3.07E-07$ -continued the 20th surface

K = 0.000
A4 = 1.02E−04
A6 = 1.06E−05
A8 = −2.73E−11
A10 = 5.92E−11 the 21st surface

K = 0.000
A4 = −6.63E−06
A6 = 1.18E−05
A8 = 2.57E−12
A10 = −2.30E−12

Various data 1
zoom data
zoom magnification 22.97

|  | WE | CW | ST | CT | TE |
|---|---|---|---|---|---|
| focal length | 4.67 | 9.78 | 20.9 | 49.82 | 107.28 |
| FNO. | 3.45 | 4.29 | 5.13 | 7.16 | 6.49 |
| angle of view 2ω (°) | 86.91 | 42.89 | 20.5 | 8.84 | 4.11 |
| image height | 3.86 | 3.86 | 3.86 | 3.86 | 3.86 |
| D5 | 0.3 | 6.37 | 16.38 | 21.82 | 30.94 |
| D11 | 23.5 | 13.06 | 8.38 | 3.41 | 1.2 |
| D17 | 2.15 | 4.12 | 6.45 | 9.72 | 6.43 |
| D19 | 2.62 | 4.73 | 7.28 | 11.8 | 13.83 |
| D21 | 6.84 | 6.94 | 4.89 | 5.38 | 4.18 |

Various data 2
focal length of each lens group

| f1 | 46.22 |
|---|---|
| f2 | −6.53 |
| f3 | 9.86 |
| f4 | −11.92 |
| f5 | 20.81 |

NUMERICAL VALUES OF EXAMPLE 5

| surface No. | r | d | nd | vd |
|---|---|---|---|---|
| 1 | 39.669 | 0.9 | 2.00069 | 25.46 |
| 2 | 27.536 | 3 | 1.59282 | 68.63 |
| 3 | ∞ | 0.1 | | |
| 4 | 24.238 | 2.1 | 1.497 | 81.54 |
| 5 | 61.917 | D5 (variable) | | |
| 6 | 31.742 | 0.4 | 1.883 | 40.8 |
| 7 | 6.26 | 3.55 | | |
| 8 (aspheric) | −9.961 | 0.3 | 1.7432 | 49.34 |
| 9 (aspheric) | 26.421 | 0.3 | | |
| 10 | 15.468 | 1.92 | 1.94595 | 17.98 |
| 11 | ∞ | D11 (variable) | | |
| 12 (stop) | ∞ | 0 | | |
| 13 (aspheric) | 6.865 | 2.03 | 1.58913 | 61.14 |
| 14 (aspheric) | 2923.081 | 1.15 | | |
| 15 | 15.797 | 0.4 | 1.91082 | 35.25 |
| 16 | 4.928 | 2.9 | 1.51633 | 64.14 |
| 17 | −12.135 | D17 (variable) | | |
| 18 | −39.624 | 0.6 | 1.5254 | 56.25 |
| 19 | 8.272 | D19 (variable) | | |
| 20 (aspheric) | 18.547 | 2.1 | 1.497 | 81.54 |
| 21 (aspheric) | −14.713 | D21 (variable) | | |
| 22 | ∞ | 0.3 | 1.51633 | 64.14 |
| 23 | ∞ | 0.5 | | |
| 24 | ∞ | 0.5 | 1.51633 | 64.14 |
| 25 | ∞ | 0.37 | | |
| Image plane | ∞ | | | |

-continued

Aspheric coefficients the 8th surface

K = 0.000
A4 = 1.40E−04
A6 = −4.21E−07
A8 = −1.31E−07 the 9th surface

K = 0.000
A4 = 1.80E−04
A6 = −7.58E−08
A8 = −1.31E−09
A10 = −2.00E−09 the 13th surface

K = 0.000
A4 = −2.03E−04
A6 = 1.18E−05
A8 = −8.15E−07 the 14th surface

K = 0.000
A4 = 2.89E−04
A6 = 1.26E−05
A8 = −1.09E−06
A10 = 6.59E−09 the 20th surface

K = 0.000
A4 = −1.26E−06
A6 = −4.38E−06
A8 = −1.03E−09
A10 = −1.06E−12 the 21st surface

K = 0.000
A4 = −1.36E−08
A6 = 4.24E−07
A8 = −6.30E−07
A10 = 1.82E−08

Various data 1
zoom data
zoom magnification 22.96

|  | WE | CW | ST | CT | TE |
|---|---|---|---|---|---|
| focal length | 4.72 | 9.38 | 20.05 | 49.76 | 108.36 |
| FNO. | 2.67 | 3.3 | 4.06 | 5.63 | 7.03 |
| angle of view 2ω (°) | 86.23 | 44.63 | 21.33 | 8.67 | 4.02 |
| image height | 3.86 | 3.86 | 3.86 | 3.86 | 3.86 |
| D5 | 0.3 | 5.31 | 14.82 | 20.45 | 26.2 |
| D11 | 20.01 | 11.37 | 7.72 | 2.8 | 1.2 |
| D17 | 2.76 | 5.87 | 8.57 | 14.65 | 12.29 |
| D19 | 2.14 | 3.74 | 6.49 | 8.25 | 15.61 |
| D21 | 6.96 | 6.22 | 4.14 | 2.51 | 0.5 |

Various data 2
focal length of each lens group

| f1 | 43.48 |
|---|---|
| f2 | −6.08 |
| f3 | 10.32 |
| f4 | −12.97 |
| f5 | 16.86 |

NUMERICAL VALUES OF EXAMPLE 6

| surface No. | r | d | nd | vd |
|---|---|---|---|---|
| 1 | 50.685 | 1 | 1.91082 | 35.25 |
| 2 | 27.784 | 0.1 | | |

-continued

| | | | | |
|---|---|---|---|---|
| 3 | 28.551 | 3.25 | 1.497 | 81.61 |
| 4 | −139.32 | 0.15 | | |
| 5 | 22.304 | 2.3 | 1.497 | 81.61 |
| 6 | 92.726 | D6 (variable) | | |
| 7 | 39.991 | 0.4 | 1.883 | 40.76 |
| 8 | 6.211 | 2.95 | | |
| 9 (aspheric) | −9.818 | 0.4 | 1.7432 | 49.34 |
| 10 (aspheric) | 23.762 | 0.3 | | |
| 11 | 14.946 | 1.53 | 1.94595 | 17.98 |
| 12 | ∞ | D12 (variable) | | |
| 13 (stop) | ∞ | 0 | | |
| 14 (aspheric) | 7.032 | 2.5 | 1.58913 | 61.25 |
| 15 (aspheric) | −239.72 | 0.8 | | |
| 16 | 25.427 | 0.4 | 1.91082 | 35.25 |
| 17 | 5.2 | 2.8 | 1.58313 | 59.38 |
| 18 | −11.329 | D18 (variable) | | |
| 19 | −48.598 | 0.6 | 1.6223 | 53.17 |
| 20 | 8.436 | D20 (variable) | | |
| 21 (aspheric) | 20.654 | 2.6 | 1.497 | 81.61 |
| 22 (aspheric) | −11.917 | D22 (variable) | | |
| 23 | ∞ | 0.3 | 1.51633 | 64.14 |
| 24 | ∞ | 0.5 | | |
| 25 | ∞ | 0.5 | 1.51633 | 64.14 |
| 26 | ∞ | 0.37 | | |
| Image plane | ∞ | | | |

Aspheric coefficients the 9th surface $K = 0.000$
$A4 = 1.34E-08$
$A6 = -1.20E-07$
$A8 = 5.83E-08$ the 10th surface $K = 0.000$
$A4 = 5.17E-05$
$A6 = 6.68E-06$
$A8 = -3.99E-08$ the 14th surface $K = 0.000$
$A4 = -2.29E-04$
$A6 = 3.34E-06$
$A8 = -1.08E-07$ the 15th surface $K = 0.000$
$A4 = 3.32E-04$
$A6 = 5.81E-07$
$A8 = -6.10E-08$ the 21st surface $K = 0.000$
$A4 = 3.17E-05$
$A6 = 2.81E-12$ the 22nd surface $K = 0.000$
$A4 = 2.47E-04$
$A6 = 3.25E-07$
$A8 = -6.58E-08$ Various data 1
zoom data
zoom magnification 23.04

| | WE | CW | ST | CT | TE |
|---|---|---|---|---|---|
| focal length | 4.59 | 9.55 | 19.73 | 45.12 | 105.77 |
| FNO. | 3.33 | 4.37 | 5.29 | 6.64 | 6.61 |
| angle of view 2ω (°) | 88.04 | 43.14 | 21.29 | 9.47 | 4.06 |
| image height | 3.86 | 3.86 | 3.86 | 3.86 | 3.86 |
| D6 | 0.3 | 6.31 | 14.27 | 21.51 | 29 |
| D12 | 19.68 | 12.43 | 7.8 | 4.24 | 1.2 |
| D18 | 4.21 | 6.03 | 8.89 | 11.99 | 10.15 |
| D20 | 2.27 | 6.36 | 7.64 | 9.8 | 11.84 |
| D22 | 5.01 | 4.6 | 3.81 | 3 | 3.24 |

Various data 2
focal length of each lens group

| | |
|---|---|
| f1 | 43.13 |
| f2 | −5.83 |
| f3 | 10.04 |
| f4 | −11.5 |
| f5 | 15.62 |

NUMERICAL VALUES OF EXAMPLE 7

| surface No. | r | d | nd | vd |
|---|---|---|---|---|
| 1 | 52.186 | 1 | 1.90366 | 31.32 |
| 2 | 28.821 | 0.1 | | |
| 3 | 28.348 | 3.1 | 1.497 | 81.54 |
| 4 | −153.555 | 0.1 | | |
| 5 | 23.685 | 1.92 | 1.59282 | 68.63 |
| 6 | 65.789 | D6 (variable) | | |
| 7 | 38.971 | 0.4 | 1.883 | 40.76 |
| 8 | 6.502 | 3.43 | | |
| 9 (aspheric) | −10.164 | 0.4 | 1.7432 | 49.34 |
| 10 (aspheric) | 22.372 | 0.3 | | |
| 11 | 15.124 | 1.53 | 1.94595 | 17.98 |
| 12 | ∞ | D12 (variable) | | |
| 13 (stop) | ∞ | 0 | | |
| 14 (aspheric) | 6.2 | 1.92 | 1.58313 | 59.38 |
| 15 (aspheric) | −742.942 | 0.8 | | |
| 16 | 16.607 | 0.4 | 1.91082 | 35.25 |
| 17 | 4.618 | 2.89 | 1.51633 | 64.14 |
| 18 | −11.107 | D18 (variable) | | |
| 19 | −54.409 | 0.6 | 1.55025 | 62.06 |
| 20 | 7.651 | D20 (variable) | | |
| 21 (aspheric) | 97.373 | 2.4 | 1.497 | 81.54 |
| 22 (aspheric) | −9.604 | D22 (variable) | | |
| 23 | ∞ | 0.3 | 1.51633 | 64.14 |
| 24 | ∞ | 0.5 | | |
| 25 | ∞ | 0.5 | 1.51633 | 64.14 |
| 26 | ∞ | 0.37 | | |
| Image plane | ∞ | | | |

Aspheric coefficients the 9th surface $K = 0.000$
$A4 = 3.69E-05$
$A6 = -1.86E-07$
$A8 = -4.84E-08$ the 10th surface $K = 0.000$
$A4 = 1.10E-04$
$A6 = 1.79E-06$ the 14th surface $K = 0.000$
$A4 = -1.79E-04$
$A6 = 8.63E-07$
$A8 = -2.36E-08$ the 15th surface $K = 0.000$
$A4 = 4.65E-04$
$A6 = 1.10E-06$ the 21st surface $K = 0.000$
$A4 = -2.92E-04$
$A6 = -3.63E-06$ the 22nd surface $K = 0.000$
$A4 = 1.59E-04$
$A6 = -7.65E-06$
$A8 = 6.92E-08$ -continued Various data 1
zoom data
zoom magnification 22.60

|  | WE | CW | ST | CT | TE |
|---|---|---|---|---|---|
| focal length | 4.56 | 9.44 | 20.67 | 45.95 | 103.04 |
| FNO. | 2.84 | 3.78 | 4.9 | 5.97 | 7.02 |
| angle of view 2ω (°) | 88.48 | 43.11 | 20.18 | 9.19 | 4.13 |
| image height | 3.86 | 3.86 | 3.86 | 3.86 | 3.86 |
| D6 | 0.3 | 6.33 | 14.07 | 21.23 | 27.14 |
| D12 | 20.43 | 13.26 | 8.27 | 4.18 | 1.2 |
| D18 | 3.87 | 5.15 | 7.29 | 10.52 | 11.05 |
| D20 | 2.6 | 6.99 | 10.22 | 11.11 | 14.73 |
| D22 | 4.35 | 3.54 | 2.58 | 2 | 2.07 |

Various data 2
focal length of each lens group

| f1 | 43.6 |
|---|---|
| f2 | −6 |
| f3 | 9.77 |
| f4 | −12.15 |
| f5 | 17.72 |

FIGS. 8 through 14 illustrate aberrations at the infinite point at (a) wide angle end (WE), (b) intermediate state and (c) telescopic end, respectively.

In these aberration illuminations, SA indicates spherical aberration, ΔS indicating astigmatism, DT indicating distortion and CC indicating magnification chromatic aberration. Shown are illustrations of spherical aberration SA at respective wavelengths of 587.6 nm (d line; solid line), 435.8 nm (g line; broken line) and 656.3 nm (C line; dotted line). Further, shown are illustrations of magnification chromatic aberration CC at respective wavelengths of 435.8 nm (g line; broken line) and 656.3 nm (C line; dotted line) under adoption of d line as reference. As for astigmatism AS, shown are solid line giving an illustrate ion thereof at a sagittal image plane and broken line giving an illustrate ion thereof at a meridional image plane. In addition, FNO indicates F-number and FIY indicates the maximum image height.

Below shown are the values of formulas (1A) to (4A) and (1B) to (5B) in the respective cases of Example 1 to Example 7.

|  | Example 1 | Example 2 | Example 3 | Example 4 |
|---|---|---|---|---|
| Conditional formula (1A) | 0.38 | 0.39 | 0.39 | 0.43 |
| Conditional formula (2A) | −0.05 | −0.06 | −0.05 | −0.06 |
| Conditional formula (3A) | −0.17 | −0.14 | −0.13 | −0.11 |
| Conditional formula (4A) | 0.77 | 0.77 | 0.75 | 0.74 |
| Conditional formula (1B) | 22.96 | 23.01 | 23.02 | 22.99 |
| Conditional formula (2B) | 0.20 | 0.36 | 0.58 | 0.67 |
| Conditional formula (3b) | −0.80 | −0.97 | −0.93 | −0.57 |
| Conditional formula (4B) | 3.10 | 2.77 | 2.28 | 2.32 |
| Conditional formula (5B) | −0.17 | −0.14 | −0.13 | −0.11 |

|  | Example 5 | Example 6 | Example 7 |
|---|---|---|---|
| Conditional formula (1A) | 0.40 | 0.41 | 0.42 |
| Conditional formula (2A) | −0.06 | −0.06 | −0.06 |
| Conditional formula (3A) | −0.12 | −0.11 | −0.12 |
| Conditional formula (4A) | 0.73 | 0.75 | 0.77 |
| Conditional formula (1B) | 22.93 | 22.98 | 22.60 |
| Conditional formula (2B) | 0.41 | 0.57 | 0.58 |
| Conditional formula (3b) | −1.40 | −0.39 | −0.50 |
| Conditional formula (4B) | 2.91 | 2.42 | 3.04 |
| Conditional formula (5B) | −0.12 | −0.11 | −0.12 |

Constructions as described bellow may be employed in the respective Examples.

With the zoom lenses of the Examples, barrel-like distortion appears on a rectangular photoelectric conversion surface. On the other hand, distortion is avoided from being generated at an intermediate focal length state and the telescopic end. The photoelectric conversion surface desirably has an effective image pickup zone which is configured like a barrel at the wide angle end while being rectangle at an intermediate state and the telescopic end in order to correct distortion electrically. And, the effective image pickup zone preset is image-converted into a rectangular image information with distortion reduced. Image height IHw at the wide angle end made smaller than image height IHs at an intermediate state and image height flit at the telescopic end.

Figure 15:
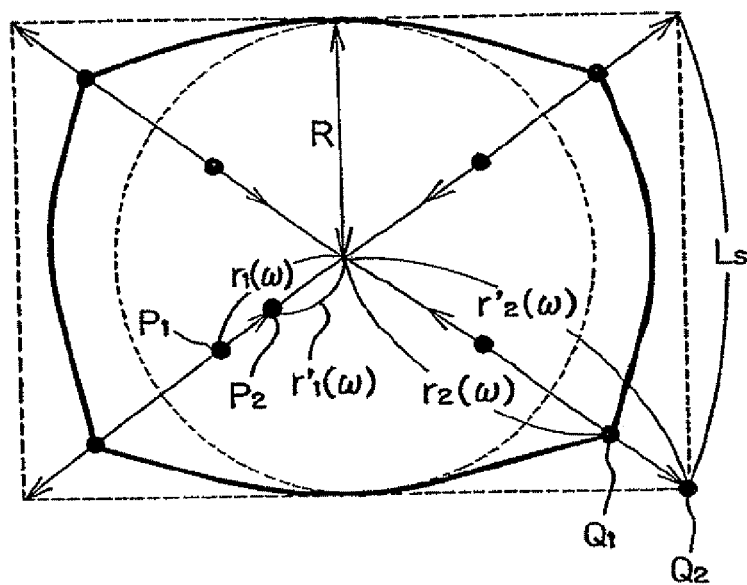
FIG. 15 is a diagram illustrating correction of distortion.

As shown in FIG. 15, fixed is magnification on a circle of radius R (image height) which has the center located at the point of intersection of the optical axis and the image pickup surface and inscribes the longer side of the rectangular effective image pickup zone, and the circle is adopted as the reference for correction. And, the other points on any circle of radius r(ω) (image height) are shifted generally in a radial direction so as to achieving concentric shifts bringing radius r'(ω), thereby realizing correction.

For example, in FIG. 15, point P1 on a circle of any radius R1(ω) located inside of the circle of radius R is shifted, toward the circle center, to point P2 on a circle of radius r1'(ω) to which correction is to be done. On the other hand, point Q1 on a circle of any radius r2(ω) located outside of the circle of radius R is shifted, in a direction away from the circle center, to point Q2 on a circle of radius r2'(ω) to which correction is to be done. It is noted that r'(ω) can be expressed as follows.

$$r'(\omega) = \alpha f \tan \omega (0 \leq \alpha \leq 1)$$

:where ω is half angle of view of the object to be image-picked up and f is focal length of image-formation system (zoom lens in the present embodiment).

Now, defining Y as ideal image height corresponding to "on the above-mentioned circle of radius r (image height), the following is obtained.

$$\alpha = R/Y = R/f \tan \omega$$

Ideally, the optical system is rotationally symmetric with respect to the optical axis, thus causing distortion to appear rotationally symmetric with respect to the optical axis, Therefore, in cases where distortion generated optically is corrected electrically, if correction is achieved, as described above, by fixing magnification on a circle of radius R. (image height) which has the center located at the point of intersection of the optical axis and the image pickup surface on the image to be reproduced and inscribes the longer side of the effective image pickup zone, and by shifting the other points on a circle (image height) of radius r(ω) generally in a radial direction so as to achieving concentric shifts bringing radius r'(ω), advantage in view of data quantity and calculation quantity will be obtained.

However, an optical image provides quantity which is not continuous at being image-picked up by an image-pickup (because of sampling). Accordingly, saying strictly, the above-mentioned circle of radius R drawn on the optical image is not made circular correctly unless the pixels are disposed radially. In other words, when shape correction applied to image data provided at discrete coordinate points individually, any circle of radius R on which magnification can be fixed does not exist. Therefore, it is recommended to employ a method according to which pixel coordinates (X'i, Y'j) to which shift should be done is determined for every pixel coordinates (Xi, Yj). It is noted that an average of the values provided at the respective pixel coordinates is adopted if two or more points of (Xi, Yj) are shifted to one (X'i, Y'j). Further, if no point comes via shifting, it is recommended to use the values of some neighbour pixel coordinates (X'i, Y'j) to apply interpolation.

Such a method is effective particularly in correction in cases where a zoom lens of an electronic image pickup apparatus is subject to remarkable distortion with respect to the optical axis because of manufacturing errors of the optical system or image pickup devices and the forementioned circle of radius R drawn on the forementioned optical image is asymmetric. The method is also effective in correction in cases where geometric distortion or the like is generated at reproducing of an image from electric signals by image pickup devices or various outputting devices.

With the electronic image pickup apparatus of the present embodiment, r(ω), namely, relation between half angle of view and image height or between actual image height r and ideal image height r'/α may be prerecorded on recording medium incorporated in the electronic image pickup apparatus in order to calculate the quantity of correction r'(ω)−r(ω).

In addition, the forementioned radius R satisfies preferably the following conditional formula if it is intended to avoid the image after distortion correction from having an extraordinary shortage of quantity of light at the both ends along the direction of the shorter side.

$$0 \leq R \leq 0.6 Ls;$$

where LS is the length of the shorter side of the effective image pickup zone.

Preferably, the forementioned radius R satisfies the following conditional formula.

$$0.3 Ls \leq R \leq 0.6 Ls$$

Furthermore, it is most advantageous that the forementioned radius R is approximately equal to the radius of an inscribing circle with respect to the direction of the shorter side of the effective image pickup zone. In addition, if correction is performed under fixing of magnification in the vicinity of radius R=0, namely, in the vicinity of the axis, disadvantage arises somewhat with regards to the substantial number of the pixels, but advantage for size reduction is secured without being hindered by widening of view.

It is noted that the range of focal length in which correction is required is divided into some divisional focal zones. Then correction may be done by applying the same quantity of correction as that of the cases where correction result satisfying generally following formula at the vicinity of telescopic end within the divisional focal zones is obtained.

$$r'(\omega) = \alpha f \tan \omega$$

However, in such a case, the quantity of barrel-like distortion remains to some degree at the vicinity of the wide angle end within the divisional focal zones. Further, if the number of divisional focal zones are increased, recording medium to be equipped with to record characteristic data necessary for correction is increased, which is somewhat undesirable. Thus one or more coefficients relating to the respective focal lengths within divisional focal zones. Such a coefficients) may be determined previously based on simulation or measurement results of experiment. Then calculated is the quantity of correction which is obtained in cases where the obtained correction results satisfies approximately $$r(\omega) = \alpha f \tan \omega$$

at vicinity of the telescopic end, and further finally adopted quantity of correction may be determined as the calculated quantity of correction multiplied by the foresaid coefficient for each focal length indiscriminately.

By the way, the following formula is satisfied if no distortion is contained in an image obtained through image-formation of an infinite object.

$$f = y/\tan \omega$$

Here, y is the height of image point with respect to the optical axis (image height), f being focal length of image-formation system (zoom lens in the present embodiment) and ω being the angle (half angle of view of the object to be image-picked up) made by the optical axis and a direction of an object point corresponding to an image point formed at a position distant from the center of the image pickup surface.

If the image-formation system has any barrel-like distortion, satisfied is:

$$f > y/\tan \omega.$$

That is, provided that the focal length of the image-formation system f and image height y are constant, the value of ω gets greater.

Further, it is preferable to have an image conversion unit which convert electrical signals of an image obtained through image-picking up using a zoom lens through image-processing into image signals with chromatic blur owing to magnification chromatic aberration corrected. better image will be obtained by correcting magnification chromatic aberration of the zoom lens electrically.

In general, with an electronic still camera, a color image is reproduced by overlapping through calculation the respective output signals of the first primary color, the second primary color and the third primary color which are obtained by applying color separation to the image of the object to be image-picked up for getting three primary colors. If the zoom lens has magnification chromatic aberration, the positions at which images of second and third primary colors are formed are deviated from the image formation position of the first primary color under such proposition that the image of the first primary color is regarded as the reference. In order to correct magnification chromatic aberration of image determined electronically and previously is the quantity of deviation of each of the image formation positions of the second and third primary colors with respect to the image formation position of the first primary color for the respective pixels of the image pickup device individually based on aberration information of the zoom lens. Then conversion of coordinates may be carried on so that correction just corresponding to the deviation with respect to the first primary color is realized for the respective pixels of the a age picked up.

For example, giving description on the case of an image consisting of output signals of three primary colors, red (R), green (G) and blue (B), deviations of the image formation positions of R and B with respect to G are evaluated for each pixel previously and coordinate conversion is applied to the image picked up so that the deviations with respect to G are cancelled, and then signals of R and B can be outputted.

Although magnification chromatic aberration changes depending on zooming, focusing and value of stop, it is a useful good way to have a data storage device memorize the quantity of such deviations of the second primary color and the third primary color with respect to the face primary color for each lens position (zooming, focusing and value of stop) individually as correction data. By referring to these correction data depending on zoom position, it is made achievable to output the signals of the second primary color and the third primary color which are corrected with regards to the deviations of the second primary color and the third primary color with respect to the first primary color.

Further, a flare stop may be disposed in addition to an aperture stop in order to cut out unnecessary light such as ghost or flare.

Location of disposition may be set, quite optionally, at the object side of the first lens group, between the first and the second lens groups, between the second and the third lens groups, between the third and the forth lens groups, between the forth and the fifth lens groups or between the lens group the closest to the image plane and the image plane. A frame member included in the construction may be utilized for cutting off flare rays, or another member included in the construction the construction may be adopted as a flare stop. Furthermore, direct printing, painting or sticker may be applied to the optical system for providing a flare stop. Still further, a flare stop may have quite optionally any shape, for example, circle, ellipse, rectangle, polygon or zone-shape surrounded by functional curves In addition, it may be effected to cut off not only harmful light fluxes but also light fluxes in the inside vicinity of the periphery of an image field which would cause coma flare or the like.

Further, anti-reflection coat may be applied to each lens to reduce ghost and flare. Reduction of ghost and flare is achieved effectively by adopting multi-coat, which is desirable. In addition, IR-cut (infrared ray blocking) coat may be applied to a lens surface(s) and/or cover glass surface(s) and so on.

In addition, falling of brightness (shading) appearing in the inside vicinity of the periphery of an image may be reduced by shifting microlenses of CCD. For example, design of microlenses of CCD may modified so as to match with light incidence angles at respective image heights. Further, image processing may be applied for correcting the quantity of falling which occurs in the inside vicinity of the periphery of an image.

It is conventional to apply anti-reflection coat to lens surfaces contacting with the air in order to prevent ghost and flare from being generated. On the other hand, an adhesive agent applied to a cemented face of a cemented lens has refractive index higher enough as than that of the air. Accordingly, in many cases, the reflectance thereof is originally similar to that of single-layer-coat or smaller, with the result that coat is seldom applied. However, ghost and flare will be further reduced and better image quality will be obtained by applying anti-reflection coat also to cemented faces positively.

Specifically, although glass materials of high refractive index have become popular and have been employed of ten recently in camera optical systems as being highly advantageous for aberration correction, reflection caused at a cemented face is not negligible when a glass material of high refractive index is adopted as a cemented lens. In such a case, it is particularly effective to apply anti-reflection coat previously to a cemented face.

Effective application ways of cemented face coat are disclosed in JP-A-1990-27301, JP-A-2001-324676, JP-A-2005-92115, U.S. Pat. No. 7,116,482 etc.

coat material employed may be chosen optionally on account of refractive index of the lens forming substrate and refractive index of the adhesive used from materials of comparatively high refractive index such as Ta2O5, TiO2, Nb2O5, ZrO2, HfO2, CeO2, SnO2, In2O3, ZnO and Y2O3, or materials of comparatively low refractive index such as MgF2, SiO2 and Al2O3, and coat thickness is set desirably so as to satisfy a phase condition.

As a matter of course, multi-coat may be adopted as cemented face coat like in the case of coat applied to lens surfaces contacting with the air. Two or more layers of coat materials, and hence two or more coat thickness values are allowed to be adopted in combination optionally, thereby rendering further reflectance reduction possible and enabling the spectral characteristics and the angle characteristics of the reflectance and so forth to be controlled. Needless to say, cemented surface coat may be also applied to the cemented surfaces of the lens groups other than the first lens group according to generally the same idea.

Figure 16:
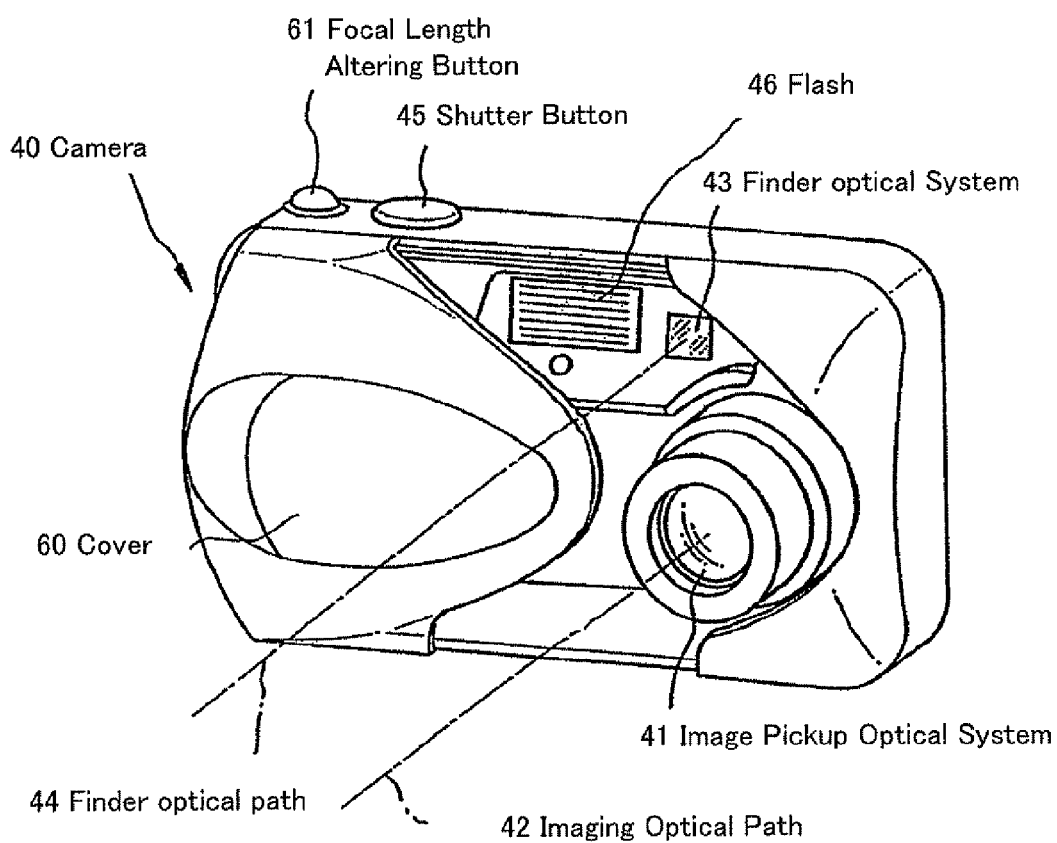
FIG. 16 is a perspective frontal outward view of a digital camera of an embodiment according to the present invention.
Figure 17:
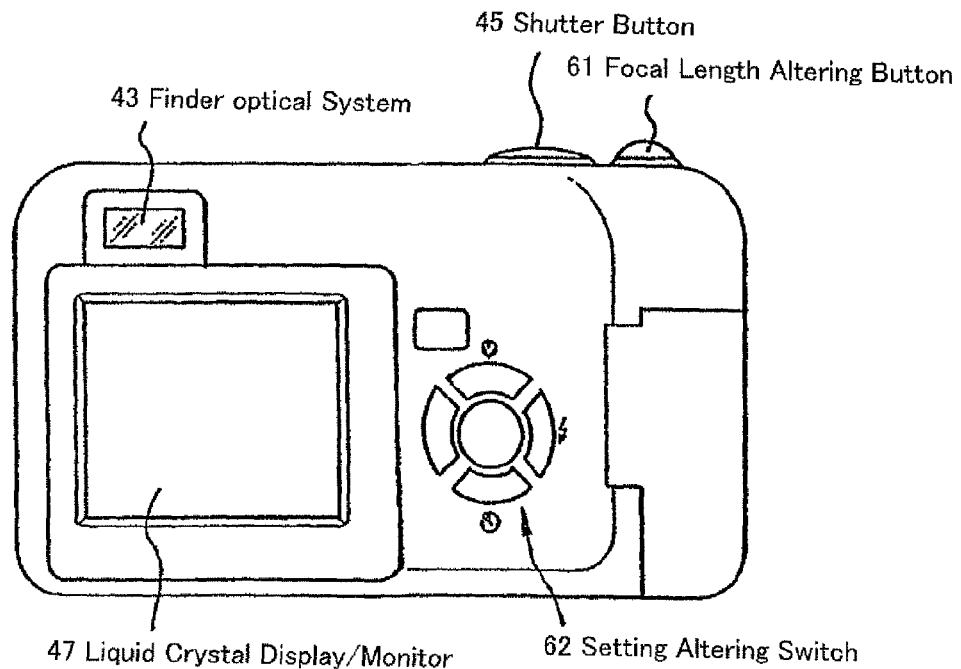
FIG. 17 is a just rear outward view of the digital camera shown in FIG. 16.
Figure 18:
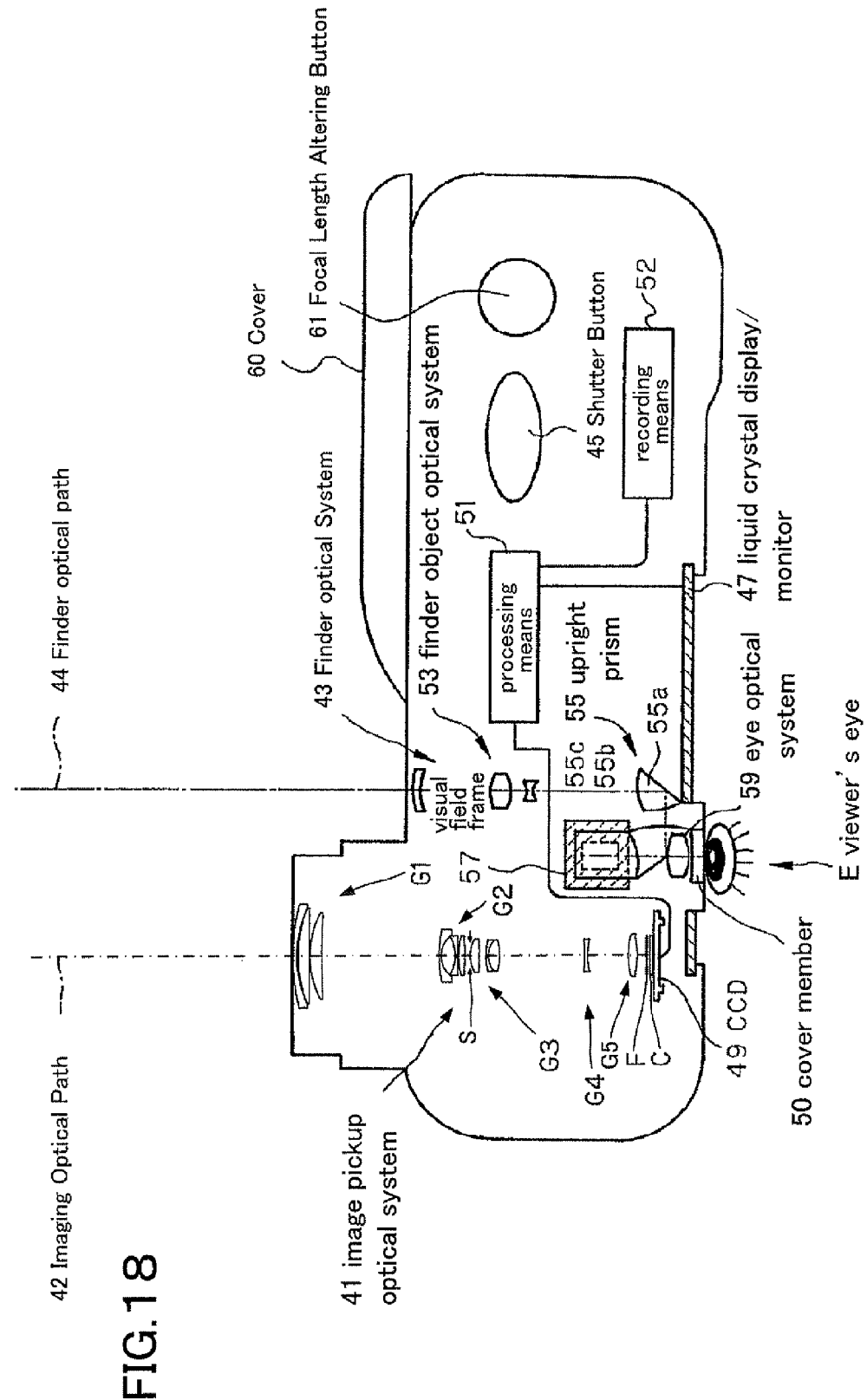
FIG. 18 is a cross-sectional view of the digital camera shown in FIG. 16.

FIGS. 16 through 18 are schematic illustrations of a digital camera provided with an image pickup optical system 41 in which a zoom lens in accordance with the present invention is incorporated. FIG. 16 is a perspective frontal outward view of a digital camera 40. FIG. 17 is a just rear outward view of the same and FIG. 18 is a schematic cross-sectional view of the digital camera 40. Note that the image pickup optical system 41 is not in retracted position (i.e. not at collapse) in FIGS. 16 and 18.

In this instance, the digital camera 40 includes an image pickup optical system 41 disposed on the imaging optical path 42, a finder optical system 43 arranged on the finder optical path 44, a shutter button 45, a flash lamp 46, a liquid crystal display/monitor 47, a focal length altering button 61, a setting altering switch 62 and so forth, wherein the image pickup optical system 41, the finder optical system 43 and the flash lamp 46 come to be covered with a cover 60 by sliding when the image pickup optical system 41 is in the retracted position at collapse. As the cover 60 is opened and the camera 40 is set ready for an image pickup operation, the lens barrel of the image pickup optical system 41 escapes from collapse state and comes to state (non-collapse) as shown in FIG. 16, and then, as the shutter button 45 arranged at the top of the camera 40 is depressed, the image pickup optical system 41 operates cooperatively so that an image is picked up by way of the zoom lens of Example 1, for example, and the image of an object is formed by the image pickup optical system 41 on the imaging surface (photoelectric conversion surface) of the CCD 49 via the low pass filter F equipped with a wavelength range limiting coat and a cover glass C.

The image of the object formed by light received by the CCD 49 is then displayed on the liquid crystal display/monitor 47 arranged on the back surface of the camera as an electronic image by way of a processing means 51. The processing means 51 for the liquid crystal display/monitor 47 may be connected to a recording means 52 so as to record the picked up electronic image. The recording means 52 may be a unit separate from the processing means 51, and may be so arranged that the electronic image is electronically recorded/written on a flexibility disk(r), a memory card. In addition, the CCD 49 may be replaced by a silver salt film camera using a silver salt film.

Further, finder objective optical system 53 is arranged on the finder optical path 44. The finder objective optical system 53 is formed of a plurality of lens groups (three groups in the illustrated instance) and an upright prism system 55 including upright prisms 55a, 55b and 55c, providing a zooming optical system which is interlocked with the zoom lens of the image pickup optical system 41 to change the focal length. The image of an object picked up by the finder objective optical system 53 is made to appear in the visual field frame 57 of the upright prism system 55 that is an image erection member. An eye optical system 59 for leading the picked up image that is an upright image to a viewer's eye E is arranged behind the upright prism system 55. In addition, a cover member 50 is disposed at the exit side of the eye optical system 59.

Figure 19:
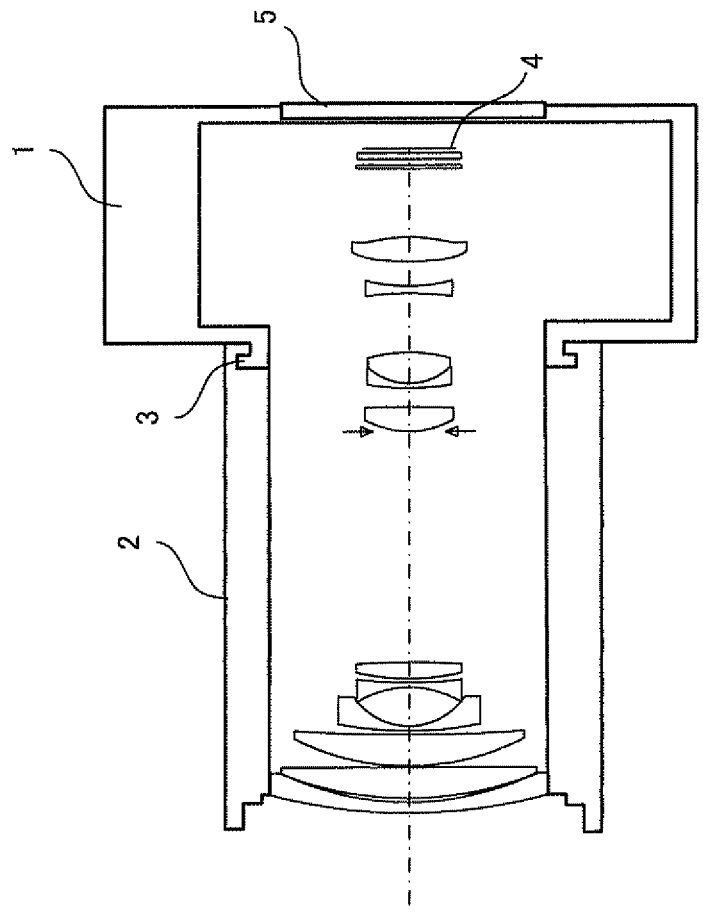
FIG. 19 is a cross-sectional view of an image pickup apparatus which employs a zoom lens of an embodiment according to the present invention as an interchangeable lens.

FIG. 19 is a cross-sectional view of a single-eye mirrorless camera as an image pickup apparatus which uses a zoom lens according to the present embodiment and employs CCD, CMOS or the like as image pickup device. In FIG. 19, numeral 1 denotes the single-eye mirrorless camera, numeral 2 denoting an image pickup lens system disposed within a lens barrel and numeral 3 denoting a mount part of the lens barrel for enabling the image pickup lens system 2 to be attachable and dettachable. The mount part 3 may be of screw-type, bayonet-type or other types. In this instance, a bayonet-type mount is employed. In addition, numeral 4 denotes image pickup device and numeral 5 denotes a rear monitor.

A zoom lens according to the present embodiment, such as any of above-described Examples 1 to 7 is employed as the image pickup lens system of the single-eye mirrorless camera 1.

Figure 20:
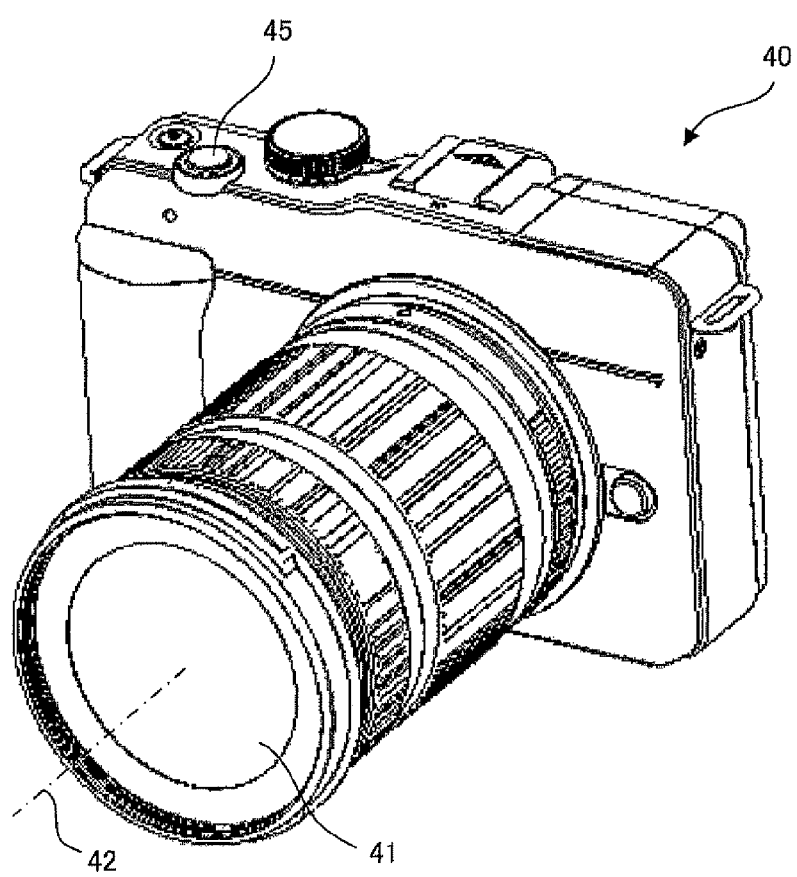
FIG. 20 is another perspective frontal outward view of the digital camera of the embodiment.
Figure 21:
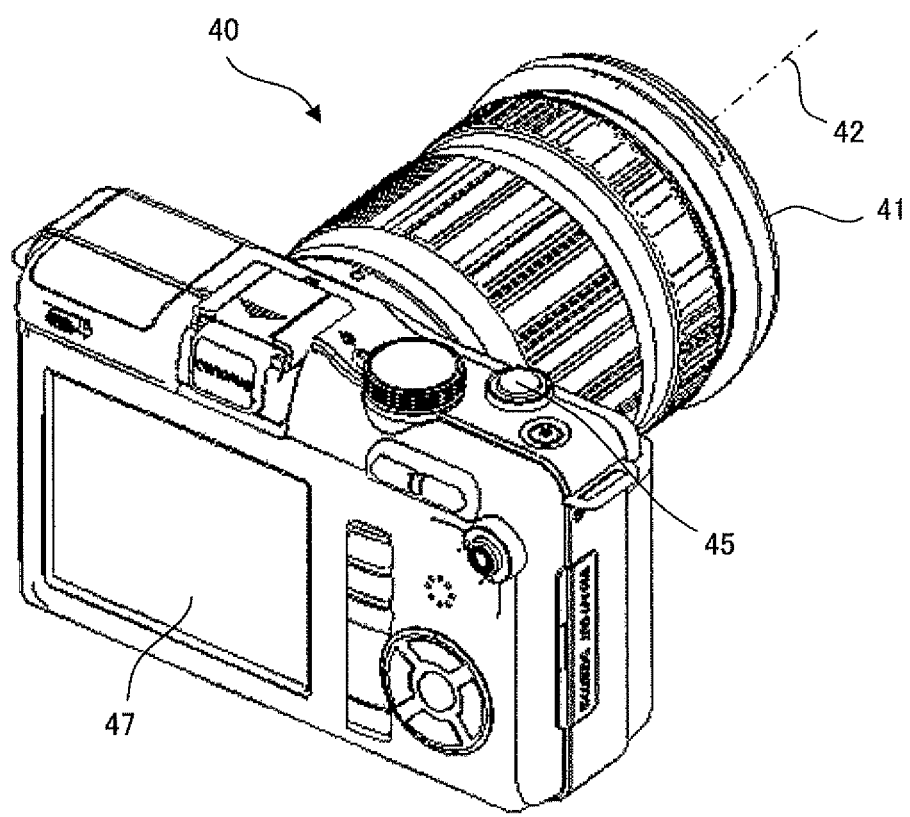
FIG. 21 is another perspective rear outward view of the digital camera of the embodiment.

FIGS. 20 and 21 are schematic illustrations of an image pickup apparatus according to the present embodiment provided with the image pickup optical system 41 in which a zoom lens is incorporated. FIG. 20 gives a perspective frontal outward view of the digital camera 40 as the image pickup apparatus and FIG. 21 gives a perspective rear outward view of the same.

The digital camera 40 of this embodiment includes an image pickup optical system 41 disposed on the imaging optical path 42, a shutter button 45, a liquid crystal display/monitor 47 and so forth. When the shutter button 45 arranged at the top of the camera 40 is depressed, image pickup operation is effected cooperatively via image pickup optical system 41, for example, via the zoom lens of Example 1. An image of an object brought by the image pickup optical system 41 is formed on an image pickup device (photoelectric conversion surface) located at the vicinity of the image-formation plane. Such image of the object formed by light received by the image pickup device is then displayed on the liquid crystal display/monitor 47 arranged on the back surface of the camera as an electronic image by way of any processing means. Thus picked up image can be recorded on any recording means.

Figure 22:
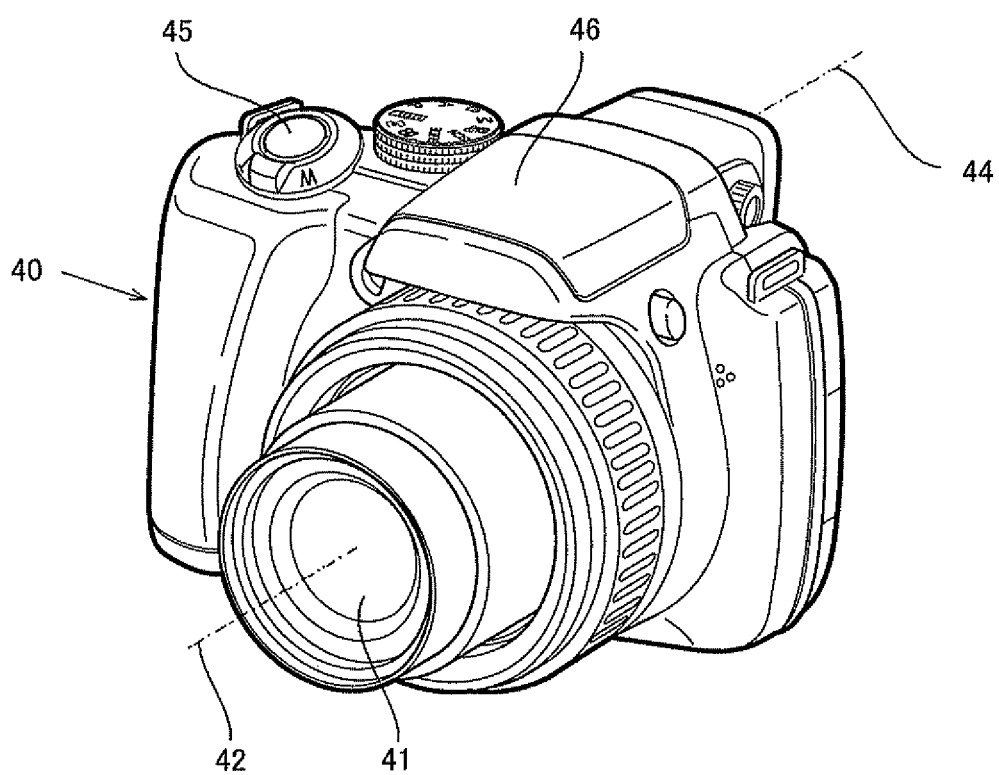
FIG. 22 is still another perspective frontal outward view of the digital camera of the embodiment.
Figure 23:
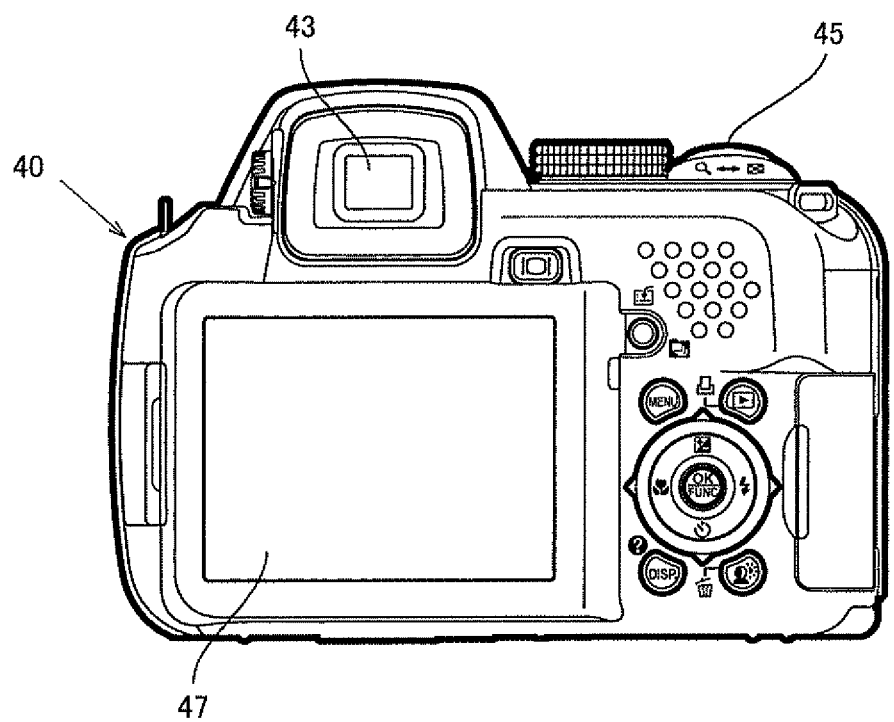
FIG. 23 is still another perspective rear outward view of the digital camera of the embodiment.
Figure 24:
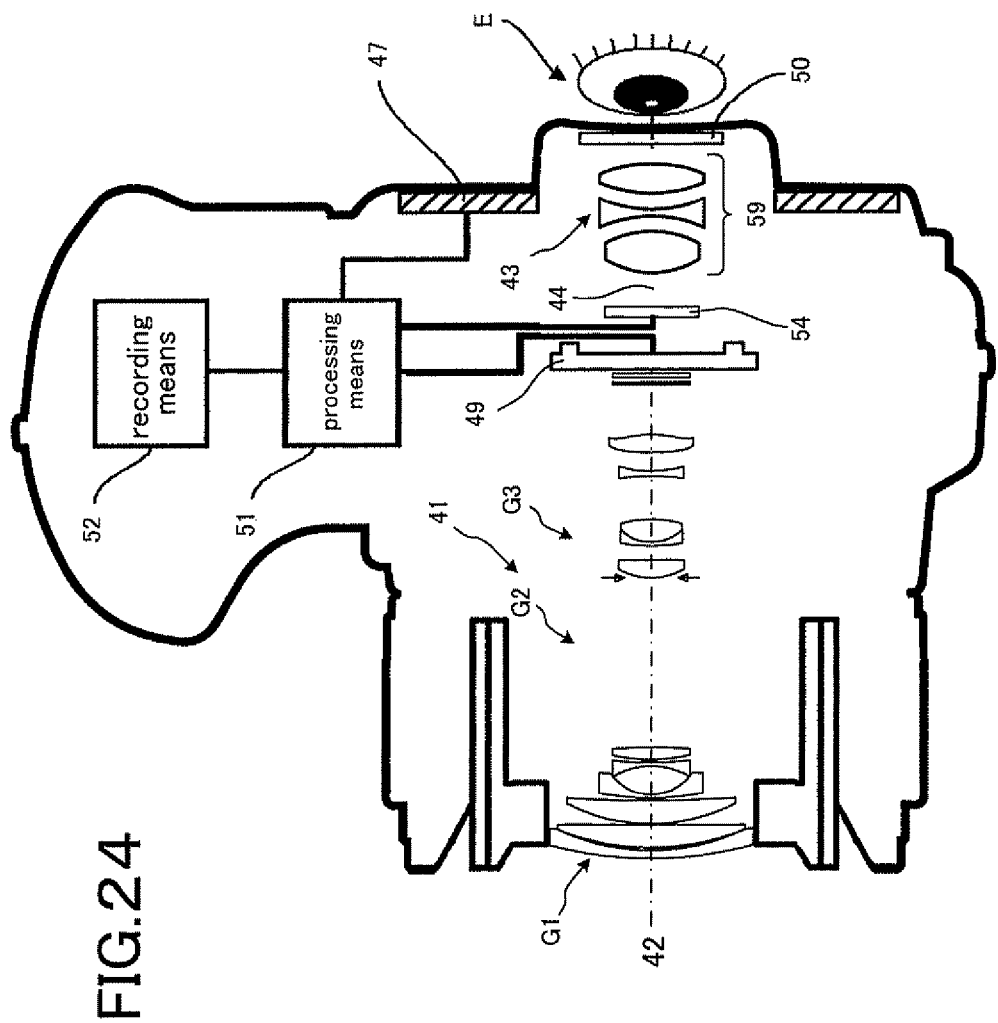
FIG. 24 is a cross-sectional view of the digital camera shown in FIG. 22.

FIGS. 22 to 24 are schematic illustrations of another image pickup apparatus according to the present embodiment provided with the image pickup optical system 41 in which a zoom lens is incorporated. FIG. 22 gives a perspective frontal outward view of the digital camera 40 and FIG. 23 gives a rear outward view of the same, and FIG. 24 gives a lateral cross-sectional schematic view of the digital camera 40.

In this instance, the digital camera 40 includes an image pickup optical system 41 disposed on the imaging optical path 42, a finder optical system 43 arranged on the finder optical path 44, a shutter button 45, a pop up strobo 46, a liquid crystal display/monitor 47 and so forth. As the shutter button 45 arranged at the top of the camera 40 is depressed, the image pickup optical system 41 operates cooperatively so that an image is picked up by way of the zoom lens of Example 1, for example. The image of an object is formed by the image pickup optical system 41 on the imaging surface (photoelectric conversion surface) of the CCD 49 as an image pickup device located in the vicinity of the image formation plane. Such image of the object formed by light received by the image pickup device is then displayed on the liquid crystal display/monitor 47 arranged on the back surface of the camera or a finder image display device 54 as an electronic image by way of a processing means 51. A recording means 52 is connected to the processing means 51, being allowed to record the picked up electronic image.

It is noted that the recording means 52 may be a unit separate from the processing means 51, and may be so arranged that the electronic image is electronically recorded/written on a flexibility disk(r), a memory card. In addition, the CCD 49 may be replaced by a silver salt film camera using a s In addition, a finder ocular 59 is disposed on the finder optical path 44. The object image displayed on the finder image display device 54 is magnified and the diopter is adjusted so as to the viewer can see the displayed image generally with ease by the finder ocular 59. It is noted that a cover member 50 is disposed at the exit side of the finder ocular 59.

Figure 25:
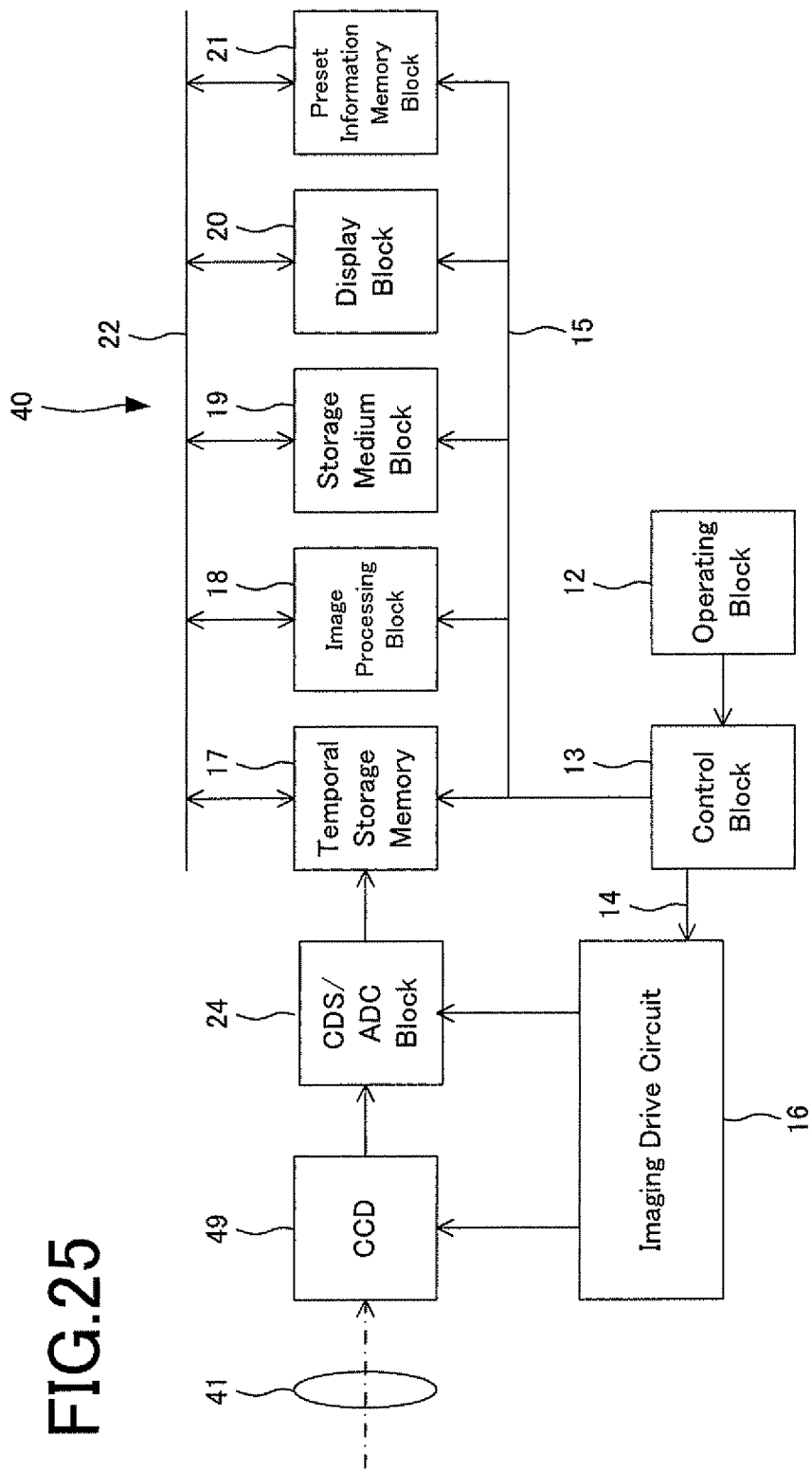
FIG. 25 is a block diagram of a control applied to the digital camera of the embodiment.

FIG. 25 a block diagram illustrating an internal circuit of a principal part of the above-described digital camera 40, As the description hereafter, pay attention to that the forementioned processing means 51 includes, for example, a CDS/ADC section 24, a temporary memory 17, image processing section 18 and so forth, and that the memory means 52 includes a memory medium section and others.

As shown in FIG. 25, the digital camera 40 has an operation section 12, a control section 13 connected to the operation section 12, an image pickup drive circuit 16, a temporary memory 17, an image processing section 18, a memory medium section 19, a display section 20 and a setting information memory section 21, wherein the image pickup drive circuit 16 and the temporary memory 17 are connected to a control signal output port of the control section 13 respectively by way of buses 14 and 15.

The above-listed temporary memory 17, the image processing section 18, the memory medium section 19, the display section 20 and the setting information memory section 21 are so arranged as to be able to input data from and output data to each other by way of a bus 22. The image pickup drive circuit 16 is connected to the CCD 49 and the CDS/ADC section 24.

The operation section 12 has various input buttons and switches. It is a circuit for notifying the event information that is externally input (from a camera user) by way of any of the input buttons and the switches to the control section. The control section 13 is a central processing unit (CPU) that contains a program memory (not shown) and controls the entire digital camera 40 overall according to the programs stored in the program memory.

The CCD 49 is driven and controlled by the image pickup drive circuit 16 and converts the quantity of light of each pixel of the image of the object into electric signals and outputs them to the CDS/ADC section 24.

The CDS/ADC section 24 is a circuit that amplifies the electric signals input from the CCD 49, converts the electric signals into digital signals by analog/digital conversion and then outputs the video raw data (bayer data, to be referred to as RAW data hereinafter) obtained simply by amplification and analog/digital conversion to the temporary memory 17.

The temporary memory 17 is a buffer typically formed by a SDRAM. It is a memory device that temporarily stores the RAW data output from the CDS/ADC section 24. The image processing section 18 is a circuit that reads out the RAW data stored in the temporary memory 17 or the RAW data stored in the memory medium section 19 and electrically executes various image processing operations including those of correcting distortion according to the image quality parameters specified by the control section 13.

The memory medium section 19 detachably holds a recording medium, for example, a card type or a stick type memory medium containing memory device such as flash memory, storing and holding the RAW data transferred from the temporary memory 17 and the image data subjected to an image processing operation in the image processing section 18.

The display section 20 consists of a liquid crystal display/monitor 47 and other components, displaying the image picked up RAW data, image data, an operation menu and so forth. The setting information memory section 21 includes a ROM section that stores various image quality parameters in advance and another RAM section that stores the image quality parameter selected from the image parameters read out from the ROM section by an input operation at the operation section 12.

The digital camera 40 constituted as above-described can be rendered an image pickup apparatus which is small-sized and suitable for moving image picking up by adopting a zoom lens of the present embodiment as the image pickup optical system 41.

The above-description is developed on various embodiments in accordance with the present invention. It is to be noted that the scope of the present invention is not limited by the embodiments. For example, an embodiment obtained by combining arrangements or constructions included in two or more of the above-described embodiments as required also falls within the scope of the present invention.

What is claimed is:

1. A zoom lens comprising:
   a first lens group of positive refractive power;
   a second lens group of negative refractive power;
   a third lens group of positive refractive power; and
   a fourth lens group of negative refractive power, and
   a fifth lens group of positive refractive power arranged in the above-mentioned order from the object side to the image side; wherein,
   at activation of variable power from the wide angle end to the telescopic end,
   the first lens group moves so as to get closer to the object side at the telescopic end than at the wide angle end;
   the third lens group moves so as to get closer to the image side at the telescopic end than at the wide angle end,
   the forth lens group moves so as to get closer to the object side at the telescopic end than at the wide angle end; and
   the fifth lens group moves so as to get closer to the image side at the telescopic end than at the wide angle end at activation of variable power from the wide angle end to the telescopic end; and
   further, at activation of variable power from the wide angle end to the telescopic end,
   a gap between the first lens group and the second lens group increases;
   a gap between the second lens group and the third lens group decreases;
   a gap between the third lens group and the forth lens group increases; and
   a gap between the forth lens group and the fifth lens group increases; and
   the conditional formulas (1B), (2B) and (3B) below are satisfied:

$$10 < ft/fw \quad (1B)$$

$$0.1 < \Delta 4Gd/\Delta 3Gd < 0.72 \quad (2B)$$

$$-3.0 < \Delta 5Gd/fw > -0.16 \quad (3B)$$

where ft is focal length at the telescopic end:
   fw is focal length at the wide angle end:
   $\Delta 3Gd$ is the quantities of displacement of position of the third lens group at the telescopic end with respect to the position of the third lens group at the wide angle end;
   $\Delta 4Gd$ is the quantities of displacement of position of the forth lens group at the telescopic end with respect to the position of the forth lens group at the wide angle end; and
   $\Delta 5Gd$ is the quantities of displacement of position of the fifth lens group at the telescopic end with respect to the position of the fifth lens group at the wide angle end.

2. The zoom lens according to claim 1, wherein the conditional formula (4B) below is satisfied:

$$1.5 < \Delta \beta 3G < 4.0 \quad (4B):$$

where $\Delta \beta 3G = \beta 3t/\beta 3w$;
   $\beta 3t$ is lateral magnification of the third lens group at the wide angle end; and
   $\beta 3w$ is lateral magnification of the third lens group at the telescopic end.

3. The zoom lens according to claim 1, wherein the conditional formula (5B) below is satisfied:

$$-1.5 < f4/fs < -0.2 \quad (5B)$$

where f4 is the focal length of the forth lens group;
   fs is defined as is $=\sqrt{(fw \times ft)}$: and
   fw is the focal length of the zoom lens at the wide angle end.

4. The zoom lens according to claim 1, wherein the second lens group moves so as to get closer to the image side at the telescopic end than at the wide angle end.

5. The zoom lens according to claim 1, wherein the conditional formula (3A) below is satisfied:

$$-0.30 < f4/ft < -0.10 \quad (3A):$$

where f4 is the forementioned focal length of the forth lens group.

6. The zoom lens according to claim 1, wherein the forth lens group consists of a negative lens element.

7. The zoom lens according to claim 1, wherein the conditional formula (4A) below is satisfied:

$$0.5 < Dt/ft < 0.95 \quad (4A):$$

where Dt is the distance from the surface top of the lens surface which is the closest to the object side to the image-formation plane at the telescopic end.

8. The zoom lens according to claim 1, wherein the fifth lens group has at least one aspheric surface.

9. The zoom lens according to claim 1, wherein the third lens group comprises:
   a positive lens element;
   a negative lens element; and
   a positive lens element arranged in order from the object side.

10. The zoom lens according to claim 1, wherein either the forth lens group or the fifth lens group moves in an optical axis when focusing from a distant object toward a near object is done.

11. The zoom lens according to claim 1, wherein either all or a part of the lens elements included in the third lens group move in a decentering way with respect to the optical axis.

12. The zoom lens according to claim 1, wherein
an aperture stop is disposed immediately in front of the third lens group at the object side; and
moves together with the third lens group as one body at activation of variable power.
13. The zoom lens according to claim 1,
wherein the first lens group consists of a plurality of positive lens elements and one negative lens element; the second lens group consists of one positive lens element and a plurality of negative lens elements; the third lens group consists of a plurality of positive lens elements and one negative lens element; the forth lens group consists of one lens element; and the fifth lens group consists of one lens element; where each lens element includes a lens body such that only two of the effective surfaces, which are located at the entrance side and the exit side respectively, are in contact with the air.
14. An image pickup apparatus comprising:
a zoom lens in accordance with claim 1;
an image pickup device provided with an image pickup surface which converts an optical image into electrical signals.
15. A zoom lens comprising: a first lens group of positive refractive power; a second lens group of negative refractive power; a third lens group of positive refractive power; and a fourth lens group of negative refractive power, and a fifth lens group of positive refractive power arranged in the above-mentioned order from the object side to the image side; wherein, at activation of variable power from the wide angle end to the telescopic end, the first lens group moves; the second lens group moves; the third lens group moves; and the forth lens group moves at activation of variable power from the wide angle end to the telescopic end; further, at activation of variable power from the wide angle end to the telescopic end, a gap between the first lens group and the second lens group increases; a gap between the second lens group and the third lens group decreases; a gap between the third lens group and the forth lens group increases; and a gap between the forth lens group and the fifth lens group increases; and the conditional formulas (1A) and (2A): 0.05& lt; f1/ft< 0.54 (1A):– 0.12& lt; f2/ft< –0.01(2A): where f1 is the forementioned focal length of the first lens group: f2 is the forementioned focal length of the second lens group: and ft is focal length at the telescopic end.
16. The zoom lens according to claim 15, wherein
the conditional formula (4B) below is satisfied:

$1.5<\Delta\beta 3G<4.0$ (4B):

where $\Delta\beta 3G=\beta 3t/\beta 3w$;
β3t is lateral magnification of the third lens group at the wide angle end; and
β3w is lateral magnification of the third lens group at the telescopic end.
17. The zoom lens according to claim 15, wherein
the forth lens group consists of a negative lens element.
18. The zoom lens according to claim 15, wherein
the conditional formula (4A) below is satisfied:

$0.5<Dt/ft<0.95$ (4A):

where Dt is the distance from the surface top of the lens surface which is the closest to the object side to the image-formation plane at the telescopic end.
19. The zoom lens according to claim 15, wherein
the fifth lens group gets closer to the image side at the telescopic end than at the wide angle end at activation of variable power from the wide angle end to the telescopic end.
20. The zoom lens according to claim 15, wherein
the fifth lens group has at least one aspheric surface.
21. The zoom lens according to claim 15, wherein
the third lens group comprises:
a positive lens element;
a negative lens element; and
a positive lens element arranged in order from the object side.
22. The zoom lens according to claim 15, wherein
the conditional formula (2B) below is satisfied:

$0.1<\Delta 4Gd/\Delta 3Gd<0.72$ (2B)

where fw is focal length at the wide angle end.
23. The zoom lens according to claim 15, wherein
the third lens group gets closer to the object side at the telescopic end than at the wide angle end,
the forth lens group gets closer to the object side at the telescopic end than at the wide angle end; and
the fifth lens group moves gets closer to the image side at the telescopic end than at the wide angle end at activation of variable power.
24. The zoom lens according to claim 15, wherein
the conditional formula (4B) below is satisfied:

$1.5<\Delta\beta 3G<4.0$ (4B):

where $\Delta\beta 3G=\beta 3t/\beta 3w$;
β3t is lateral magnification of the third lens group at the wide angle end; and
β3w is lateral magnification of the third lens group at the telescopic end.
25. The zoom lens according to claim 15, wherein
the conditional formula (5B) below is satisfied:

$-1.5<f4/fs<-0.2$ (5B)

where f4 is the focal length of the forth lens group;
fs is defined as is=√(fw×ft): and
fw is the focal length of the zoom lens at the wide angle end.
26. The zoom lens according to claim 15, wherein
either the forth lens group or the fifth lens group moves in an optical axis when focusing from a distant object toward a near object is done.
27. The zoom lens according to claim 15, wherein
either all or a part of the lens elements included in the third lens group move in a decentering way with respect to the optical axis.
28. The zoom lens according to claim 15, wherein
an aperture stop is disposed immediately in front of the third lens group at the object side; and
moves together with the third lens group as one body at activation of variable power.
29. The zoom lens according to claim 15, wherein
the fifth lens group gets closer to the image side at the telescopic end than at the wide angle end;
the third lens group gets closer to the object side at the telescopic end than at the wide angle end; and
the forth lens group gets closer to the object side at the telescopic end than at the wide angle end; and
the fifth lens group gets closer to the object side at the telescopic end than at the wide angle end at activation of variable power from the wide angle end to the telescopic end.
30. The zoom lens according to claim 15,
wherein the first lens group consists of a plurality of positive lens elements and one negative lens element; the second lens group consists of one positive lens element and a plurality of negative lens elements; the third lens group consists of a plurality of positive lens elements and one negative lens element; the forth lens group consists of one lens element; and the fifth lens group consists of one lens element; where, each lens element includes a lens body such that only two of the effective surfaces, which are located at the entrance side and the exit side respectively, are in contact with the air.

31. An image pickup apparatus comprising:
a zoom lens in accordance with claim 15;
an image pickup device provided with an image pickup surface which converts an optical image into electrical signals.

32. A zoom lens comprising:
a first lens group of positive refractive power;
a second lens group of negative refractive power;
a third lens group of positive refractive power; and
a fourth lens group of negative refractive power, and
a fifth lens group of positive refractive power arranged in the above-mentioned order from the object side to the image side; wherein,
the first lens group comprises one negative lens element; and
one positive lens element; and
a gap between the first lens group and the second lens group increases;
a gap between the second lens group and the third lens group decreases;
a gap between the third lens group and the forth lens group increases; and
a gap between the forth lens group and the fifth lens group increases; and
the conditional formulas (1C), (2C) and (3C) given below are satisfied:

$$Vd1n<40 \quad (1C)$$

$$80<Vd1p \quad (2C)$$

$$\theta gF1n+0.00162Vd1n-0.6415<0 \quad (3C)$$

where Vd1n is Abbe number at d line of the above-mentioned at least one negative lens in the foresaid first lens group:
Vd1p is Abbe number at d line of the above-mentioned at least one positive lens in the foresaid first lens group:
θgF1n is partial dispersion ratio between g line and F line:
θgF1n is expressed by θgF1n=(ng1n−nF1n)/(nF1n−nC1n);
nF1n is refractive index at g line of the one negative lens; and
nC1n is refractive indexes at C line of the one negative lens.

33. The zoom lens according to claim 32, wherein the conditional formula (4C) below is satisfied:

$$1.80<Nd1n \quad (4C)$$

where Nd1n is refractive index of the foresaid at least one negative lens in the first lens group at d line.

34. The zoom lens according to claim 32, wherein the fifth lens group is movable when focusing from a distant object toward a near object is done; and
the conditional formula (5C) below is satisfied:

$$70<Vd5p \quad (5C)$$

where Vd5p is Abbe number at d line of the foresaid positive lens in the fifth lens group.

35. The zoom lens according to claim 32, wherein wherein the conditional formula (1A) below is satisfied:
0.05<f1/ft<0.54(1A): where f1 is the forementioned focal length of the first lens group; and ft is focal length at the telescopic end.

36. The zoom lens according to claim 32, wherein the conditional formula (2A) below is satisfied:
0.05< f1/ft< 0.54 (1A): where f1 is the forementioned focal length of the first lens group, where f2 is the forementioned focal length of the second lens group: and ft is focal length at the telescopic end.

37. The zoom lens according to claim 32, wherein the forth lens group gets closer to the object side at the telescopic end than at the wide angle end; and
the conditional formula (3A) below is satisfied:

$$-0.30<f4/ft<-0.10 \quad (3A):$$

where f4 is the forementioned focal length of the forth lens group.

38. The zoom lens according to claim 32, wherein the forth lens group consists of one negative lens.

39. The zoom lens according to claim 32, wherein the conditional formula (4A) below is satisfied:

$$0.5<Dt/ft<0.95 \quad (4A):$$

where Dt is the distance from the surface top of the lens surface which is the closest to the object side to the image-formation plane at the telescopic end.

40. The zoom lens according to claim 32, wherein the third lens group gets closer to the object side at the telescopic end than at the wide angle end;
the forth lens group gets closer to the object side at the telescopic end than at the wide angle end; and
the fifth lens group gets closer to the image side at the telescopic end than at the wide angle end at activation of variable power from the wide angle end to the telescopic end.

41. The zoom lens according to claim 32, wherein the fifth lens group has at least one aspheric surface.

42. The zoom lens according to claim 32, wherein the third lens group comprises:
a positive lens element;
a negative lens element; and
a positive lens element arranged in order from the object side.

43. The zoom lens according to claim 32, wherein the conditional formula (1B) below is satisfied:

$$10<ft/fw \quad (1B)$$

where fw is focal length at the wide angle end.

44. The zoom lens according to claim 32, wherein the third lens group gets closer to the object side at the telescopic end than at the wide angle end;
the forth lens group gets closer to the object side at the telescopic end than at the wide angle end; and
the fifth lens group gets closer to the object side at the telescopic end than at the wide angle end;
and
the conditional formulas (2B) and (3B) below is satisfied:
ed:

$$0.1<\Delta 4Gd/\Delta 3Gd<0.72 \quad (2B)$$

$$-3.0<\Delta 5Gd/fw<-0.16 \quad (3B):$$

where ft is focal length at the telescopic end:
fw is focal length at the wide angle end:
Δ3Gd is the quantities of displacement of position of the third lens group at the telescopic end with respect to the position of the third lens group at the wide angle end;
Δ4Gd is the quantities of displacement of position of the forth lens group at the telescopic end with respect to the position of the forth lens group at the wide angle end; and
Δ5Gd is the quantities of displacement of position of the fifth lens group at the telescopic end with respect to the position of the fifth lens group at the wide angle end.

45. The zoom lens according to claim 32, wherein the conditional formula (4B) below is satisfied:

$$1.5 < \Delta\beta 3G < 4.0 \quad (4B):$$

where $\Delta\beta 3G = \beta 3t/\beta 3w$;
$\beta 3t$ is lateral magnification of the third lens group at the wide angle end; and
$\beta 3w$ is lateral magnification of the third lens group at the telescopic end.

46. The zoom lens according to claim 32, wherein the conditional formula (5B) below is satisfied:

$$-1.5 < f4/fs < -0.2 \quad (5B)$$

where f4 is the focal length of the forth lens group;
fs is defined as is=$\sqrt{(fw \times ft)}$: and
fw is the focal length of the zoom lens at the wide angle end.

47. The zoom lens according to claim 32, wherein either the forth lens group or the fifth lens group moves in an optical axis when focusing from a distant object toward a near object is done.

48. The zoom lens according to claim 32, wherein either all or a part of the lens elements included in the third lens group move in a decentering way with respect to the optical axis.

49. The zoom lens according to claim 32, wherein an aperture stop is disposed immediately in front of the third lens group at the object side; and
moves together with the third lens group as one body at activation of variable power.

50. The zoom lens according to claim 32, wherein
the first lens group gets closer to the object side at the telescopic end than at the wide angle end;
the third lens group gets closer to the object side at the telescopic end than at the wide angle end;
the forth lens group gets closer to the object side at the telescopic end than at the wide angle end; and
the fifth lens group gets closer to the image side at the telescopic end than at the wide angle end at activation of variable power from the wide angle end to the telescopic end.

51. The zoom lens according to claim 32,
wherein the first lens group consists of a plurality of positive lens elements and one negative lens element; the second lens group consists of one positive lens element and a plurality of negative lens elements; the third lens group consists of a plurality of positive lens elements and one negative lens element; the forth lens group consists of one lens element; and the fifth lens group consists of one lens element; where each lens element includes a lens body such that only two of the effective surfaces, which are located at the entrance side and the exit side respectively, are in contact with the air.

52. An image pickup apparatus comprising:
a zoom lens in accordance with claim 32;
an image pickup device provided with an image pickup surface which converts an optical image into electrical signals.

* * * * *

UNITED STATES PATENT AND TRADEMARK OFFICE
CERTIFICATE OF CORRECTION

PATENT NO. : 8,564,711 B2  
APPLICATION NO. : 13/357468  
DATED : October 22, 2013  
INVENTOR(S) : Masaru Morooka et al.

Page 1 of 1

It is certified that error appears in the above-identified patent and that said Letters Patent is hereby corrected as shown below:

In the Claims

Column 51, line 67, change "-3.0<$\Delta$5Gd/fw>-0.16" to -- -3.0< $\Delta$5Gd/fw<-0.16 --

Column 53, line 40, change "0.05& lt; f1/ft<0.54 (1A):-" to -- 0.05<f1/ft<0.54 (1A): --

Column 53, line 41, change "0.12&ft;f2/ft<-0.01(2A):" to -- -0.12<f2/ft<0.01 (2A): --

Signed and Sealed this  
Twenty-second Day of September, 2015

Michelle K. Lee  
*Director of the United States Patent and Trademark Office*